United States Patent
Asada et al.

(10) Patent No.: US 8,023,796 B2
(45) Date of Patent: Sep. 20, 2011

(54) VIDEO SIGNAL PRODUCING SYSTEM AND VIDEO SIGNAL RECORDING/REPRODUCING DEVICE IN THAT SYSTEM

(75) Inventors: Ryoji Asada, Osaka (JP); Kazumasa Motoda, Osaka (JP); Shoji Nishikawa, Nara (JP); Shigeru Awamoto, Osaka (JP); Shiro Kato, Osaka (JP); Hirofumi Uchida, Osaka (JP)

(73) Assignee: Panasonic Corporation, Osaka (JP)

( * ) Notice: Subject to any disclaimer, the term of this patent is extended or adjusted under 35 U.S.C. 154(b) by 1536 days.

(21) Appl. No.: 10/415,648

(22) PCT Filed: Nov. 6, 2001

(86) PCT No.: PCT/JP01/09663
§ 371 (c)(1),
(2), (4) Date: Jul. 30, 2003

(87) PCT Pub. No.: WO02/39737
PCT Pub. Date: May 16, 2002

(65) Prior Publication Data
US 2004/0081437 A1  Apr. 29, 2004

(30) Foreign Application Priority Data

Nov. 7, 2000 (JP) ................................. 2000-338644
Apr. 19, 2001 (JP) ................................. 2001-121134

(51) Int. Cl.
*H04N 5/765* (2006.01)
*H04N 5/93* (2006.01)

(52) U.S. Cl. ...................................... 386/232; 386/350

(58) Field of Classification Search .................... 386/52, 386/68, 131, 47, 95
See application file for complete search history.

(56) References Cited

U.S. PATENT DOCUMENTS

| | | | |
|---|---|---|---|
| 5,485,280 A * | 1/1996 | Fujinami et al. | 386/123 |
| 5,563,660 A | 10/1996 | Tsukagoshi | |
| 6,111,610 A | 8/2000 | Faroudja | |
| 6,208,382 B1 * | 3/2001 | Glenn | 348/448 |
| 6,289,162 B1 | 9/2001 | Uehara | |
| 6,525,774 B1 | 2/2003 | Sugihara | |
| 6,560,400 B1 * | 5/2003 | Sumiyoshi et al. | 386/52 |
| 6,618,089 B1 * | 9/2003 | Tamayama | 348/333.13 |

(Continued)

FOREIGN PATENT DOCUMENTS

JP  4-160878  6/1992

(Continued)

OTHER PUBLICATIONS

English Language Abstract of JP 11-243507.

(Continued)

*Primary Examiner* — Peter-Anthony Pappas
*Assistant Examiner* — Tat Chio
(74) *Attorney, Agent, or Firm* — Greenblum & Bernstein, P.L.C.

(57) ABSTRACT

A video signal producing system includes an imaging device for obtaining progressive imaging signals having various frame rates, a recording device for recording an output signal of the imaging device and a reproduction device for reproducing a recording signal obtained from the recording device. The imaging device includes a frame rate converting portion for converting the imaging signals to an output having a predetermined frame rate and the reproduction device changes a reproduction speed in response to each of the various frame rates so as to generate an output having a substantial number of frames such that the substantial number of the frames assumes a predetermined value.

14 Claims, 35 Drawing Sheets

U.S. PATENT DOCUMENTS

2002/0021364 A1 2/2002 Asada et al.

FOREIGN PATENT DOCUMENTS

| JP | 6-178274 | 6/1994 |
|---|---|---|
| JP | 7-231404 | 8/1995 |
| JP | 8-223530 | 8/1996 |
| JP | 10-224728 | 8/1998 |
| JP | 11-32241 | 2/1999 |
| JP | 11-243507 | 9/1999 |
| JP | 11-266425 | 9/1999 |
| JP | 2000-50265 | 2/2000 |
| JP | 2000-83182 | 3/2000 |
| JP | 2000-217084 | 8/2000 |
| JP | 2000-299810 | 10/2000 |
| JP | 2002-10129 | 1/2002 |

OTHER PUBLICATIONS

English Language Abstract of JP 11-266425.
English Language Abstract of JP 2000-299810.
English Language Abstract of JP 7-231404.
English Language Abstract of JP 2000-217084.
English Language Abstract of JP 6-178274.
English Language Abstract of JP 2000-83182.
English Language Abstract of JP 10-224728.
English Language Abstract of JP 8-223530.
English Language Abstract of JP 2002-10129.
Japanese Office Action issued on Aug. 25, 2006 from Japan Patent Office in Japanese Patent Application No. 2004-309408, which is a divisional application from priority Japanese Patent Application No. 2000-338644.

* cited by examiner

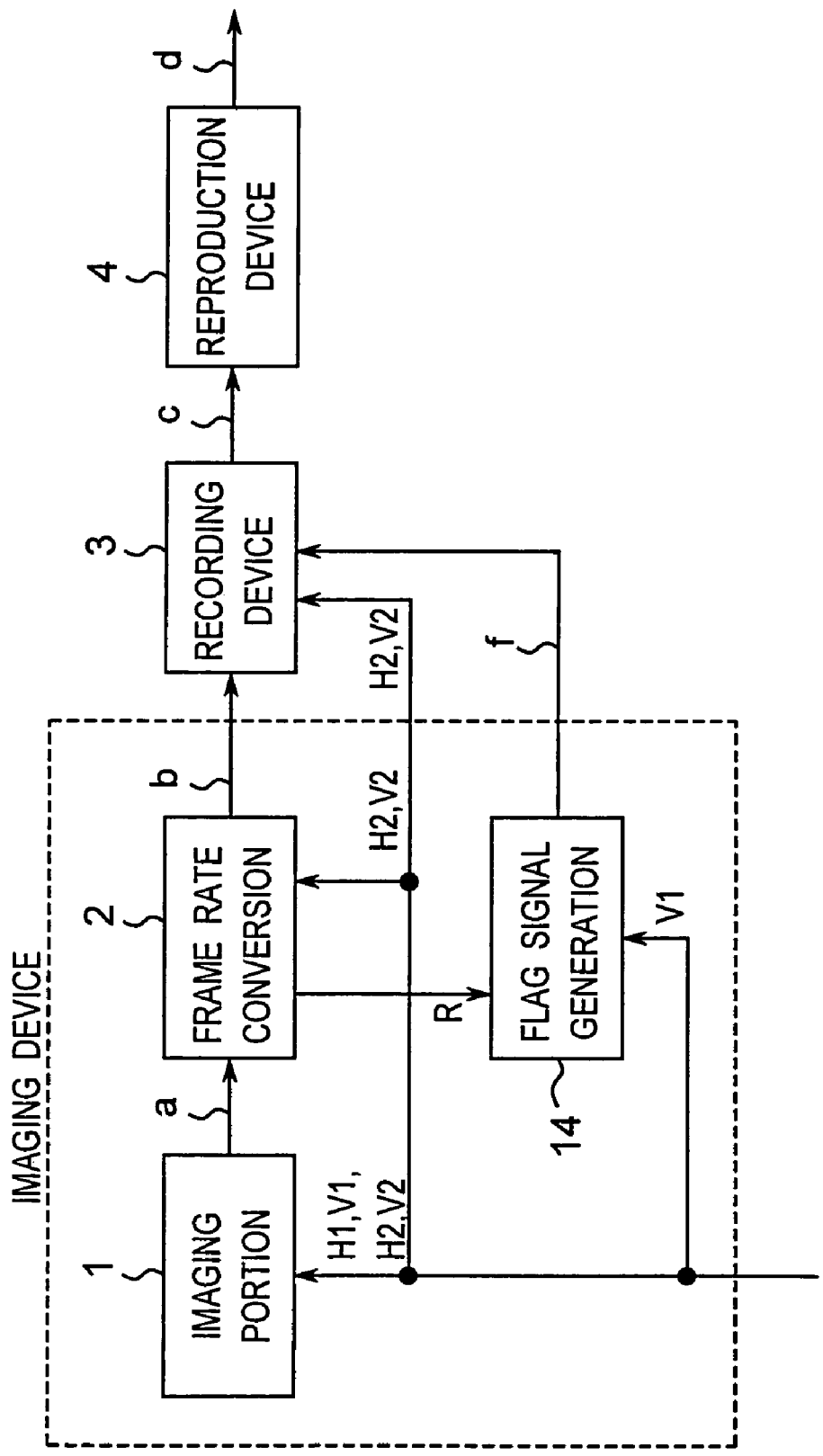

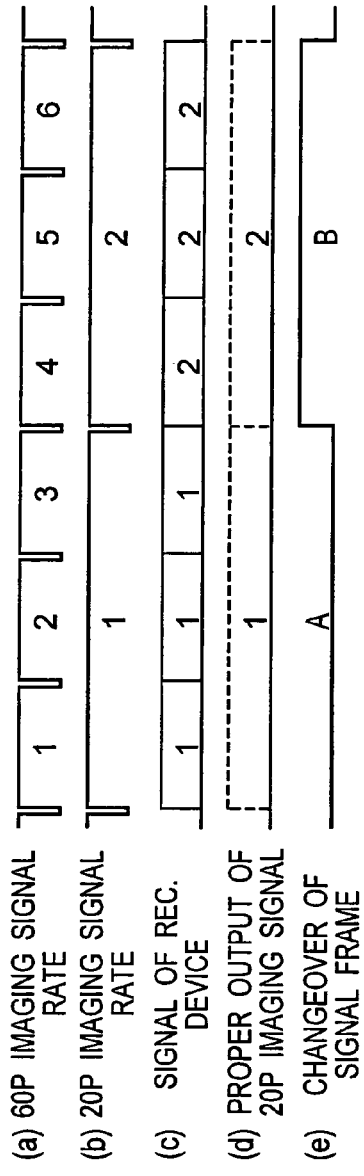
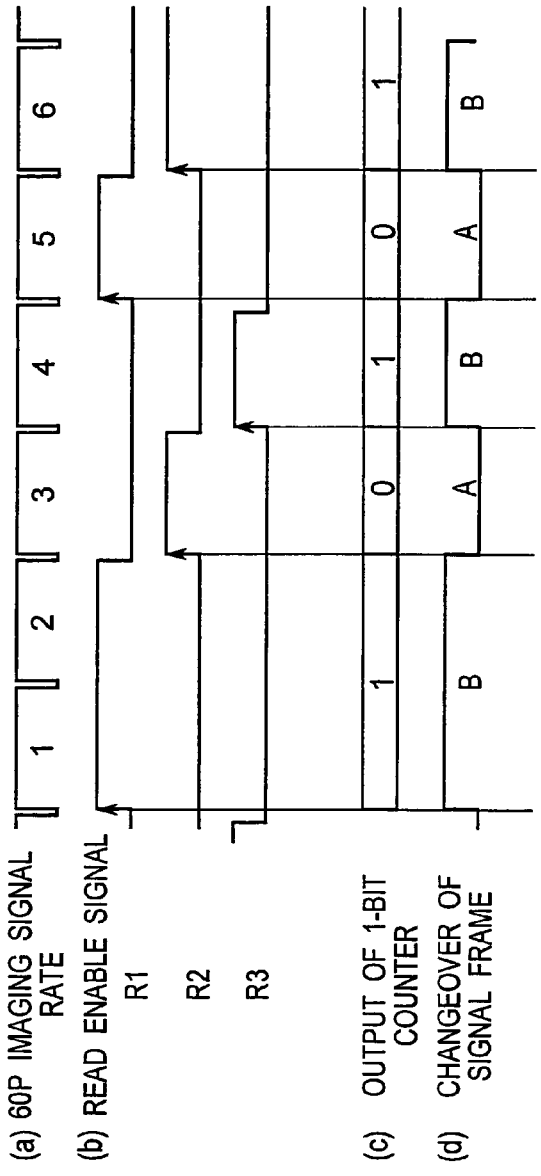
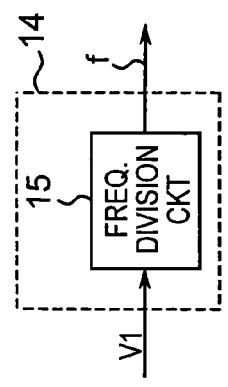
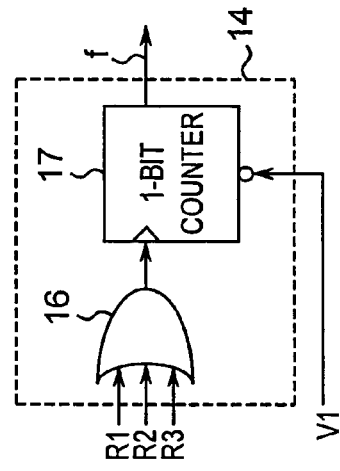
Fig.16
(a) 60P IMAGING SIGNAL RATE
(b) 20P IMAGING SIGNAL RATE
(c) SIGNAL OF REC. DEVICE
(d) PROPER OUTPUT OF 20P IMAGING SIGNAL
(e) CHANGEOVER OF SIGNAL FRAME
Fig.18
(a) 60P IMAGING SIGNAL RATE
(b) READ ENABLE SIGNAL
  R1
  R2
  R3
(c) OUTPUT OF 1-BIT COUNTER
(d) CHANGEOVER OF SIGNAL FRAME
Fig.15
Fig.17

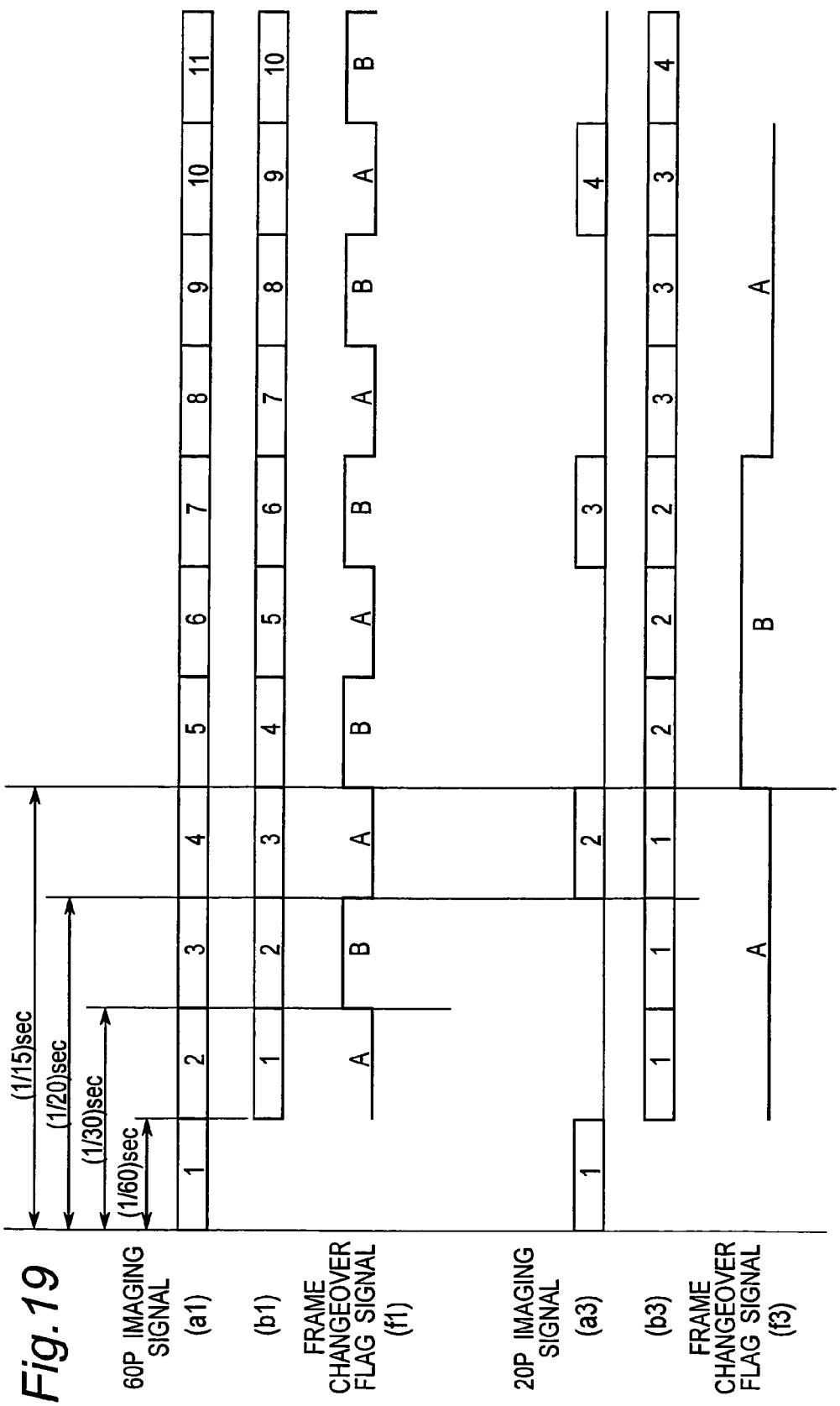

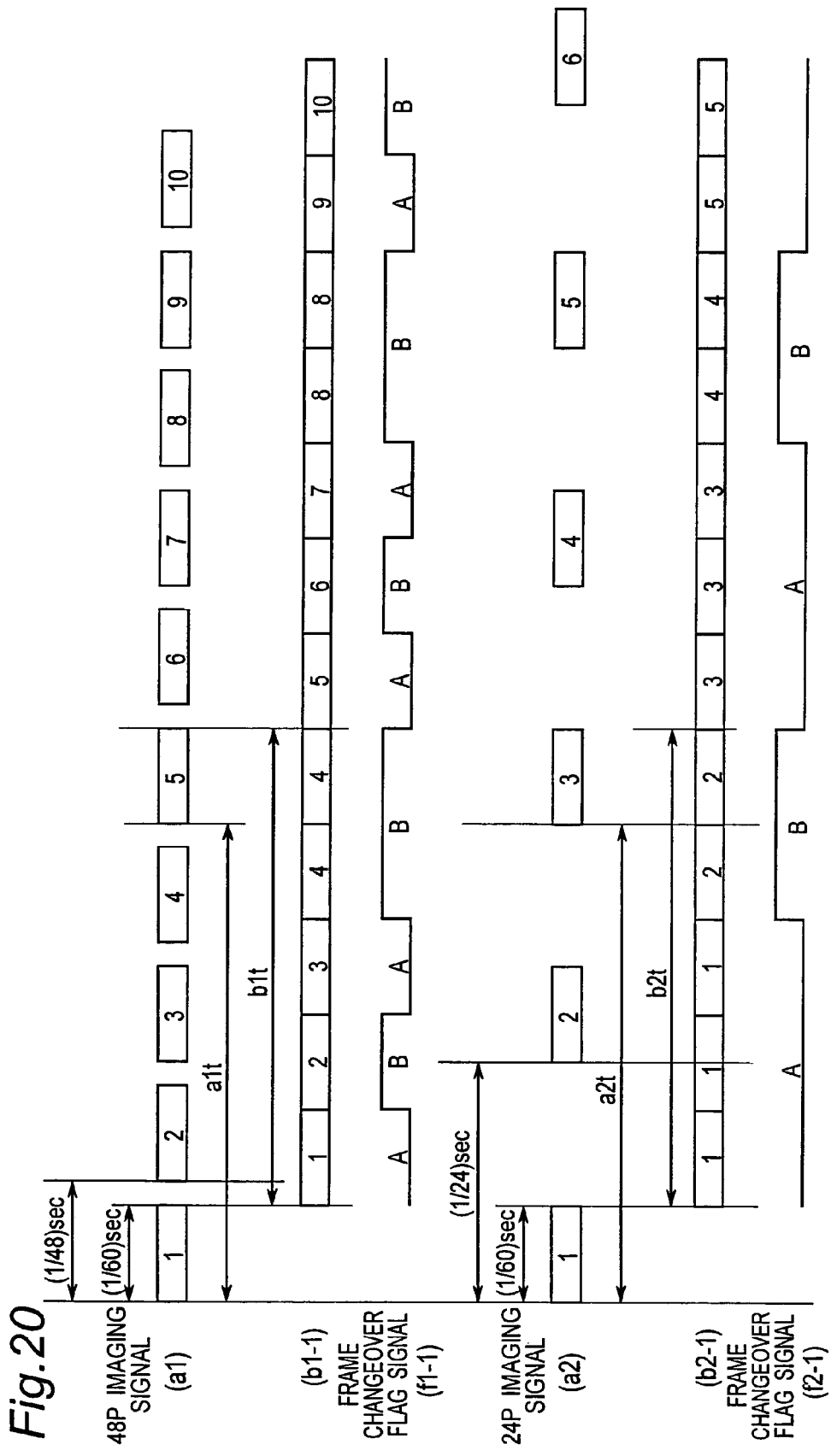

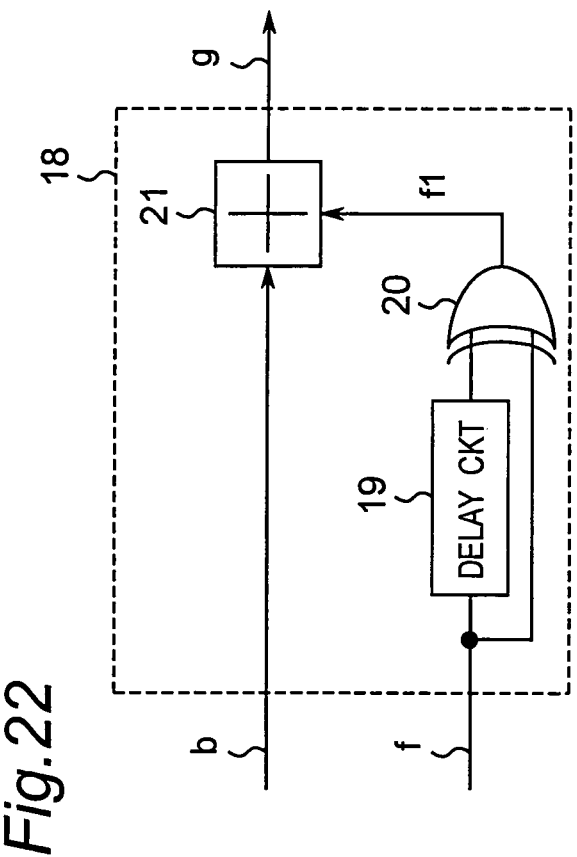
Fig.22
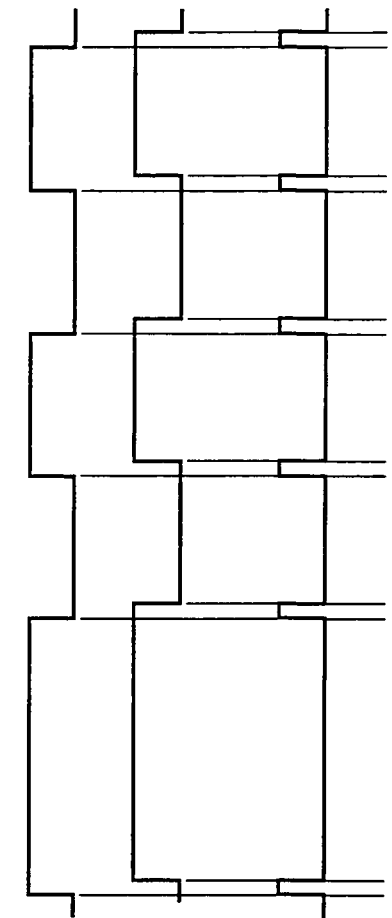
Fig.23A  FLAG SIGNAL f
Fig.23B  DELAY FLAG SIGNAL f1d
Fig.23C  CONVERTED FLAG SIGNAL f1

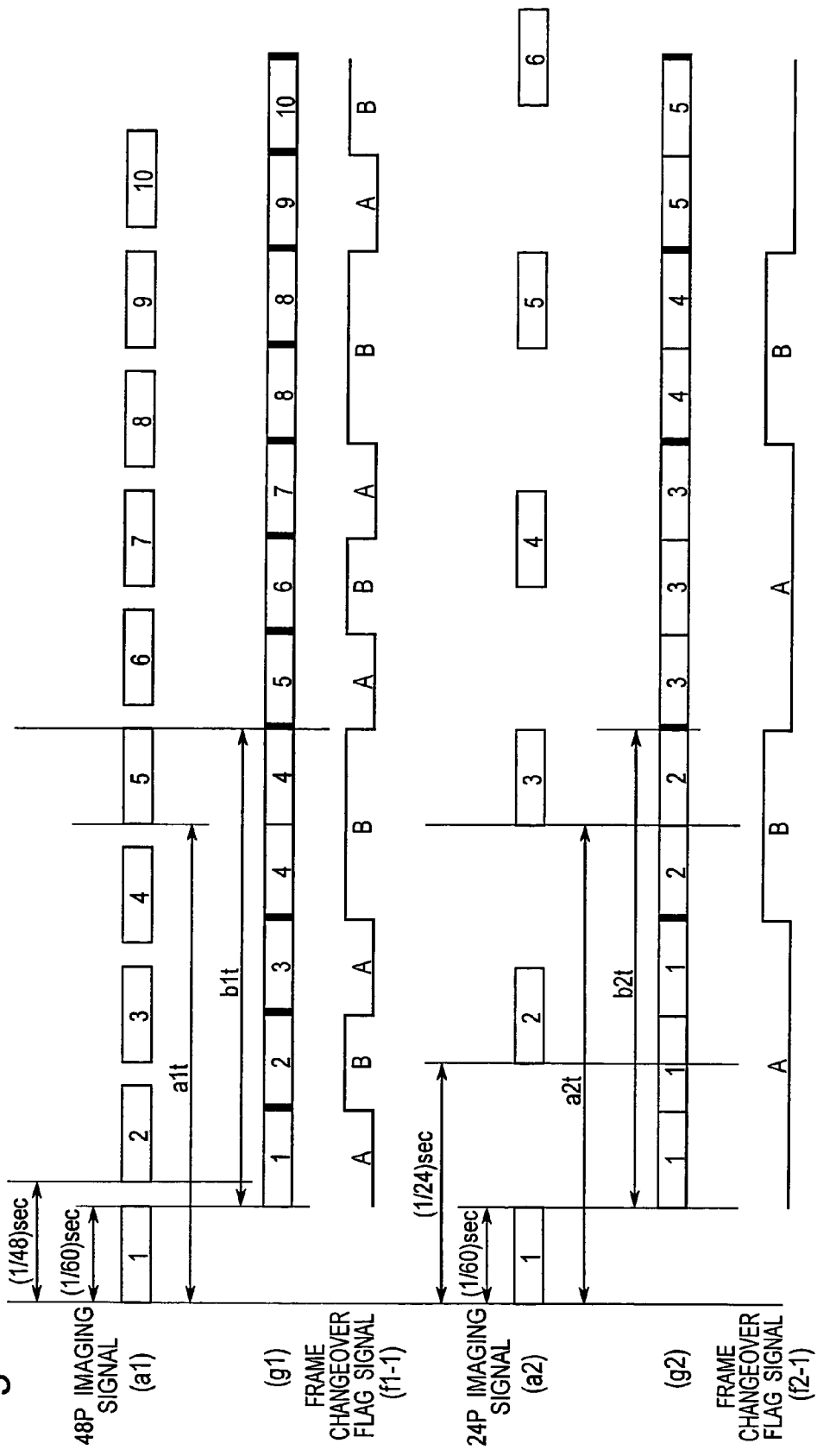

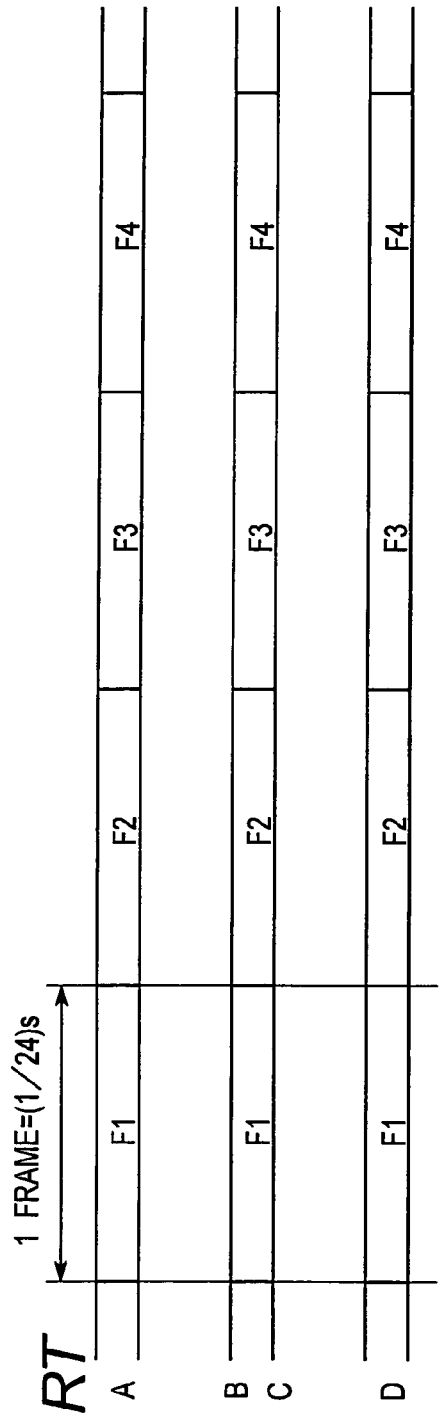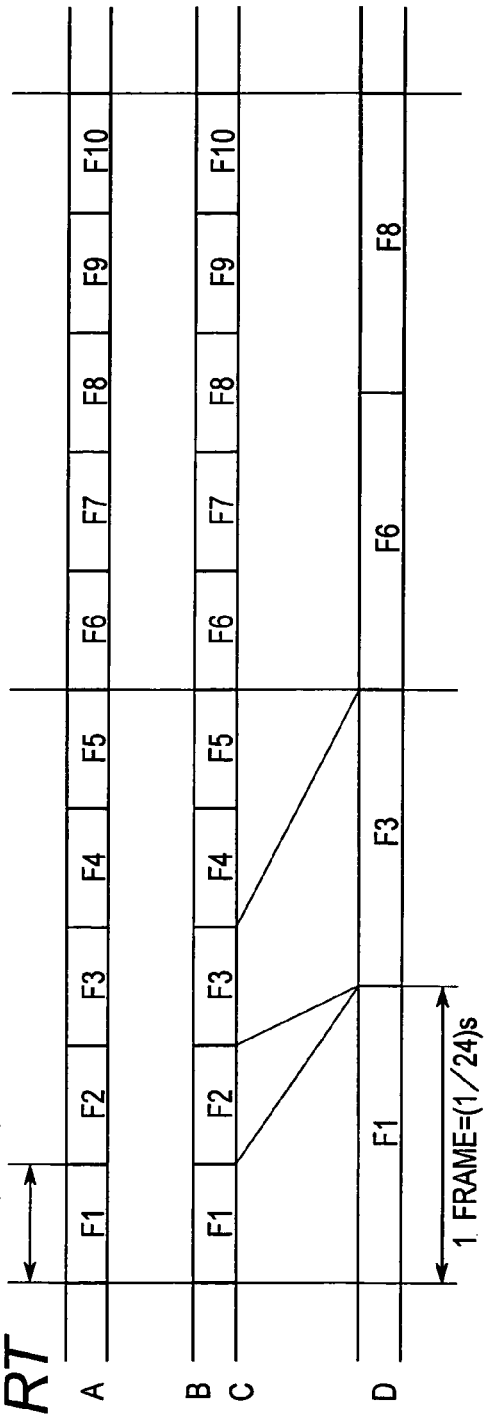

VIDEO SIGNAL PRODUCING SYSTEM AND VIDEO SIGNAL RECORDING/REPRODUCING DEVICE IN THAT SYSTEM

TECHNICAL FIELD

The present invention relates to a video signal producing system usable for an electronic cinema system in which a movie is shot and processed not on a film but electronically.

The present invention also relates to a video signal recording and reproducing apparatus for use in the video signal producing system, in which shooting by the use of a camera or the like and recording are performed by changing a frame rate (the number of frames per second) of a video signal and effects of slow motion and high-speed motion are gained in reproduced video by outputting the video signal at a predetermined frame rate at the time of reproduction.

BACKGROUND ART

Due to recent developments of high-definition (HD) broadcasting equipment, trends towards an electronic cinema system, etc. in which movies are electronized, namely, conventional films are replaced by video tapes or the like have become active and make it necessary to deal with changes from a television field frequency of 60 Hz to a movie frame frequency of 24 Hz and from interlace (hereinafter, referred to as "i") scanning method to progressive (hereinafter, referred to as "P") scanning method.

A system for producing video signals electronically has a configuration which roughly includes an imaging device for obtaining, as imaging signals, 24P signals, i.e., progressive signals having the frame frequency of 24 Hz, a recording device for recording a rate of the 24P signals and a reproduction device for reproducing the 24P signals.

In HD video format, the 24P signals are standardized at a 1080-format having 1080 scanning lines and a 720P-format having 720 scanning lines by Society of Motion Picture and Television Engineers (SMPTE) 274M and SMPTE296M, respectively.

A prior art video signal producing system is shown in, for example, FIG. 35. In FIG. 35, "31" is an imaging device capable of outputting P imaging signals, "32" is a 24P recording device applicable to 24P and "33" is a reproduction device. Operation of the prior art video signal producing system of the above described arrangement is described below with reference to FIGS. 36 and 37. FIGS. 36 and 37 are wave form diagrams of wave forms a, b and c outputted from the respective devices of the video signal producing system shown in FIG. 35. Namely, "a" is an output signal of the imaging device 31, "b" is a signal recorded in the 24P recording device 32 and "c" is an output signal of the reproduction signal 33 for reproducing the signal recorded in the 24P recording device 32. Each numeral in FIGS. 36 and 37 denotes a frame number of each signal.

The imaging device outputs P imaging signals of frame rates of 24 Hz, 60 Hz, 48 Hz, 30 Hz, 20 Hz and 15 Hz indicated by (a1), (a2), (a3), - - - , (a6) of FIGS. 36 and 37, respectively. For example, (a1) of FIG. 36 is a case of the P imaging signal of the 24P frame rate. In this case, the recording device 32 performs recording at a recording speed of a one-fold value of the 24P frame rate in (b1) of FIG. 36. The reproduction device 33 also performs reproduction at a one-fold speed in (c1) of FIG. 36. Thus, a 24P signal which is an output signal of the so-called video signal can be obtained.

In 24P reproduction, reproduction of rapid feed or slow motion is necessary for stage effect in production of video signals in some cases. In case this production is performed, output rate of output of the imaging device 31 is changed and recording speed of the recording device 32 is changed accordingly, while the reproduction device 33 should perform reproduction at the one-fold value of the 24P frame rate. For example, slow motion reproduction of a (2/5)-fold speed is required to be performed, the imaging signal 31 outputs a 60P imaging signal as shown in (a2) of FIG. 36 and the recording device 32 records a signal at a recording speed of a (2/5)-fold value of the 24P frame rate as shown in (b2) of FIG. 36. Since the reproduction device 33 reproduces this signal at the one-fold speed, the signal of the original 60 frames is converted into a signal of 24 frames and thus, a video signal of slow motion of the (2/5)-fold speed is obtained from (24/60=2/5). Likewise, a case in which the imaging device 31 outputs a 48P signal is shown in (a3), (b3) and (c3) of FIG. 36 and a case in which the imaging device 31 outputs a 30P signal is shown in (a4), (b4) and (c4) of FIG. 37.

Meanwhile, in case rapid feed reproduction is required to be performed, the imaging signal 31 outputs an imaging signal slower than 24P, e.g., a 20P imaging signal as shown in (a5) of FIG. 37 and the recording device 32 records a signal at a recording speed of a (6/5) value of the 24P frame rate as shown in (a6) of FIG. 37. Since the reproduction device 33 reproduces this signal at the one-fold speed, the signal of the original 20 frames is converted into a signal of 24 frames and thus, a video signal of rapid feed is obtained. Similarly, a case in which the imaging device 31 outputs a 15P signal corresponding to a (24/15)-fold speed is shown in (a6), (b6) and (c6) of FIG. 37.

Thus, in the prior art video signal producing system, the ordinary 24P video signals and the 24P video signals of slow motion and rapid feed can be produced.

However, in the prior art video signal producing system referred to above, the ordinary 24P video signals and the 24P video signals of slow motion and rapid feed can be produced but recording speed of the recording device is required to be changed in accordance with output rate of the imaging signal of the imaging device, thereby resulting in increase of its circuit scale and electric power. Therefore, in case an imaging device and a recording device are incorporated in, for example, a VTR built-in imaging device, such drawbacks are incurred that the incorporation is difficult due to difficulty in more compactness and lower electric power.

On the other hand, FIG. 38 shows an arrangement example of a video signal recording and reproducing apparatus in a conventional video signal producing system. Meanwhile, FIG. 39 is a conceptual view of signal wave forms of respective portions of prior art. In FIG. 39, "A", "B", "C" and "D" correspond to signals A, B, C and D in FIG. 38 and "F1", "F2", - - - denote video signals of one frame, respectively. The conventional video signal recording and reproducing apparatus of the above described arrangement is described with reference to FIGS. 38 and 39. In case an imaging unit 901 performs imaging by 24P signals, recording and reproduction can be performed directly without frame rate conversion of the 24P signals, etc. as shown in FIG. 39A if a recording unit 103 and a reproduction unit 105 correspond to recording and reproduction of the 24P signals. One frame of the 24P signals reproduced after editorial processing is printed on one frame of a film by a kinescope recording (kineco) device as it is.

In case the imaging unit 901, the recording unit 103 and the reproduction unit 105 correspond to 60P signals (progressive signals having a frame rate of 60 Hz) such that the progressive signals have a frame rate twice that of, for example, current SD television signal format or HD television signal format, the 24P signals are generally obtained by periodically extracting intermediate frames from consecutive frames in the reproduction unit 105 as shown in FIG. 39B and are printed on the film.

Furthermore, in order to replace film shooting by electronic video recording using a video camera and a VTR or a hard disc apparatus, it is essential to materialize slow motion in which shooting is preliminarily performed by running the film at a speed higher than an ordinary one and the film is run at the ordinary speed during projection and, on the contrary, high-speed motion in which shooting is preliminarily performed by running the film at a speed lower than the ordinary one and the film is run at the ordinary speed during projection. In response to this demand, a multi-frame-rate type imaging device in which frame rate at the time of imaging can be set to an arbitrary value by controlling a charge coupled device (CCD) drive method of an imaging portion is proposed.

However, in the above described conventional video signal recording and reproducing apparatus, in case slow motion or high-speed motion is materialize at a simple ratio, for example, recording is performed at a frame rate of 48P (progressive signals having a frame rate of 48 Hz) and reproduction is performed at 24P or recording is performed at 12P (progressive signals having a frame rate of 12 Hz) and reproduction is performed at 24P, this can be easily done in the case of, for example, a VTR by manually setting a special reproduction jog dial to a (1/2)-fold speed or a 2-fold speed during reproduction. However, in case more delicate speed control is attempted, for example, in shooting of a scene of a ship cruising on the sea, a miniature ship is shot by beforehand raising film speed and motion of the ship is displayed more dynamically by running the film at the ordinary speed during reproduction or on the contrary, in order to display a boxing scene more fiercely, shooting is performed by preliminarily lowering film speed slightly and an actor's action is made rapid to such a degree as to eliminate unnaturalness by running the film at the ordinary speed during reproduction, such cases may happen in which set speed obtained by manual setting of the jog dial of the VTR is not continuously variable, adjustment to a desired predetermined speed cannot be performed and high accuracy in reproduction speed cannot be obtained.

DISCLOSURE OF INVENTION

In view of these points, the present invention has for its object to provide a video signal producing system which can be materialized without increasing circuit scale of a recording device even if, for example, a VTR built-in imaging device or the like is used as an imaging device and the recording device In order to solve the above described problems, the present invention also has for its object to provide a video signal recording and reproducing apparatus for use in the video signal producing system, in which by recording together with video signals information on frame rate for recording, desired frame rate is obtained during reproduction such that slow motion reproduction and high-speed motion reproduction can be performed easily.

In order to accomplish this object, a video signal producing system of the present invention includes an imaging device for obtaining progressive imaging signals having various frame rates, a recording device for recording an output signal of the imaging device and a reproduction device for reproducing a recording signal obtained from the recording device. The imaging device includes a frame rate converting portion for converting the imaging signals to an output having a predetermined frame rate and the reproduction device changes a reproduction speed in response to each of the various frame rates so as to generate an output having a substantial number of frames such that the substantial number of the frames assumes a predetermined value.

As a result, since the imaging signals having the various frame rates at the predetermined frame rate and the substantial number of the frames in a reproduction signal can be set to the predetermined value.

Meanwhile, in a video signal recording apparatus of a video signal producing system, according to the present invention, when an input video signal having a frame rate equal to an m multiple of a standard frame rate of a recording format is recorded on a recording medium in the recording format for each frame, rate information indicative of the frame rate of the input video signal directly or indirectly is recorded together with the input video signal.

As a result, since the rate information is recorded on the recording medium together with the input video signal, the rate information at the time of the rate information can be obtained at the time of reproduction.

In a video signal reproducing apparatus of a video signal producing system, according to the present invention, when from a recording medium on which an input video signal having a frame rate equal to an m multiple of a standard frame rate of a recording format and rate information indicative of the frame rate of the input video signal directly or indirectly are recorded in the recording format for each frame, the input video signal and the rate information are reproduced such that the input video signal is reproduced at a further frame rate different from the standard frame rate, the input video signal is reproduced and outputted at a predetermined multiple of a reproduction speed determined by the rate information.

As a result, by using the reproduced rate information, setting to the predetermined reproduction speed can be performed easily.

BRIEF DESCRIPTION OF DRAWINGS

FIG. 14 is a block diagram showing a configuration of a video signal producing system according to a fifth embodiment of the present invention.

FIG. 15 is a block diagram showing one configuration of a flag signal generating portion of the video signal producing system of FIG. 14.

FIG. 16 is a view explanatory of operation of the flag signal generating portion of FIG. 15.

FIG. 17 is a block diagram showing another configuration of the flag signal generating portion of the video signal producing system of FIG. 14.

FIG. 18 is a view explanatory of operation of the flag signal generating portion of FIG. 17.

FIG. 19 is a signal conceptual view explanatory of operation of the video signal producing system of FIG. 14.

FIG. 20 is a signal conceptual view explanatory of operation of the video signal producing system of FIG. 14.

FIG. 22 is a block diagram showing a configuration of a flag signal converting and adding portion of the video signal producing system of FIG. 21.

FIGS. 23A, 23B, and 23C are views explanatory of operation of the flag signal converting and adding portion of FIG. 22.

FIG. 24 is a signal conceptual view explanatory of state of a flag signal added to an imaging signal of the video signal producing system of FIG. 21.

FIGS. 39A and 39B are conceptual views of recording video signal wave form and reproduction video signal wave form of the conventional video signal recording and reproducing apparatus of FIG. 38.

BEST MODE FOR CARRYING OUT THE INVENTION

Hereinafter, embodiments of the present invention are described with reference to the drawings.

First Embodiment

Figure 1:
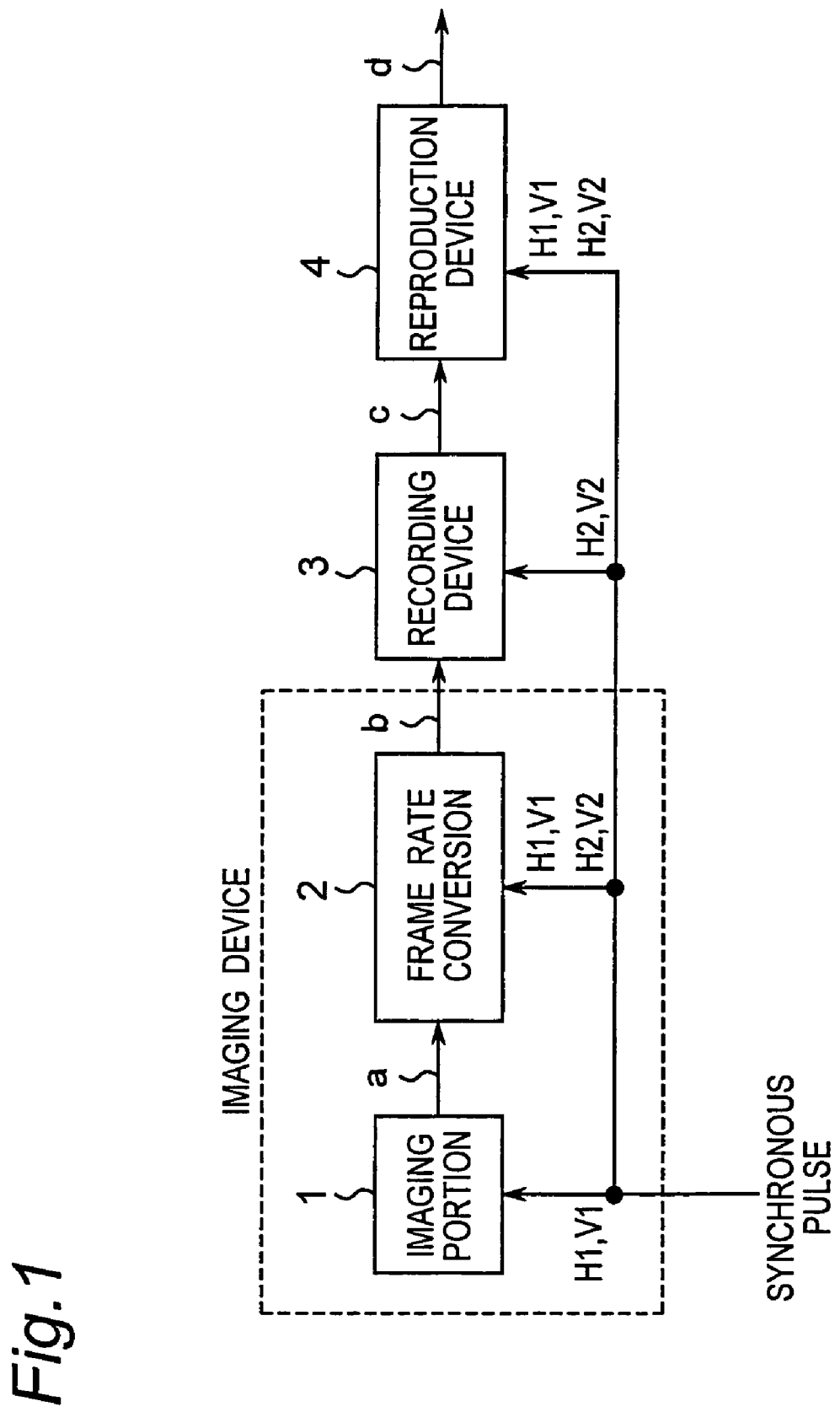
FIG. 1 is a block diagram showing a configuration of a video signal producing system according to a first embodiment of the present invention.

FIG. 1 is a block diagram showing a video signal producing system according to a first embodiment of the present invention. In FIG. 1, "1" is an imaging portion for outputting P signals of various frame rates, "2" is a frame rate converting portion for converting the frame rates of the output signals of the imaging portion 1 to a predetermined frame rate, "3" is a recording device for recording output signals of the frame rate converting portion 2 and "4" is a reproduction device for reproducing the signals recorded by the recording device 3. Meanwhile, in FIG. 1, "H1" and "V1" are horizontal and vertical synchronous signals outputted from a synchronous signal generating portion (not shown) to the imaging portion 1 and "H2" and "V2" are horizontal and vertical synchronous signals after frame rate conversion.

Figure 2:
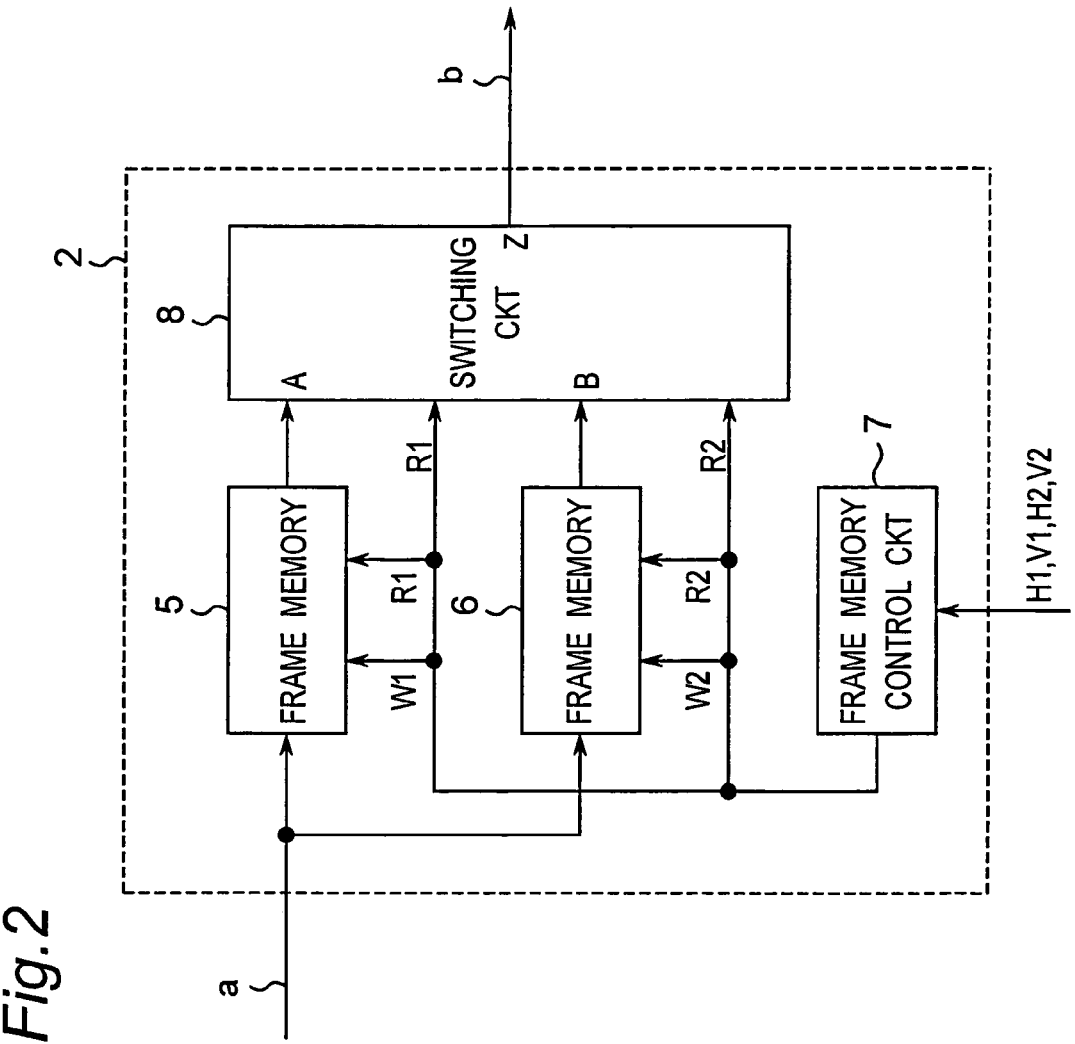
FIG. 2 is a block diagram showing one example of a configuration of a frame rate converting portion of the video signal producing system of FIG. 1.
Figure 3:
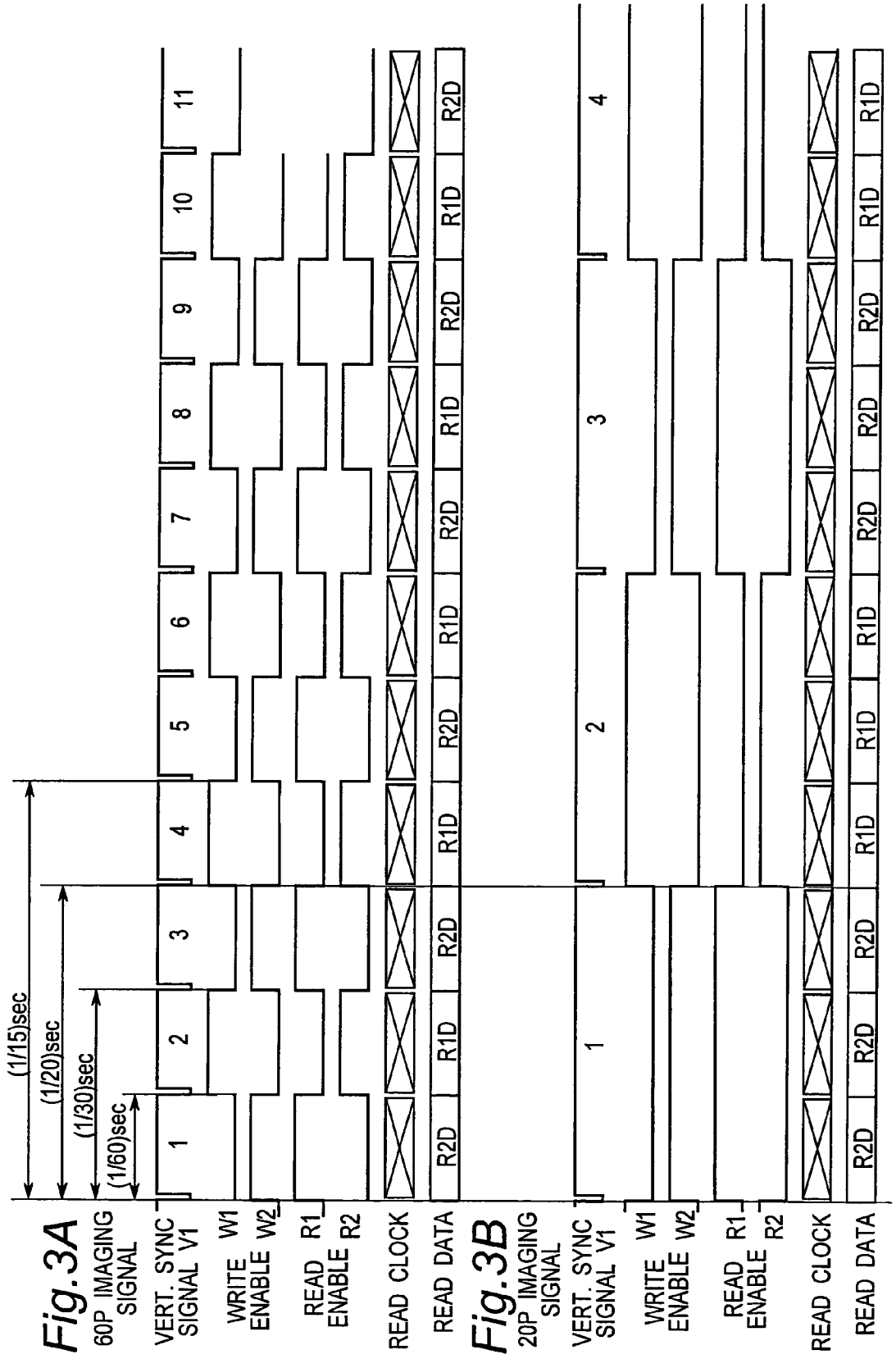
FIGS. 3A and 3B are signal wave-form diagrams explanatory of operation of the frame rate converting portion of FIG. 2.
Figure 4:
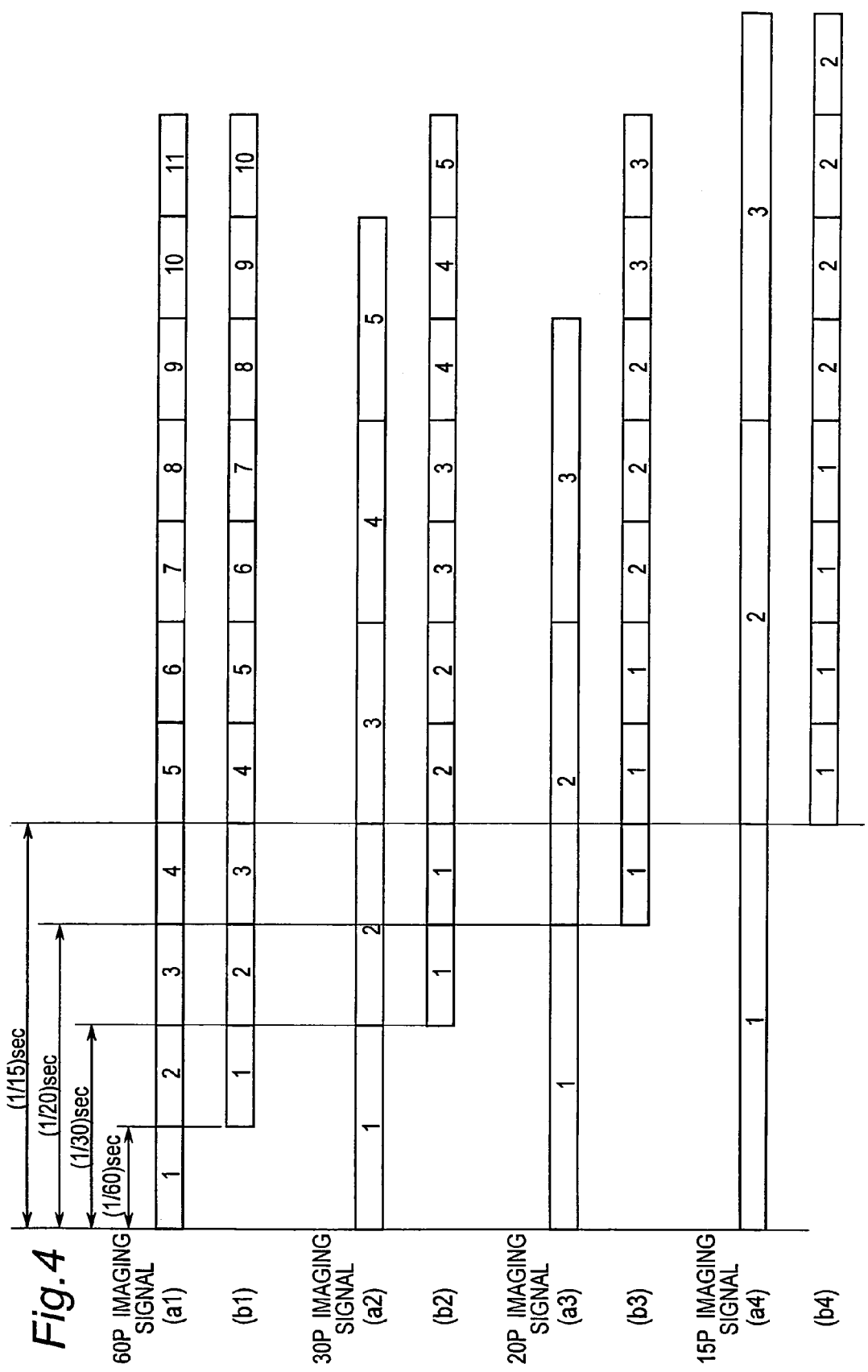
FIG. 4 is a signal conceptual view explanatory of operation of the video signal producing system of FIG. 1.
Figure 5:
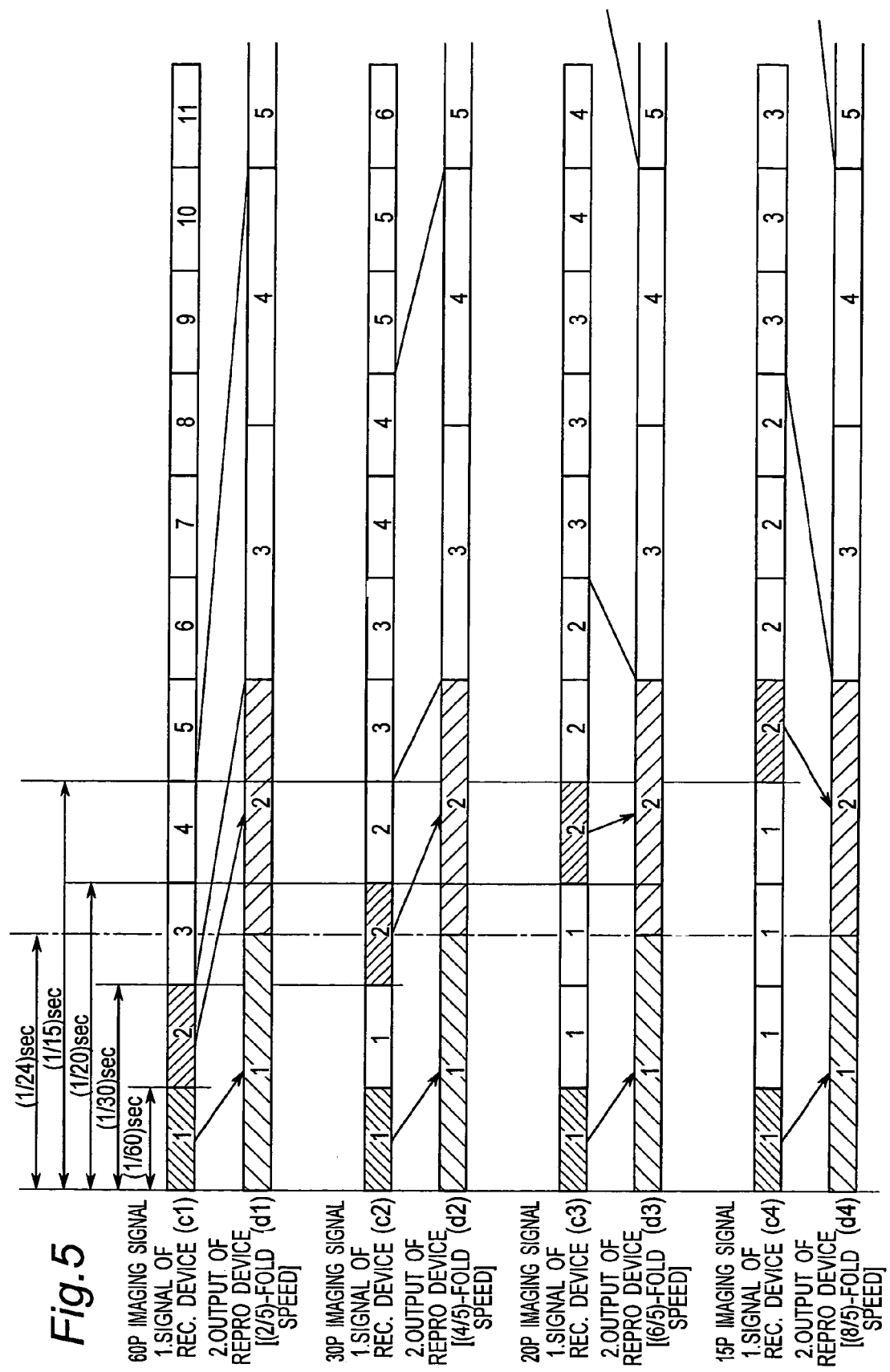
FIG. 5 is a signal conceptual view explanatory of operation of the video signal producing system of FIG. 1.

Hereinafter, operation of the video signal producing system of the above described arrangement is described with reference to FIGS. 2 to 5. FIG. 2 is a block diagram showing one example of an internal configuration of the frame rate converting portion 2 in the first embodiment. FIG. 3 is a view explanatory of operation of the frame rate converting portion 2 and FIGS. 4 and 5 are signal wave-form diagrams of the respective portions shown in FIG. 1. In FIG. 2, "5" and "6" are frame memories, "7" is a control circuit for controlling write and read of the frame memories 5 and 6 and "8" is a switching circuit.

The frame rate converting portion 2 operates based on the synchronous signals H1, V1, H2 and V2 as shown in FIG. 3. In FIGS. 2 and 3, each of write enable signals W1 and W2 of the frame memories 5 and 6 and read enable signals R1 and R2 of the frame memories 5 and 6 has an enable period when it is at low level. For example, imaging signals a of frame rates of 60P and 20P inputted from the imaging portion 1 are converted to a predetermined frame rate of 60P. FIG. 3A shows a case of input of imaging signals having a frame rate of 60P. Since an input and an output have the same frame rate, write is alternately performed in the frame memories 5 and 6 at the frame rate of 60P and read is alternately performed in the frame memories 5 and 6 at the frame rate of 60P. Meanwhile, in FIG. 3B showing a case of input of imaging signals having a frame rate of 20P, write of one frame is performed at the frame rate of 20P and read is performed at the frame rate of 60P. Thus, in this case, an identical signal is outputted in three frames at 60 Hz. As described above, frame rate conversion can be easily performed by, for example, performing write and read in the two frame memories alternately.

By the frame rate converting portion 2 referred to above, output signals of the imaging portion 1, namely, imaging signals having various frame rates, for example, a1 of 60P, a2 of 30P, a3 of 20P and a4 of 15P are all converted to signals b1, b2, b3 and b4 having a frame rate of 60P as shown in FIG. 4 and are outputted to the recording device 3. Meanwhile, each numeral in the figure denotes a frame number of each signal. The recording device 3 records signals from the imaging device at a frame rate of 60P at all times.

Then, the reproduction device 4 operates as shown in FIG. 5 so as to set a substantial number of frames to a predetermined number. In this case, the reproduction device 4 performs conversion so as to set the number of frames to 24P. For example, in the case of a 30P imaging signal in FIG. 5, an identical signal is recorded in each of two frames at a rate of 60P by the recording device 3 as shown by c2 and by selecting one of the two frames, reproduction speed is changed such that a rate of 60P is set to a rate of 24P. Time axis is expanded to (2/5) times. Since the signals of two frames at 60P are substantially converted to a rate of 24P, namely, 30P is converted to 24P, a reproduction signal d2 of a (4/5)-fold speed is obtained. Therefore, in comparison with a case in which imaging signals are originally 24P signals, 24P reproduction signals of slightly slow motion are obtained.

Likewise, in the case of 20P imaging signals, an identical signal is recorded in each of three frames at a rate of 60P as shown by c3 and by selecting one of the three frames, reproduction speed is changed such that a rate of 60P is set to a rate of 24P. In this case, since 20P is substantially converted to 24P, a reproduction signal d3 of (6/5)-fold speed is obtained. Thus, 24P reproduction signals of slightly rapid feed are obtained. The same applies to imaging signals of other frame rates. For example, in the case of 60P of c1, conversion to a reproduction signal d1 of (2/5)-fold speed is performed. In the case of 15P of c4, conversion to a reproduction signal d4 of (8/5)-fold speed is performed.

In accordance with the first embodiment of the present invention described above, since the signals having the various frame rates, which are obtained by the imaging device, are converted to the signals having the predetermined frame rate such that the recording device can record at the predetermined frame rate, for example, at a frame rate of 60P at all times, the imaging device and the recording device of the video signal producing system can be arranged without increase of circuit scale and electric power in a VTR built-in imaging device in which an imaging device and a recording device are provided integrally, for example, a camera recorder.

Furthermore, by combining also the reproduction device with the imaging device and the recording device, 24P video signal can be reproduced by selection of signals and reproduction speed conversion at the predetermined ratios.

Meanwhile, it is needless to say that positional detection of each frame change in the reproduction device may be performed by selecting a necessary frame signal according to a rule determined preliminarily based on the synchronous signals H1, V1, H2 and V2 or changing over operation of frame selection in response to the frame rate of the imaging signal and the frame rate of the reproduction device.

Second Embodiment

Figure 6:
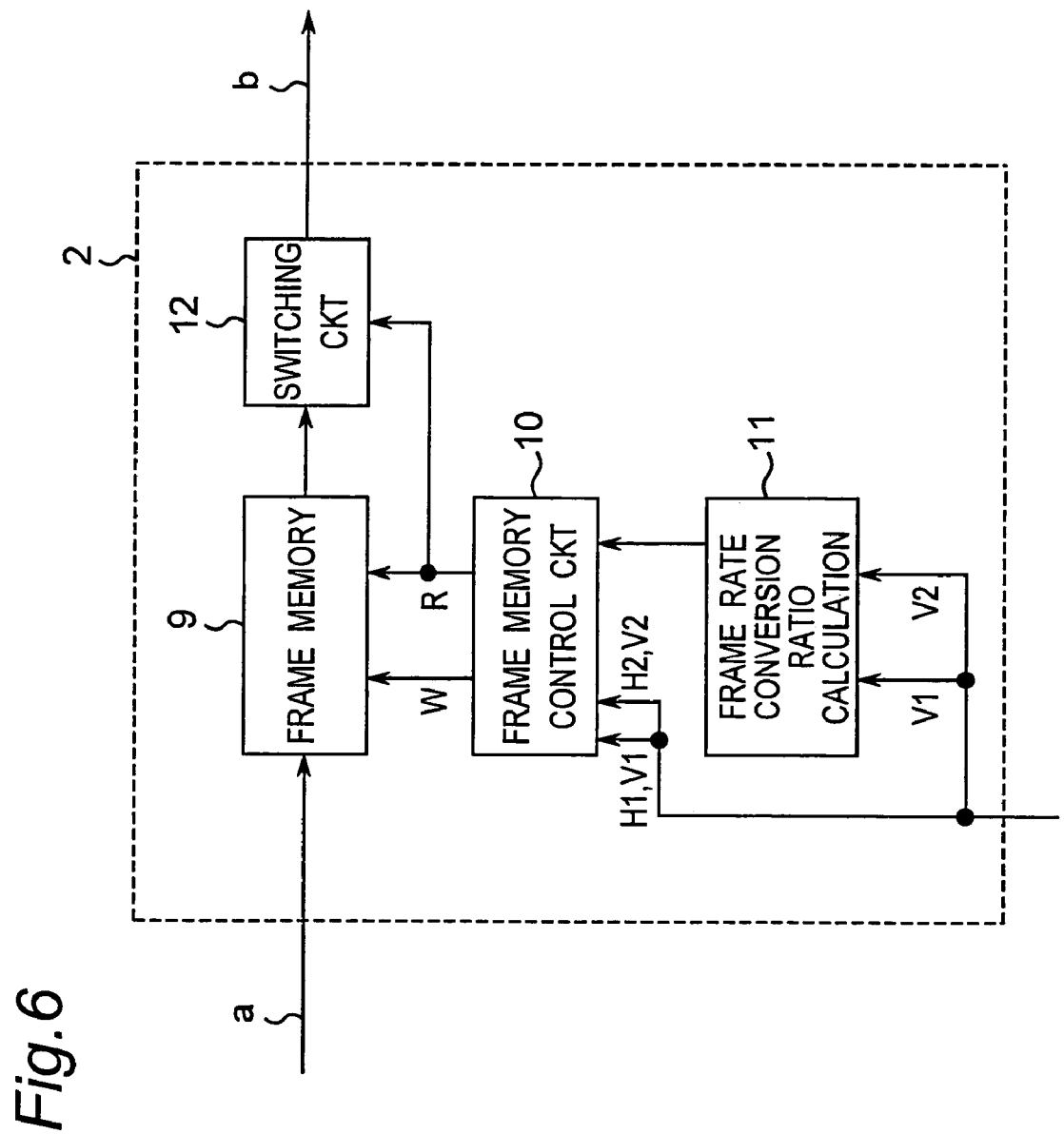
FIG. 6 is a block diagram showing one example of a configuration of a frame rate converting portion of a video signal producing system according to a second embodiment of the present invention.

FIG. 6 is a block diagram showing an internal configuration of a frame rate converting portion 2 of a video signal producing system according to a second embodiment of the present invention. In FIG. 6, "9" is a frame memory, "10" is a frame memory control circuit for controlling write and read of the frame memory 9, "11" is a frame rate conversion ratio calculating circuit for calculating a conversion ratio of a frame rate of an inputted imaging signal and a predetermined frame rate obtained by the frame rate converting portion 2 and "12" is a switching circuit. The second embodiment is different from the first embodiment in that the frame rate converting portion 2 is provided with the frame rate conversion ratio calculating circuit 11. Other circuits are substantially identical with those of the first embodiment and the operations are also similar to those of the first embodiment.

Figure 7:
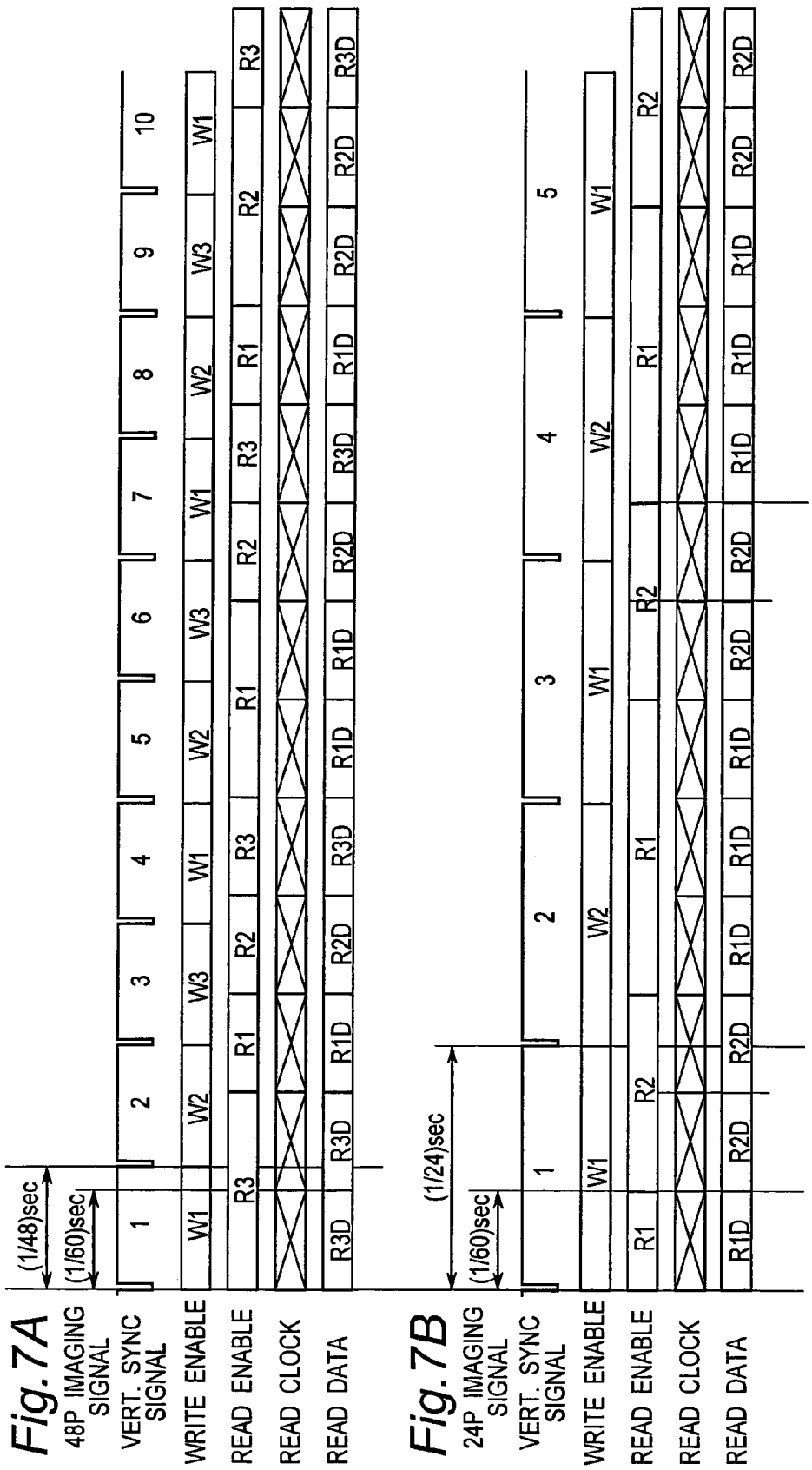
FIGS. 7A and 7B are signal wave-form diagrams explanatory of operation of the frame rate converting portion of FIG. 6.
Figure 8:
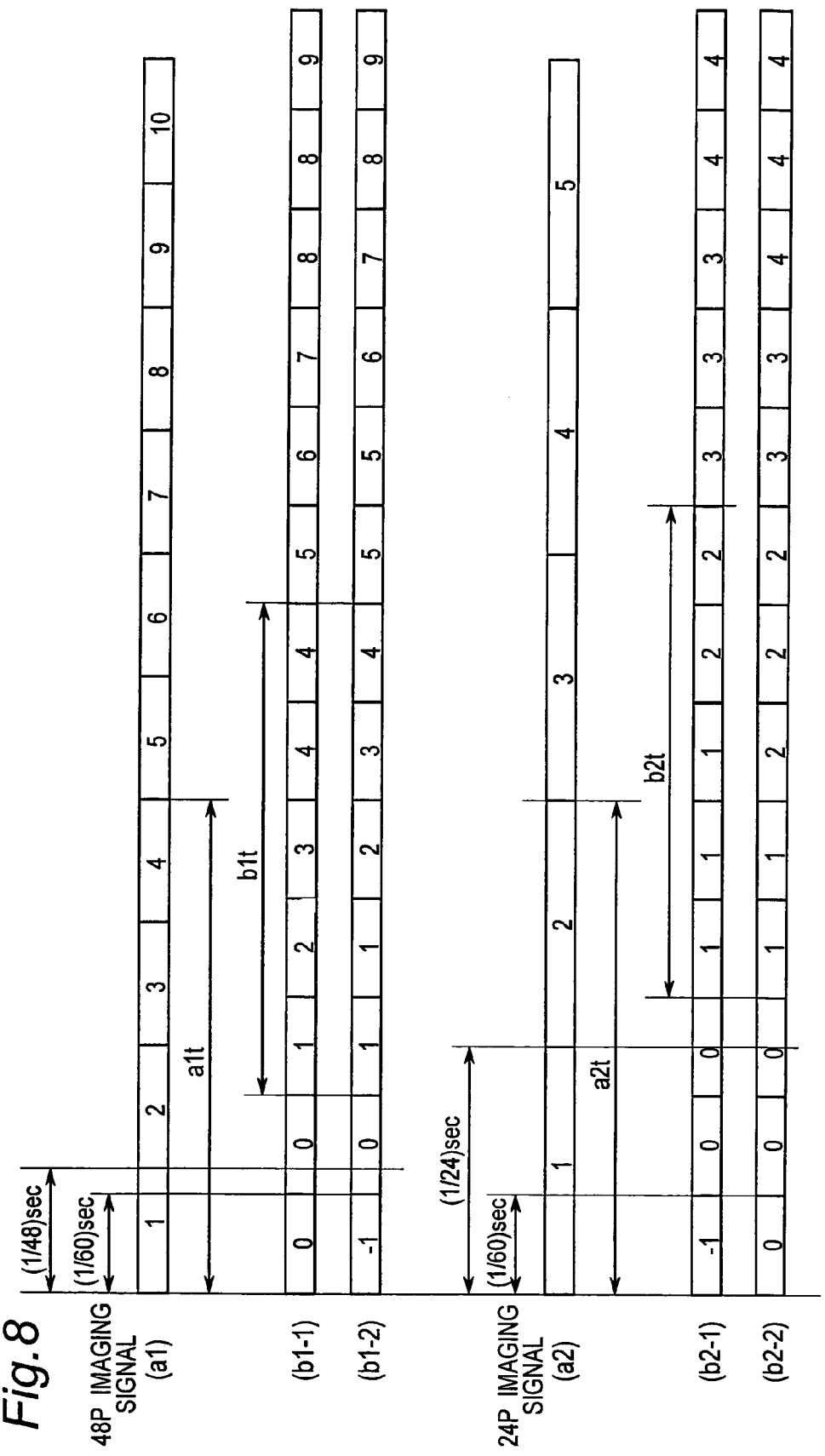
FIG. 8 is a signal conceptual view explanatory of operation of the frame rate converting portion of FIG. 6.

Hereinafter, operation of the video signal producing system of the above described arrangement is described with reference to FIGS. 7 and 8. FIG. 7 is a signal wave-form diagram explanatory of operation of the frame memory control circuit 10 and the frame memory in the case where imaging signals are of 48P and 24P and frame rate after conversion is 60P, while FIG. 8 is a signal conceptual view indicative of relation between an input signal and an output signal of the frame rate converting portion 2 based on the operation of the frame memory control circuit 10 and the frame memory 9. Meanwhile, each numeral in FIGS. 7 and 8 corresponds to a frame number.

For example, in the case of the 48P imaging signal, the frame rate 60P after conversion is not an integral multiple of 48P in contrast with 20P, 30P, etc. In this case, a ratio of the input frame rate of 48P to the frame rate of 60P after conversion is (4/5), so that a time of 4 frames of 48P coincides with a time of 5 frames of 60P. Therefore, the frame rate conversion ratio calculating circuit 11 outputs a control signal to the frame memory control circuit 10 such that read-out of the frame memory 9 outputs a signal of an identical frame one time in five times. In response to this control signal, the frame memory control circuit 10 outputs a read enable signal shown in FIG. 7A. In the case of this 48P imaging signal, frame rate conversion is performed by using, for example, three frame memories in turns such that overtaking of write does not occur during read of the memory.

Similarly, in case the 24P imaging signal is converted to 60P, the conversion ratio is (2/5), so that a time of 2 frames of 24P coincides with a time of 5 frames of 60P. In this case, the frame rate conversion ratio calculating circuit 11 outputs a control signal to the frame memory control circuit 10 such that read-out of the frame memory 9 outputs a signal of an identical frame two times in five times (i.e., duplication of one time) and a signal of another frame three times (i.e., duplication of two times), namely, a total of times of duplication is three (1+2=3). In response to this control signal, the frame memory control circuit 10 outputs a read enable signal shown in FIG. 7B. By such operation of the frame rate converting portion 2, the output signal is converted to the frame rate of 60P as shown by (b1-1) or (b1-2) of FIG. 8 in the case of 48P and (b2-1) or (b2-2) of FIG. 8 in the case of 24P. At this time, predetermined frame intervals a1t, b1t, a2t and b2t have such relations as (a1t=b1t) and (a2t=b2t).

As described above in the second embodiment, in case the ratio of the frame rate before conversion to the frame rate after conversion is calculated in the frame rate conversion ratio calculating circuit 11 assumes (n/m) in which "n" and "m" are integers of (1≦n≦m) and correspond to values before and after conversion, respectively, especially, in case "n" is not 1, namely, (m/n) is not an integer, output is performed by duplicating a portion in n frames or all frame signals at the frame rate after conversion a total of (m−n) times such that a time of n frames of the signal of the frame rate before conversion coincides with a time of m frames of the signal of the frame rate after conversion. Thus, by performing conversion so as to generate a regular frame signal sequence at an interval of m frames, conversion to the predetermined frame rate can be performed even if the conversion ratio is complicated. In the case of (n=1), each frame is repeated (m−n) times in the same operation as the first embodiment. Meanwhile, the recording device 3 and the reproduction device 4 also operate in the same manner as the first embodiment.

As a result, manner of conversion of the frame rate can be selected in accordance with the ratio of the frame rate before conversion to the frame rate after conversion.

As described above, even if the conversion ratio is complicated, the imaging signals of various frame rates can be converted to the signal of, for example, 60P at all times in the same manner as the first embodiment and recording can be performed in the recording device 3 at the frame rate of 60P, so that the imaging device and the recording device of the video signal producing system can be arranged without increase of circuit scale and electric power in a VTR built-in imaging device in which an imaging device and a recording device are provided integrally, for example, a camera recorder.

Third Embodiment

Figure 9:
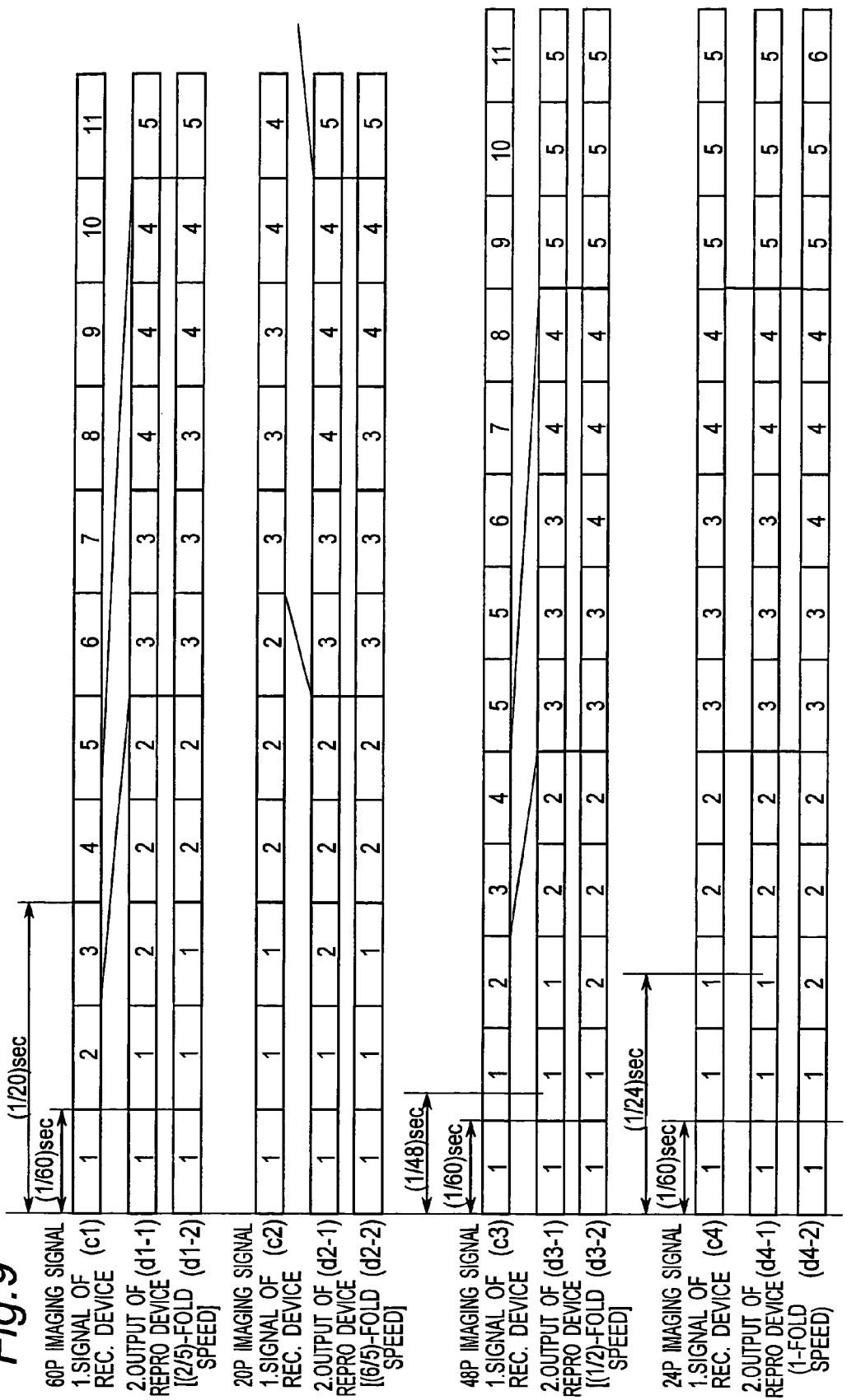
FIG. 9 is a signal conceptual view explanatory of output signals of a reproduction device of a video signal producing system according to a third embodiment of the present invention.

FIG. 9 is a signal conceptual view explanatory of output signals of a reproduction device of a video signal producing system according to a third embodiment of the present invention. The third embodiment is different from the first and second embodiments in manner of reproduction speed conversion in the reproduction device. Thus, its whole block diagram is similar to FIG. 1.

In FIG. 9, signals of the recording device 3 illustrate the recording signals obtained in the first embodiment or the second embodiment. Namely, the frame rate after conversion at the frame rate converting portion 2 is set to 60P. In the reproduction device 4, the frame rate is converted to the frame rate of 24P. As the input signal, a 60P imaging signal, a 48P imaging signal, a 24P imaging signal and a 20P imaging signal are illustrated.

Hereinafter, operation of the reproduction device 4 in the third embodiment is described. In the case of the 60P imaging signal, frame number of the recording signal changes one by one at a rate of 60 frames as shown by (c1) of FIG. 9. However, in the reproduction device 4, frames are duplicated (repeated) such that a set of two successive different frames, for example, frames of frame numbers 1 and 2 are set to two and three in number, respectively as shown by (d1-1) of FIG. 9 or three and two in number, respectively as shown by (d1-2) of FIG. 9. The same applies to a set of the subsequent successive different frames, for example, frames of frame numbers 3 and 4.

In the case of the 48P imaging signal, frame numbers of the recording signal assume 1, 1, 2, 3, 4, 5, 6, 7, 8, - - - as shown by (c3) of FIG. 9 and conversion is performed in a set of two successive different frames, for example, frames of the frame numbers 1, 1, 2 such that the frame of the frame number 1 is duplicated one time up to a total of 3 frames of the frame number 1 and the frame of the frame number 2 is also duplicated one time up to a total of 2 frames of the frame number 2 as shown by (d3-1) of FIG. 9 or the 2 frames of the frame number 1 are kept as they are and the frame of the frame number 2 is duplicated two times up to a total of 3 frames of the frame number 2 as shown by (d3-2) of FIG. 9. A set of the subsequent successive different frames of the frame numbers 3 and 4 are duplicated in the same manner as 60P.

Meanwhile, in the case of the 24P imaging signal of (c4) of FIG. 9, since conversion of reproduction speed is not necessary, conversion is performed such that the recording signal is kept as it is as shown by (d4-1) of FIG. 9 or in a set of two successive different frames, for example, frames of the frame numbers 1, 1, 1, 2, 2, one frame of the frame number 1 is deleted and one frame of the frame number 2 is duplicated as shown by (d4-2) of FIG. 9.

Meanwhile, in the case of the 20P imaging signal of (c2) of FIG. 9, conversion is performed in a set of successive different frames, for example, frames of the frame numbers 1, 1, 1, 2, 2, 2 such that one frame of the frame number 1 is deleted up to a total of 2 frames of the frame number 1 and the 3 frames of the frame number 2 are kept as they are as shown by (d2-1) of FIG. 9 or the 3 frame of the frame number 1 are kept as they are and one frame of the frame number 2 is deleted as shown by (d2-2) of FIG. 9. The same applies to a set of the subsequent successive different frames of the frame numbers 3, 3, 3, 4, 4, 4.

As described above in the third embodiment, in case the frame rate after conversion in the frame rate converting portion 2 is 60 frames and the substantial number of frames in the reproduction device 4 is 24P, reproduction speed is converted through duplication or deletion of frames in a set of signals of two different frames in respective inputted signals of 60 frames so as to obtain so-called 2-3 pull-down output in which the signal of the initial frame is repeated two times and the signal of the next frame is repeated three times or the signal of the initial frame is repeated three times and the signal of the next frame is repeated two times. Therefore, the substantial number of the signal of the frame rate identical with that of recording, i.e., the frame rate of 60P is changed to 24P without conversion of time axis through mere selection or duplication of the frames such that conversion of reproduction speed can be performed. Meanwhile, since 2-3 pull-down type output is obtained at all times, various reproduction video signals of 24P from slow motion to rapid feed can be handled as a signal format of 60P.

Meanwhile, in the third embodiment, the reproduction device 4 is provided with a circuit which operates as described above so as to convert reproduction speed. This circuit, needless to say, can be easily obtained by, for example, a circuit which reproduces a signal at a rate 60P identical with that of the input signal and write the signal in the frame memory, etc. so as to read the signal a plurality of times and a selector circuit or the like.

Fourth Embodiment

Figure 10:
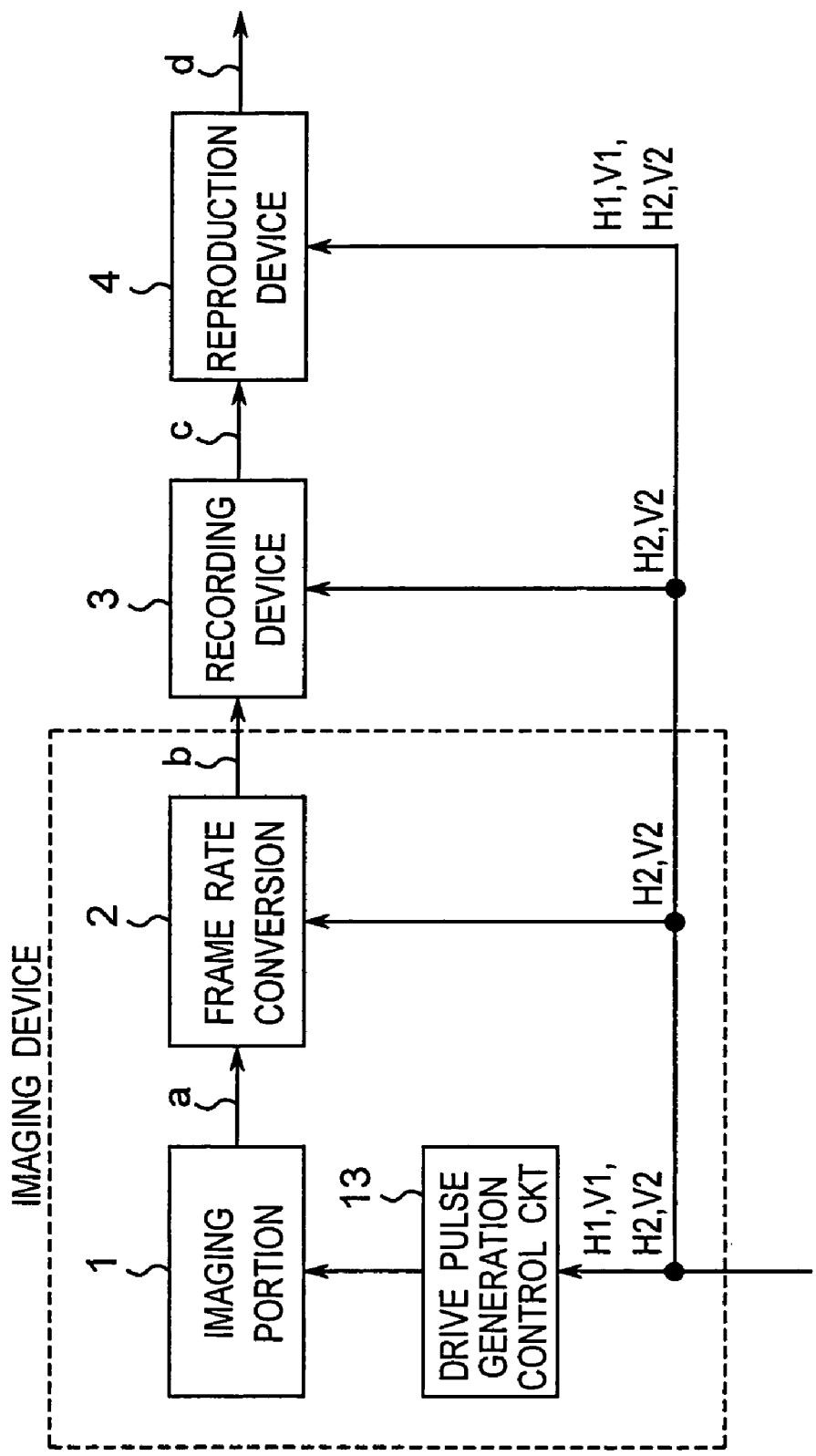
FIG. 10 is a block diagram showing a configuration of a video signal producing system according to a fourth embodiment of the present invention.

FIG. 10 is a block diagram showing a configuration of a video signal producing system according to a fourth embodiment of the present invention. In FIG. 10, "1" is an imaging portion for outputting P signals of various frame rates, "2" is a frame rate converting portion for converting the frame rates of the output signals of the imaging portion 1 to a predetermined frame rate, "3" is a recording device for recording output signals of the frame rate converting portion 2, "4" is a reproduction device for reproducing the signals recorded by the recording device 3 and "13" is a drive pulse generation control circuit for controlling drive pulses supplied to the imaging portion 1. In the fourth embodiment, the imaging portion 1 has a CCD type solid imaging element. The fourth embodiment is different from the first embodiment in that the drive pulse generation control circuit 13 performs characteristic operation in the imaging device formed by the imaging portion 1 and the frame rate converting portion 2. Other circuits are substantially identical with those of the first embodiment and the operations are also similar to those of the first embodiment.

Meanwhile, in FIG. 10, "H1" and "V1" are horizontal and vertical synchronous signals outputted from a synchronous signal generating portion (not shown) to the imaging portion 1 and "H2" and "V2" are horizontal and vertical synchronous signals after frame rate conversion in the same manner as the first embodiment of FIG. 1.

Figure 11:
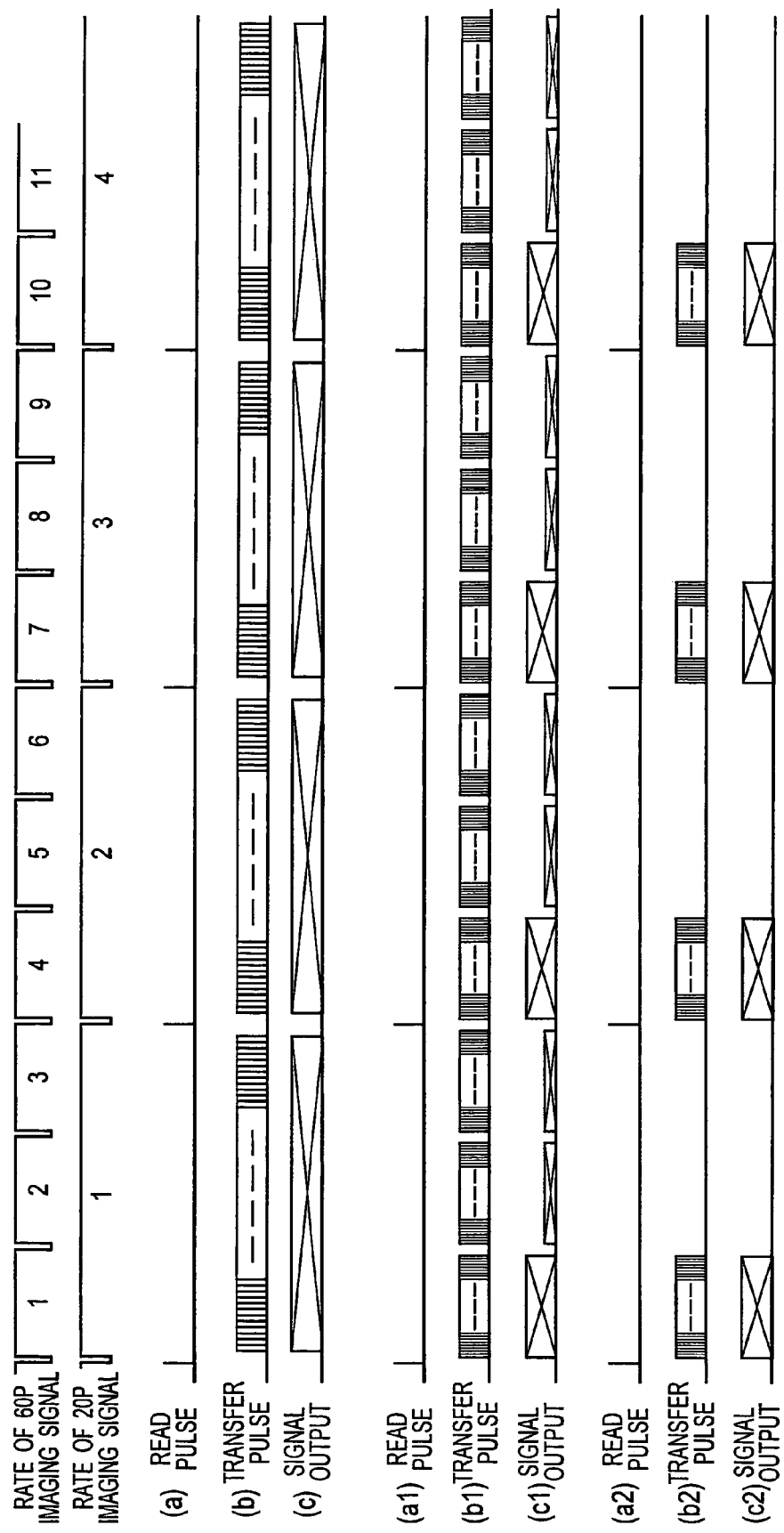
FIG. 11 is a signal wave-form diagram explanatory of operation of a drive pulse generation control circuit of the video signal producing system.
Figure 12:
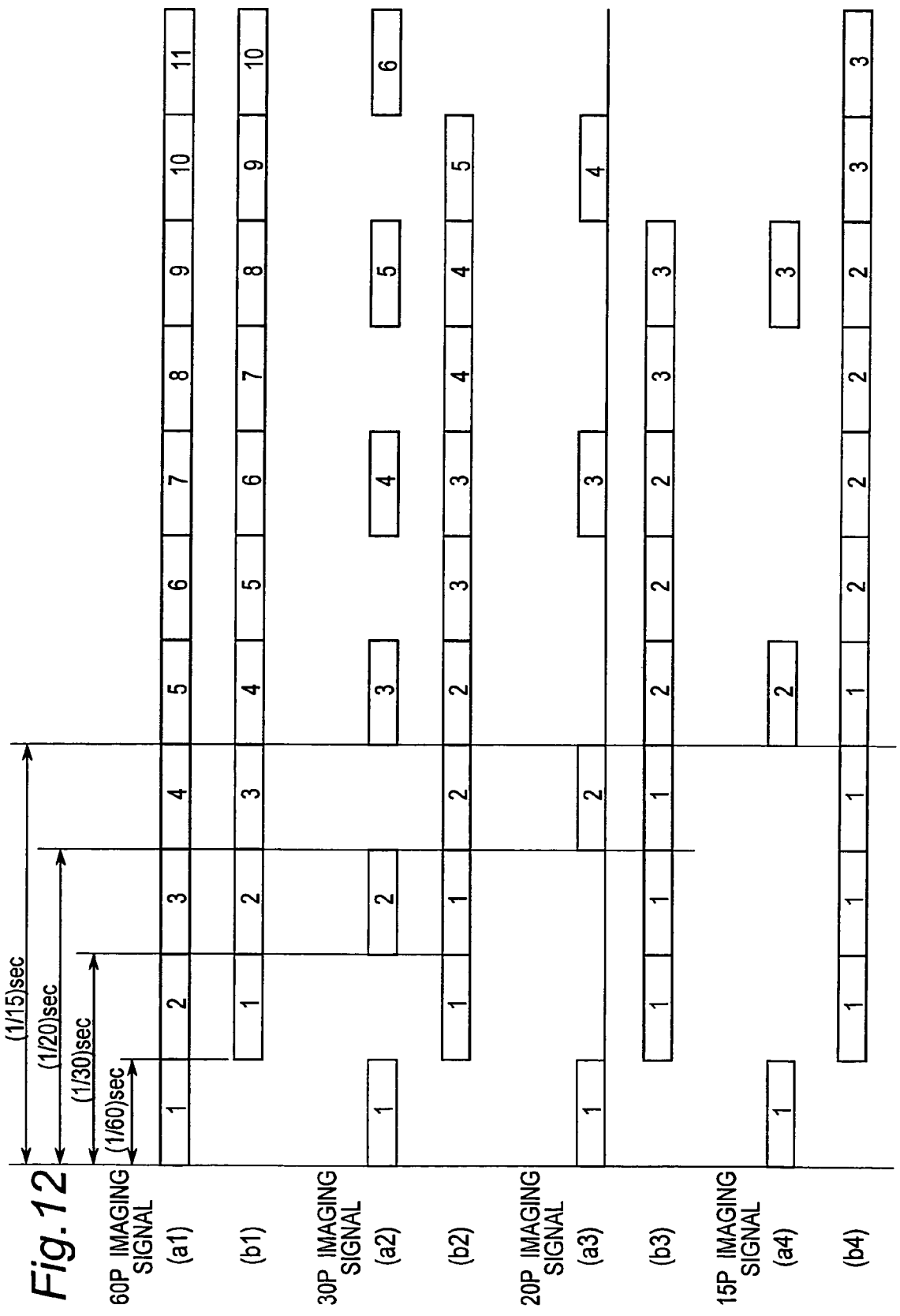
FIG. 12 is a signal conceptual view explanatory of output signals of an imaging portion and a frame rate converting portion of the video signal producing system of FIG. 10.
Figure 13:
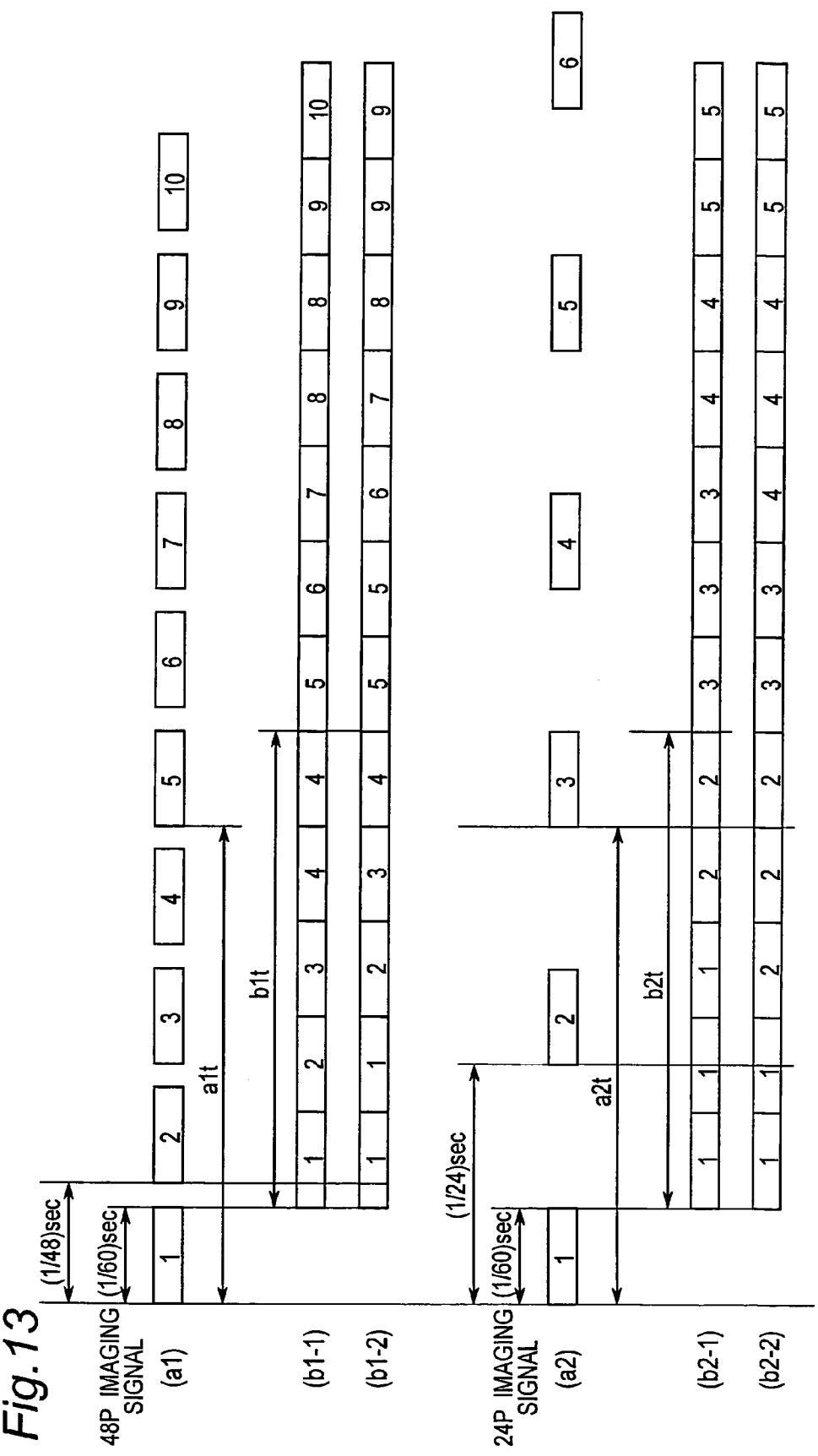
FIG. 13 is a signal conceptual view explanatory of output signals of the imaging portion and the frame rate converting portion of the video signal producing system of FIG. 10.

Hereinafter, operation of the video signal producing system of the above described arrangement is described with reference to FIGS. 11, 12 and 13. FIG. 11 is a signal waveform diagram explanatory of operation of the drive pulse generation control circuit 13, while FIGS. 12 and 13 are signal conceptual views explanatory of output signals of the imaging portion 1 and the frame rate converting portion 2.

In FIG. 11, (a), (b) and (c) show one example of CCD drive pulses in case the imaging signal has a rate of 20P. In this case, a read pulse of (a) is outputted at a rate of 20P such that an accumulation time is set to ½₀ sec. Meanwhile, a transfer pulse of (b) includes vertical and horizontal transfer pulses but is outputted such that transfer is completed by one frame of 20P. In addition, (c) shows a CCD signal output at this time. In this case, a CCD drive rate of ordinary 60P is simply set to its one-third in the drive pulses. In the imaging signals of the first and second embodiments, such drive signals are obtained as shown in FIGS. 4 and 8. Therefore, as frame rate of the imaging signal becomes lower, delay of the signal outputted from the frame rate converting portion 2 through conversion becomes larger.

Hence, in the fourth embodiment, drive pulses fed to the CCD are controlled by the drive pulse generation control circuit 13 so as to become pulses shown in (a1), (b1) and (c1) of FIG. 11. Namely, a read pulse of (a1) is likewise outputted at a rate of 20P such that an accumulation time is set to ½₀ sec. but a transfer pulse is outputted at a 3-fold speed such that transfer of a signal of one frame is completed at a rate of 60P. Thus, since the transfer pulse becomes as shown in (b1) and a signal output becomes as shown in (c1), a signal having a rate of 20P can be obtained during an interval of one frame having a rate of 60P. During the two subsequent frames, unnecessary signals irrelevant to the signals are outputted.

Meanwhile, in another control method of (a2), (b2) and (c2) of FIG. 11, a read pulse of (a2) is likewise outputted but a transfer pulse of only one frame is outputted. As a result, an output signal of (c2) is obtained.

By employing the above described drive method in the drive pulse generation control circuit 13, output signals of the imaging portion 1 and the frame rate converting portion 2 become as shown in FIGS. 12 and 13. Namely, (a1) to (a4) are imaging signals, while (b1) to (b4), (b1-1), (b1-2), (b2-1) and (b2-2) are signals after frame rate conversion. In the fourth embodiment, since all imaging signals of various frame rates are outputted at an interval of a frame rate of 60P imaging signals as will be seen from FIGS. 12 and 13, all output signals of the frame rate converting portion 2 have a delay time of one frame of 60P, so that delay of the output signals can be restrained and the delay amount can be made identical for the imaging signals of all rates. Meanwhile, by setting a rate of output signals of the imaging portion 1 and that of the frame rate converting portion 2 to 60P identically, timing, etc. of write and read of the frame memory are not required to be adjusted for a plurality of rates, so that circuit operation of the frame rate converting portion 2 can be stabilized.

Fifth Embodiment

FIG. 14 is a block diagram showing a configuration of a video signal producing system according to a fifth embodiment of the present invention. In FIG. 14, "1" is an imaging portion for outputting P signals of various frame rates, "2" is a frame rate converting portion for converting the frame rates of the output signals of the imaging portion 1 to a predetermined frame rate, "3" is a recording device for recording output signals of the frame rate converting portion 2, "4" is a reproduction device for reproducing the signals recorded by the recording device 3 and "14" is a flag signal generating portion for generating a flag signal indicative of changeover of frames in output signals of the frame rate converting portion 2. The fifth embodiment is different from the first embodiment in that the imaging device is provided with the flag signal generating portion 14 in addition to the imaging portion 1 and the frame rate converting portion 2. Other circuits are substantially identical with those of the first embodiment and the operations are also similar to those of the first embodiment.

Hereinafter, operation of the video signal producing system of the above described arrangement is described with reference to FIGS. 15 to 20. In the first embodiment, etc. of the present invention, the reproduction device 4 performs reproduction such that positions of frame changes in the reproduction device 4 are detected by either selecting necessary frame signals upon rules determined preliminarily based on the synchronous signals H1, V1, H2 and V2 or changing over frame selection by a switch in response to a frame rate of the imaging signal and a frame rate of the reproduction device 4. The fifth embodiment is designed to simplify such operation.

The flag signal generating portion 14 outputs a flag signal f indicative of a change of frames of signals outputted from the frame rate converting portion 2 and the flag signal f is also recorded in the recording device 3 in the same manner as the signals from the frame rate converting portion 2. On the basis of this flag signal f, the reproduction device 4 selects necessary frame signals and performs defined operations. Manner of generation of the flag signal is described with reference to FIGS. 15 to 18. FIGS. 15 and 17 show examples of an internal configuration of the flag signal generating portion 14. In FIGS. 15 and 17, "15" is a frequency division circuit, "16" is an OR circuit and "17" is a 1-bit counter.

For example, in case the frame rate converting portion 2 outputs at a rate of 60P as shown by (a) of FIG. 16 and the recording device 3 also records at a rate of 60P and the original frame rate of the imaging portion 1 is 20P as shown by (d) of FIG. 16, a signal of the recording device 3 reaches a state shown by (c) of FIG. 16. At this time, changeover of frames is performed as shown by (e) of FIG. 16 and thus, is obtained by frequency division of vertical synchronization of the original imaging signal. Points where this frequency division signal is changed over between low level and high level are changeover points of frames. In case output signals of the frame rate converting portion 2 have a frame rate of 60P and the original frame rate of the imaging portion 1 is (1/m) of 60P (m=integer≧1), for example, 20P, 30P, etc., the flag signal generating portion 14 can be easily formed by the frequency division circuit 15 shown in FIG. 15.

Meanwhile, when output signals of the imaging portion 1 include signals of 24P, 48P, etc. as illustrated in FIG. 7 of the second embodiment, the above described conditions do not apply. In this case, since changes of a read enable signal of the frame memory used in the frame rate converting portion 2, for example, changes of signals R1, R2 and R3 shown in (b) of FIG. 18 correspond to changeover of frames in the case of 48P, the changes are detected and the detection signals may be used as changeover signals of frames. For example, as shown by FIG. 17, the flag signal generating portion 2 can be easily formed by the OR circuit 16 and the 1-bit counter 17 for receiving, as clocks, output signals of the OR circuit 16. Low level and high level of an output ((c) of FIG. 18) of the 1-bit counter 17 may be made corresponding to a changeover signal ((d) of FIG. 18) of frames.

By such operation of the flag signal generating portion 14, the flag signal of frame changeover can be obtained for various rates of the imaging signals, output signals of the frame rate converting portion 2 and signals of the recording device 3 as shown in FIGS. 19 and 20. For example, in FIG. 19, (a1) and (a3) denote imaging signal outputs, (b1) and (b3) denote signals after frame rate conversion, (f1) and (f3) denote flag signals of frame changeover, while in FIG. 20, (a1) and (a2) denote imaging signal outputs, (b1-1) and (b2-1) denote signals after frame rate conversion and (f1-1) and (f2-1) denote flag signals of frame changeover.

As described above in the fifth embodiment, since the flag signal of frame changeover can be produced by the simple configuration and can be recorded in the recording device together with the imaging signal, such information as synchronous signals of the imaging portion 1 and the recording device 3 are not required to be supplied to the reproduction device 4 separately. Meanwhile, a switch for changing over operation in response to the frame rate of the imaging portion 1, etc. are not required to be provided in the reproduction device 4 and video signals can be reproduced automatically even if frame rate of the imaging portion 1 changes variously. As a result, signals indicative of changeover positions of frames can be obtained in the reproduction device 4.

Sixth Embodiment

Figure 21:
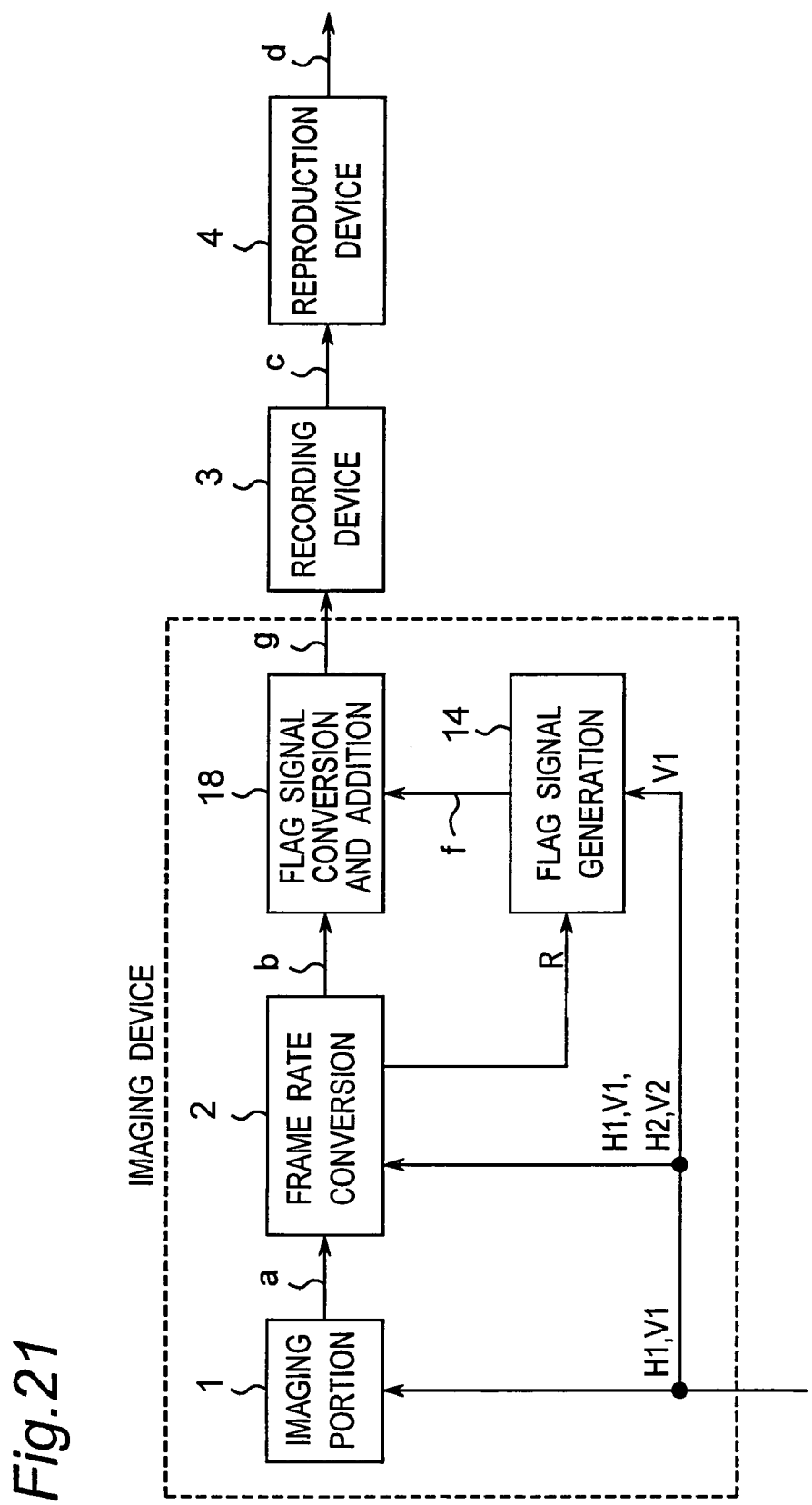
FIG. 21 is a block diagram showing a configuration of a video signal producing system according to a sixth embodiment of the present invention.

FIG. 21 is a block diagram showing a configuration of a video signal producing system according to a sixth embodiment of the present invention. In FIG. 21, "1" is an imaging portion for outputting P signals of various frame rates, "2" is a frame rate converting portion for converting the frame rates of the output signals of the imaging portion 1 to a predetermined frame rate, "3" is a recording device for recording output signals of the frame rate converting portion 2, "4" is a reproduction device for reproducing the signals recorded by the recording device 3, "14" is a flag signal generating portion for generating a flag signal indicative of changeover of frames in output signals of the frame rate converting portion 2 and "18" is a flag signal converting and adding portion for converting the flag signal outputted from the flag signal generating portion 14 so as to add the converted flag signal to a signal converted by the frame rate converting portion 2. The sixth embodiment is different from the first and fifth embodiments in that the imaging device is provided with the flag signal generating portion 14 and the flag signal converting and adding portion 18 in addition to the imaging portion 1 and the frame rate converting portion 2. Other circuits are substantially identical with those of the first and fifth embodiments and the operations are also similar to those of the first and fifth embodiments.

Hereinafter, operation of the video signal producing system of the above described arrangement is described with reference to FIGS. 22 to 24. FIG. 22 is a block diagram showing one example of an internal configuration of the flag signal converting and adding portion 18 and FIG. 23 is a view explanatory of conversion in the flag signal converting and adding portion 18. "19" is a delay circuit for imparting a predetermined delay time, "20" is an exclusive OR (EXOR) circuit and "21" is an adder. Meanwhile, FIG. 24 is a view explanatory of examples of addition of a flag signal to an imaging signal.

The flag signal converting and adding portion 18 is formed by, for example, a circuit shown in FIG. 22. At this time, if a flag signal f indicative of changeovers of frames as shown in FIG. 23A is inputted to the delay circuit 19, the flag signal f is delayed by a predetermined period, for example, a severalfold value of H (H=horizontal scanning interval) as shown in FIG. 23B. The EXOR circuit 20 processes this delay flag signal f1d and the original flag signal f so as to output a conversion signal f1 shown in FIG. 23C. This conversion signal f1 becomes high level during a severalfold period of H at a beginning and an end of each frame upon changeovers of frames. This conversion signal f1 is added by the adder 21 to the imaging signal subjected to frame and is outputted to the recording device 3.

FIG. 24 shows examples of addition of the converted flag signal f1 to the imaging signal in the case of the 48P imaging signal and the 24P imaging signal. Outputs of the imaging portion 1 are as shown in (a1) and (a2) of FIG. 24, respectively. These signals are converted to a frame rate of 60P by the frame rate converting portion 2. At this time, changeovers of frames are performed by output signals of the flag signal generating portion 14 as shown by (f1-1) and (f2-1) of FIG. 24. This signal is converted by the flag signal converting and adding portion 18 referred to above and is added to the output signal of the frame rate converting portion 2, so that signals of (g1) and (g2) of FIG. 24 are obtained. As will be apparent from these signals of (g1) and (g2), the flag signal is added to black solid portions corresponding to beginning portions of changeovers of frames (changeovers of frame numbers). These signals of (g1) and (g2) are recorded in the recording device 3.

The reproduction device 4 performs processings such as selection and duplication of frames on the basis of the flag signal recorded together with the signals and reproduces the 24P imaging signal in the same manner as the third embodiment or the fifth embodiment.

As described in the sixth embodiment of the present invention, since the flag signal indicative of changeovers of frames is added to the imaging signal itself so as to be recorded, such information as synchronous signals of the imaging portion 1 and the recording device 3 are not required to be supplied to the reproduction device 4 separately and a switch for changing over operation in response to the frame rate of the imaging portion 1, etc. are not required to be provided in the reproduction device 4. Meanwhile, video signals can be reproduced automatically even if frame rate of the imaging portion 1 changes variously. As a result, signals indicative of changeover positions of frames can be obtained from the recording signal in the reproduction device 4.

Furthermore, in comparison with the fifth embodiment, an interface for the flag signal necessary in addition to the signals, a delay circuit between the imaging device and the recording device, a delay circuit for imparting an identical delay time to a processing time of the imaging signal up to recording of the recording device, etc. are not required to be provided between the imaging device and the recording device and circuit configuration is simplified.

Meanwhile, it is needless to say that a delay amount of the delay circuit 19 of the flag signal converting and adding portion 18 is not limited to the severalfold value of H in this embodiment but may be set to any proper value detectable by the reproduction device 4. In addition, any proper position other than an effective time of the imaging signal may be, needless to say, employed as positions for adding the flag signal to the imaging signal.

Seventh Embodiment

Figure 25:
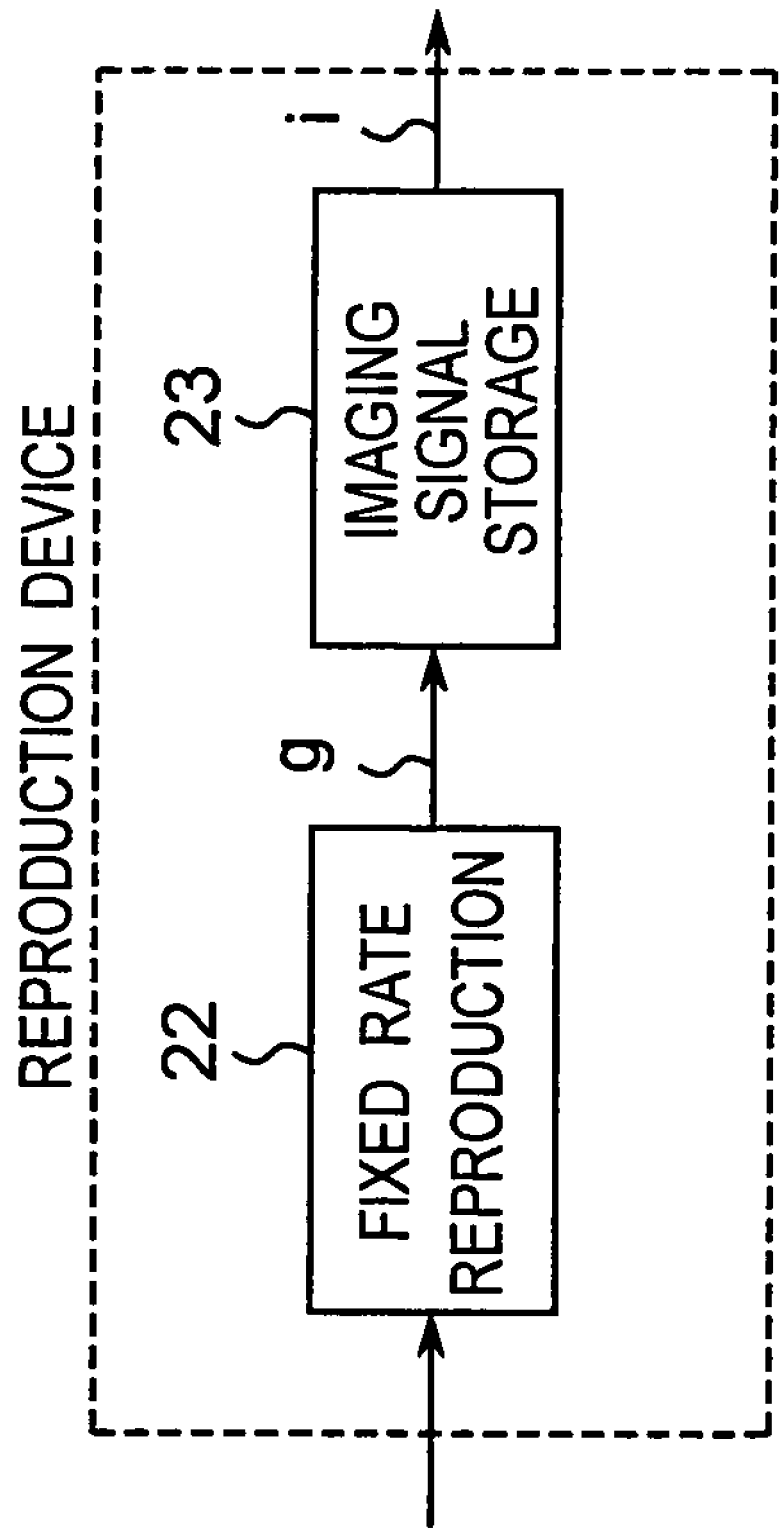
FIG. 25 is a block diagram showing a configuration of a reproduction device of a video signal producing system according to a seventh embodiment of the present invention.

FIG. 25 is a block diagram showing a configuration of a reproduction device of a video signal producing system according to a seventh embodiment of the present invention. In FIG. 25, "22" is a fixed rate reproduction portion for reproducing the imaging signal and the flag signal at a fixed rate and "23" is an imaging signal storage portion for storing only imaging signals in which frames have been changed over by the flag signal. The seventh embodiment is different from the fifth and sixth embodiments in that the fixed rate reproduction portion 22 and the imaging signal storage portion 23 are provided in the reproduction device. Other circuits and the operations are similar to those of the fifth and sixth embodiments.

Figure 26:
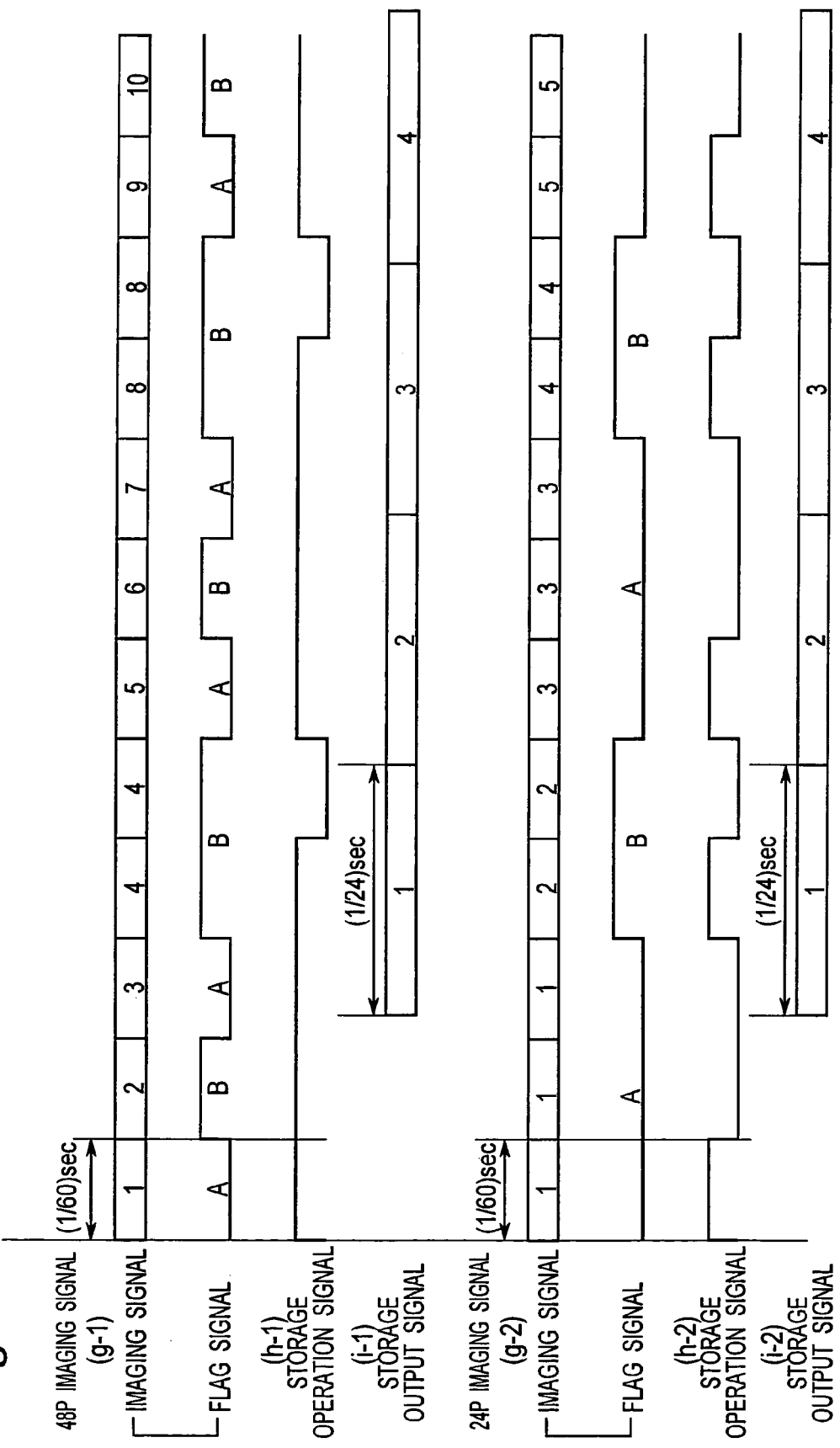
FIG. 26 is a signal conceptual view explanatory of operation of the video signal producing system of FIG. 25.

Hereinafter, operation of the video signal producing system of the above described arrangement is described with reference to FIG. 26. FIG. 26 is a view explanatory of operations of the fixed rate reproduction portion 22 and the imaging signal storage portion 23 at the time the imaging signal is of 48P and 24P, a frame rate after conversion in the frame rate converting portion 2 is 60P and an output signal of the reproduction device 4 is of 24P. The fixed rate reproduction portion 22 outputs the imaging signal and the flag signal at a rate of 60P in the same manner as recording in the recording device 3. In FIG. 26, (g-1) and (g-2) denote outputs of the fixed rate reproduction portion 22 in the case where the original imaging signal is a 48P imaging signal and a 24P imaging signal, respectively. The image signal storage portion 23 stores only frames which have been changed over by the flag signal. In FIG. 26, (h-1) and (h-2) illustrate storage operations in the imaging signal storage portion 23 in the case where the original imaging signal is the 48P imaging signal and the 24P imaging signal, respectively such that only frames having a high-level signal are stored. The imaging signal storage portion 23 outputs the imaging signal at a fixed frame rate of 24P. In FIG. 26, (i-1) and (i-2) represent output signals of the imaging signal storage portion 23 in the case where the original imaging signal is the 48P imaging signal and the 24P imaging signal, respectively. As a result, a reproduction signal having the fixed rate can be obtained in the reproduction device 4.

As described above in the seventh embodiment, the imaging signal storage portion 23 stores and outputs only the necessary frames after reproduction of the fixed rate reproduction portion 22 at the fixed frame rate in the reproduction device 4. Thus, in case the recording device 3 is formed by, for example, a VTR, a conventional VTR having a fixed frame rate can be used as the fixed rate reproduction portion 22, so that the system can be manufactured at low cost.

Meanwhile, the imaging signal storage portion may store the imaging signal temporarily and can be easily formed by a hard disc, a semiconductor memory or the like apparently. If peripheral devices for making checkups of the imaging devices, etc. are taken into consideration, it is needless to say that 2-3 pull-down format (60P frame rate) in which the output of the frame rate converting portion 2 is of 60P and the output of the reproduction device 4 is of 24P for obtaining video signals is preferable in all the embodiments.

Meanwhile, in the first to seventh embodiments, if the output signal of the reproduction device 4 is a 24P signal of the 2-3 pull-down format (60P frame rate), conversion to the original video signal having the frame rate of 24P can be, needless to say, performed easily by reverse 2-3 pull-down processing.

Moreover, in the first to seventh embodiments, the recording device and the reproduction device are not limited to a VTR built-in imaging device or a stationary VTR but may be a nonlinear device such as a hard disc or a disc apparatus such as an optical disc.

Eighth Embodiment

Figure 27:
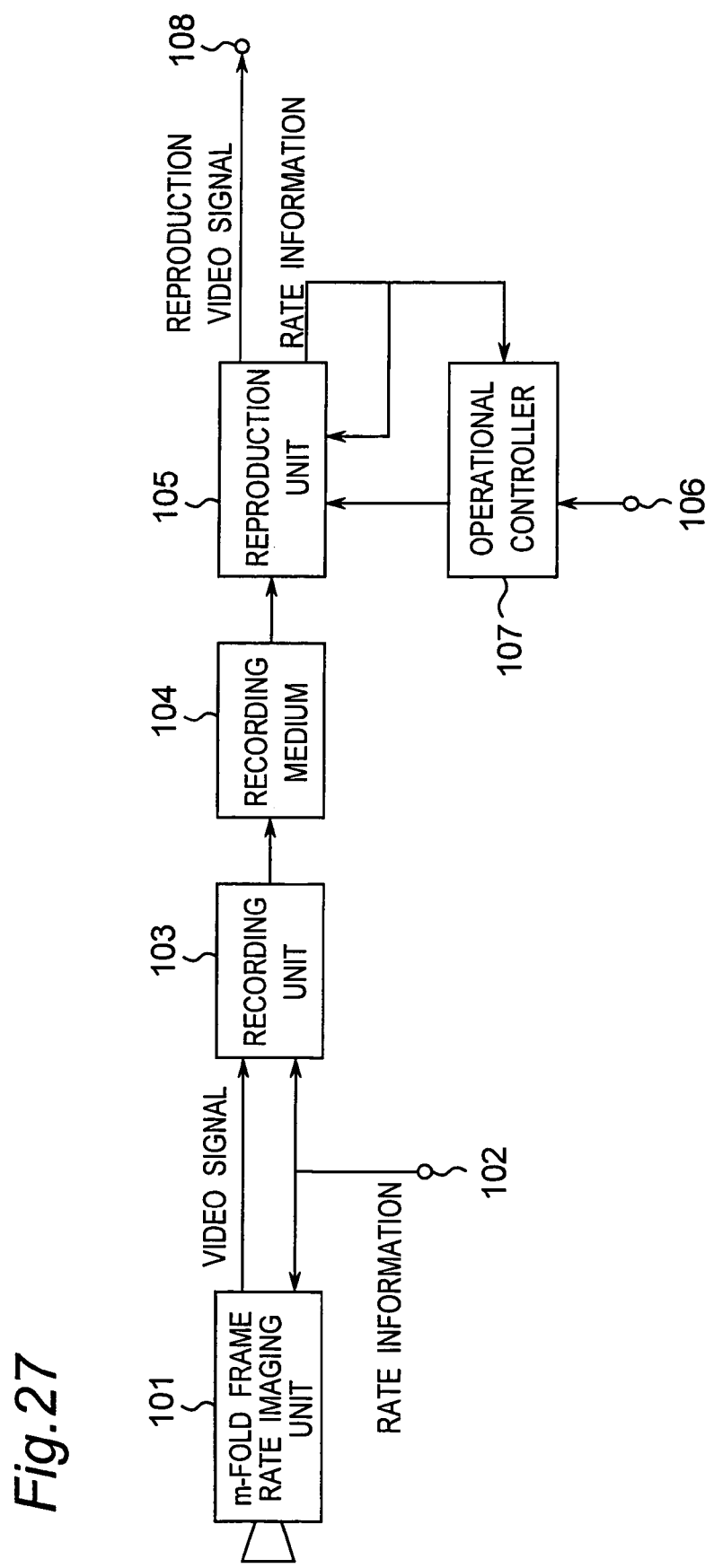
FIG. 27 is a block diagram of a video signal recording and reproducing apparatus of a video signal producing system according to an eighth embodiment of the present invention.

FIG. 27 is a block diagram showing a configuration of a video signal recording and reproducing apparatus of a video signal producing system according to an eighth embodiment of the present invention. In FIG. 27, "101" is an m-fold frame rate imaging unit which images at a frame rate of an m (m>0) multiple of a standard frame rate (the number of frames per second) of a recording format so as to output the signal, "102" is a rate information input terminal for inputting rate information, "103" is a recording unit for converting into recording information the video signal imaged by the m-fold frame rate imaging unit 101 and the rate information inputted from the rate information input terminal 102 so as to record the recording information in a recording medium 104, "105" is a reproduction unit for reproducing the video signal and the rate information from the recording medium 104, "106" is an operational information input terminal for inputting operational information, "107" is an operational controller for controlling the reproduction unit 105 in accordance with the operational information inputted from the operational information input terminal 106 and rate information obtained from the reproduction unit 105 and "108" is an output terminal for outputting a reproduction video signal.

Hereinafter, operation of the video signal recording and reproducing apparatus of the above described arrangement is described. In this embodiment, the standard frame rate of the recording format is set at 24 Hz. Meanwhile, a video signal format for recording is a progressive video signal format in which one frame acts as a unit of recording and display. Furthermore, a VTR in which a recording and reproducing head is mounted on a rotary cylinder and information is recorded on a magnetic tape by helical scanning of the recording and reproducing head is supposed to form a recording and reproducing portion. In case recording and reproduction are performed at the standard frame rate (standard speed), rate information indicative of a frame rate directly or indirectly, here, a rate "m" relative to 1 corresponding to the standard frame rate is inputted from the rate information input terminal 102 and the m-fold frame rate imaging unit 101 performs imaging by setting m to 1 so as to output video information of 24P, namely, at a frame rate of 24 Hz. The recording unit 103 converts into the recording information to be recorded on the recording medium 104, the video information output from the m-fold frame rate imaging unit 101 and the rate information from the rate information input terminal 102 and records the recording information in the recording medium 104 sequentially.

In conversion of the video information and recording in the recording medium 104 by the recording unit 103 in the case of, for example, digital VTR (DV) of SMPTE 306M Standards, which is widely used from field of consumer electronics to broadcasting business, shuffling is performed in which the order of video information of one frame is rearranged by using predetermined pixel blocks as a unit. Then, high-frequency encoding for reducing information amount to a predetermined amount at a unit of predetermined pixel blocks and error correction encoding for preliminarily adding redundant data for error correction so as to prevent occurrence of errors due to missing of video information data, etc. during reproduction are performed. Furthermore, after channel coding for performing conversion into codes enabling efficient recording on the magnetic tape has been performed, recording is performed on the magnetic tape by helical scanning of the magnetic tape via a recording amplifier and the recording head. As a result, a series of processings have been completed.

At this time, the recording unit 103 of this embodiment processes the input video information and the rate information as described above and adjusts the number of revolutions of helical scanning of the recording and reproducing head, a feed rate of the magnetic tape acting as the recording medium 104, etc. such that the output of the recording unit 103 is recorded on the recording medium 104 at a period of 24 Hz. In this embodiment, the rate information from the rate information input terminal 102 is adapted to be preliminarily stored at a predetermined location of the recording information outputted from the recording unit 103. The storage location of the rate information may be any location from which the rate information can be fetched properly and timely when necessary at the time of reproduction. For example, in a DV type VTR, a user's bit pack of a time code in a sub-code may be employed as the storage location. During reproduction, the reproduction unit 105 obtains the reproduction video signal from the recording medium 104 in the reverse order of recording and, at the same time, fetches the rate information stored at the predetermined location of the reproduction video signal so as to input the rate information to the operational controller.

The operational controller 107 controls the reproduction unit 105 on the basis of the operational information from the operational information input terminal 106 and the rate information obtained from the reproduction unit 105 such that the reproduction video signal of a predetermined frame rate is obtained from the output terminal 108. Input from the operational information input terminal 106 corresponds to setting of a reproduction speed, etc. by an operator. For example, if the operational information from the operational information input terminal 106 designates reproduction at the standard frame rate, the inputted rate information is (m=1), so that the operational controller 107 adjusts the number of revolutions of helical scanning of the recording and reproducing head and the feed rate of the magnetic tape in the reproduction unit 105 such that the reproduction unit 105 reproduces the recording information from the recording medium 104 at a period of 24 Hz.

Then, a case of slow motion video production is described in which a video signal having a frame rate of 30 Hz is recorded and a signal having a frame rate of 24 Hz is obtained by performing (4/5)-fold speed slow reproduction. In this case, the rate information from the rate information input terminal 102 is set to, for example, (m=5/4) and the m-fold frame rate imaging unit 101 performs imaging at a frame rate of 30 Hz from (24×5/4). Then, the video information and the rate information are recorded on the recording medium 104 by the recording unit 103 in the same manner as recording and reproduction at the standard frame rate. However, at this time, the number of revolutions of helical scanning and the feed rate of the magnetic tape in the recording unit 103 is also set to 30 Hz such that signal recording is performed on the recording medium 104.

Figure 28:
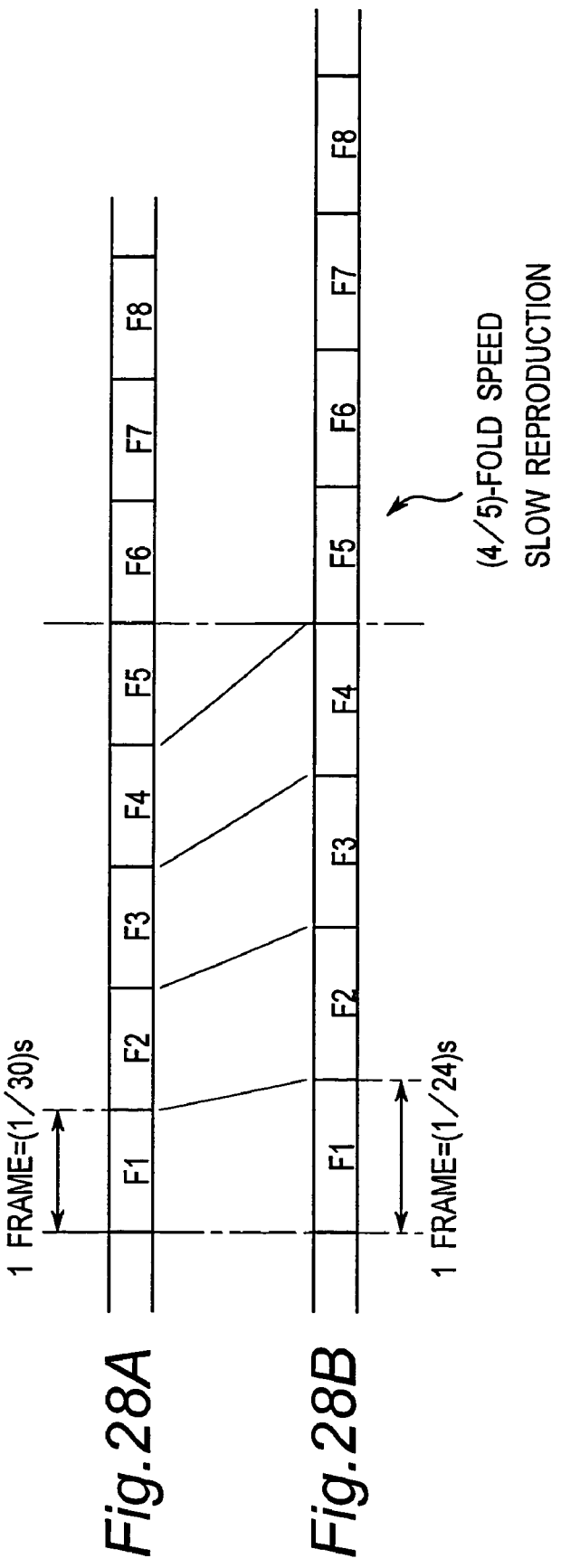
FIGS. 28A and 28B are conceptual views of recording video signal wave form and reproduction video signal wave form of the video signal recording and reproducing apparatus of FIG. 27.

FIG. 28A is a conceptual view of wave form of the recording video signal at (m=5/4). As shown in FIG. 28A, one frame spans (1/30) sec. and F1, F2, - - - illustrate each of frames. During reproduction, the video information and the rate information are reproduced in the same manner as recording and reproduction at the standard frame rate. However, if the operational information from the operational information input terminal 106 designates reproduction at the standard frame rate of 24 Hz, the operational controller 107 adjusts the number of revolutions of helical scanning of the recording and reproducing head and the feed rate of the magnetic tape in the reproduction unit 105 and the reproduction unit 105 reproduces the recording information from the recording medium 104 at the standard frame rate of 24 Hz so as to obtain the reproduction video signal in the reverse order of recording and outputs the reproduction video signal from the output terminal 108. At this time, the reproduction video signal exhibits a slow motion video having a speed equal to (4/5) of that of recording. FIG. 28B is a conceptual view of wave form of the reproduction video signal reproduced at the standard frame rate. As shown in FIG. 28B, one frame spans (1/24) sec. and F1, F2, illustrate each of frames.

In the operational controller 107, the recording rate information of (m=5/4) fetched by the reproduction unit 105 is obtained. Hence, it can be easily recognized from only the reproduction information from the recording medium 104 that if reproduction is performed at a period of 24 Hz, the slow motion video of (4/5)-fold speed is obtained.

On the other hand, if reproduction is set at, for example, the same frame rate (motion speed) as that of recording by the operational information from the operational information input terminal 106, reproduction rate information is (m=5/4), so that the number of revolutions of helical scanning of the recording and reproducing head and the feed rate of the magnetic tape in the reproduction unit 105 are automatically adjusted by the control information from the operational controller 107 such that the recording information is reproduced from the recording medium 104 at a period of 30 Hz. Consequently, reproduction can be performed at the same frame rate as that of recording.

As described above, if the rate information indicating at which multiple of the standard frame rate imaging and recording have been performed is recorded on the recording medium 104 together with the video signal, the rate information at the time of recording is obtained at the time of reproduction, so that it becomes easy to set the reproduction speed at a predetermined value.

Meanwhile, in this embodiment, a case has been described in which imaging is performed at high speed beforehand and reproduction is performed at the standard frame rate such that the slow motion video is obtained. The same applies to a case in which imaging is performed at low speed and reproduction is performed at the standard frame rate such that high speed motion is obtained and other speeds can be easily obtained in a similar procedure without the need for fine manual setting.

Meanwhile, the rate information is m itself indicative of the ratio of the recording frame rate to the standard frame rate but may also indicate the recording frame rate itself without indicating a frequency relation relative to the standard frame rate.

The rate information can be stored in the user's bit pack of the time code in the sub-code as described above but may be stored at any location from which the rate information can be fetched timely when necessary.

Meanwhile, as described above, recording is performed on the recording medium 104 at the frame frequency identical with the frame rate of the recording video signal, which is set by the rate information. However, by dividing information in one frame by n (n=1, 2, ---), recording and reproduction may also be performed at a frequency equal to an n multiple of the frame rate of the recording video signal.

Meanwhile, in this embodiment, the standard frame rate of the recording format is 24 Hz. However, other frame rates than 24 Hz bring about effects of this embodiment.

Ninth Embodiment

Figure 29:
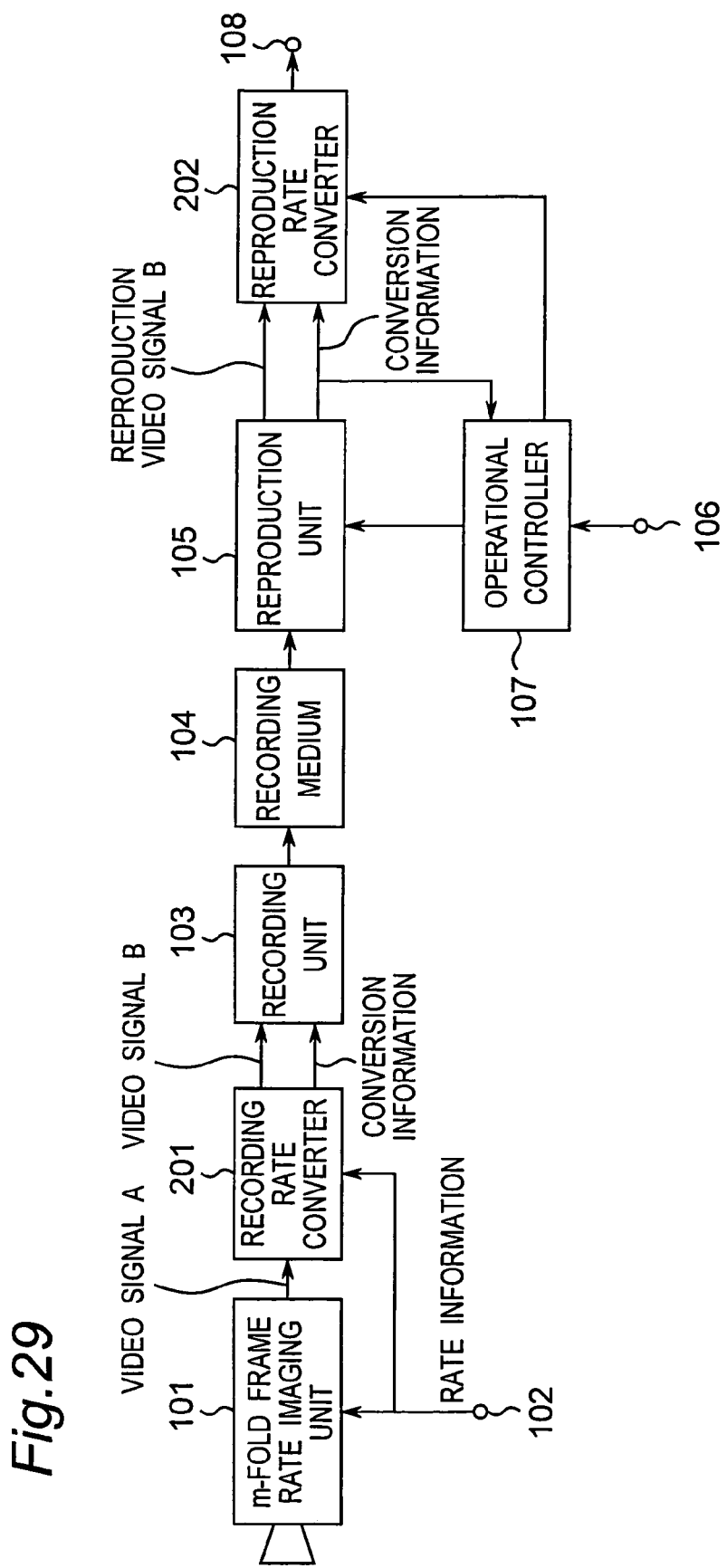
FIG. 29 is a block diagram of a video signal recording and reproducing apparatus of a video signal producing system according to a ninth embodiment of the present invention.

FIG. 29 is a block diagram showing a configuration of a video signal recording and reproducing apparatus of a video signal producing system according to a ninth embodiment of the present invention. In FIG. 29, blocks operating in the same manner as those of the video signal recording and reproducing apparatus of the eighth embodiment are designated by identical numerals and the description is abbreviated.

In FIG. 29, "201" is a recording rate converter which performs rate conversion of a video signal A imaged by the m-fold frame rate imaging unit 101 in accordance with the rate information from the rate information input terminal 102 so as to output a video signal B subjected to rate conversion and conversion information and "202" is a reproduction rate converter which receives the reproduction video signal B and the conversion information reproduced by the reproduction unit 105 so as to convert the reproduction rate of the reproduction video signal B under control of the operational controller 107.

Hereinafter, operation of the video signal recording and reproducing apparatus of the above described arrangement is described. In this embodiment, the standard frame rate of the recording format is set at 60 Hz. A video signal format is a progressive video signal format in which one frame acts as a unit of recording and display. Moreover, in the recording unit 103, the video signal of the signal format having the frame rate of 60 Hz is recorded at the standard speed. In case the input signal whose frame rate is not 60 Hz is recorded, the frame rate is converted to 60 Hz by the recording rate converter 201 and then, recording is performed. Meanwhile, a VTR in which information is recorded on the magnetic tape by helical scanning of the recording and reproducing head is supposed to form a recording and reproducing portion.

Initially, in case imaging is performed at a frame rate of 24P and then, recording is performed at the standard frame rate of 60 Hz of the recording format, the rate information indicative of the frame rate directly or indirectly is inputted from the rate information input terminal 102. The m-fold frame rate imaging unit 101 performs imaging by setting m to (2/5) (=24/60) in accordance with the rate information and outputs the video signal A of 24 Hz. In this embodiment, m itself is employed as the rate information.

Figure 30:
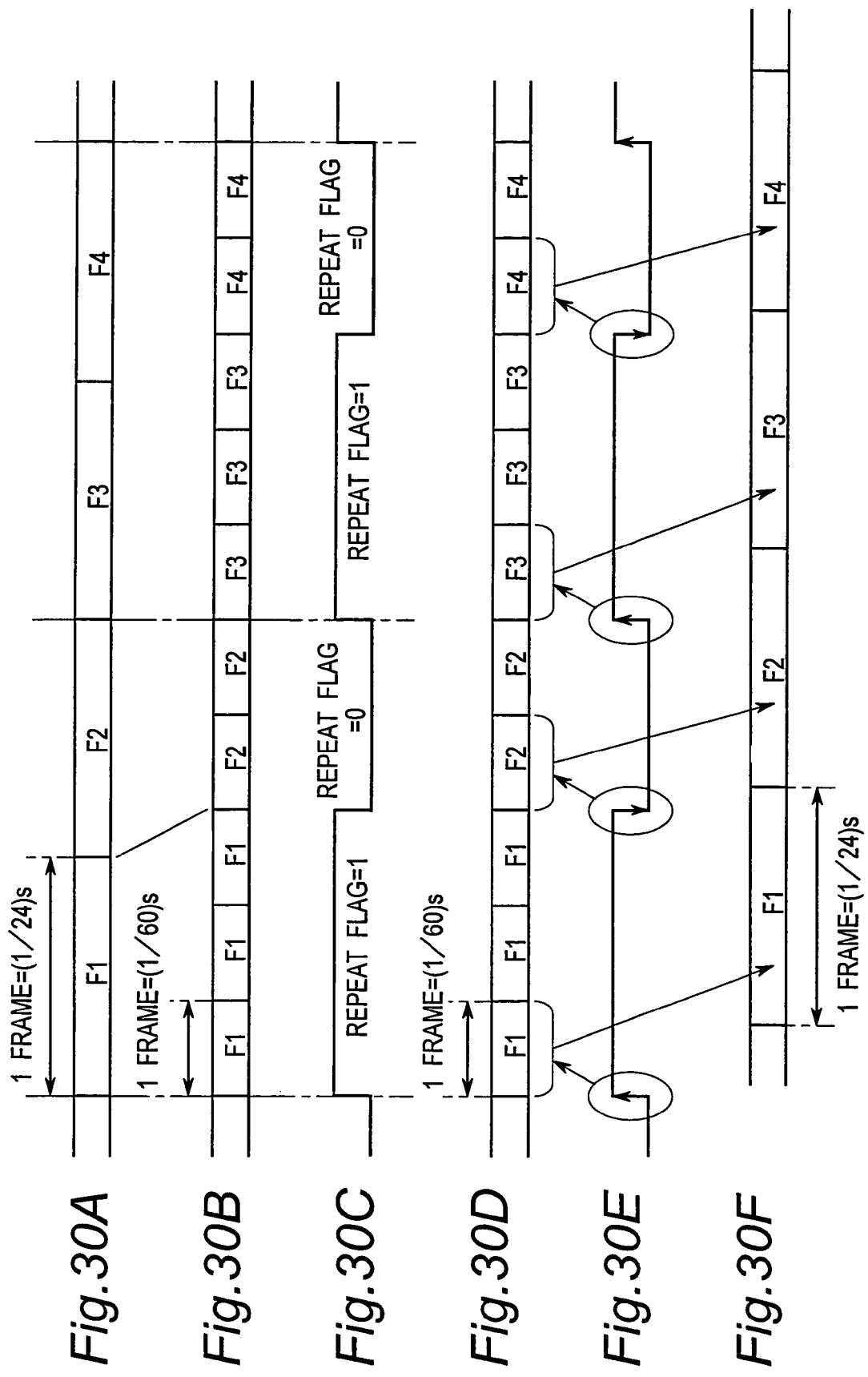
FIGS. 30A-30F are conceptual views of recording video signal wave form, reproduction video signal wave form and conversion information wave form during shooting of the video signal recording and reproducing apparatus of FIG. 29 at an ordinary frame rate.

The recording rate converter 201 performs, on the basis of the rate information inputted from the rate information input terminal 102, rate conversion of the video signal A inputted from the m-fold frame rate imaging unit 101 so as to obtain the video signal B and outputs the video signal B. FIG. 30 is a conceptual view of recording video signal wave form, reproduction video signal wave form and conversion information wave form during shooting of the video signal recording and reproducing apparatus of this embodiment at an ordinary frame rate. In this embodiment, as shown in FIG. 30B, for example, operation of repeatedly inserting a video signal having one frame of (1/24) sec. periodically is performed in the video signal A of FIG. 30A and one frame is outputted in (1/60) sec. so as to obtain the video signal B having the recording frame rate of 60 Hz.

As a concrete example of (m=2/5) in a method of converting the number of frames, in which the frame rate of the output video signal (video signal B) is set to the standard frame rate of 60 Hz of the recording format, 5 frames are outputted during an interval of 2 frames of the input video signal (video signal A) from (1/m=5/2) as shown in FIG. 30B. To this end, for example, if an odd-numbered frame is repeated three times and an even-numbered frame is repeated two times and one frame is outputted in (1/60) sec., the frame rate of 60 Hz can be obtained. The recording rate converter 201 not only outputs the video signal B but outputs, as the conversion information, to the subsequent stage repeat flags (FIG. 30C) acting as conversion flags indicative of positions of changes of contents of the video signal B between neighboring ones of the video frames outputted continuously in the video signal B and the rate information of (m=2/5). One-bit information is allocated to the repeat flags such that the repeat flags assume "1" for the frames having the identical video signal contents, i.e., the frames F1 in FIG. 30B, "0" for the subsequent frames having the identical video signal contents, i.e., the frames F2 in FIG. 30B and "1" for the further subsequent frames having the identical video signal contents, i.e., the frames 3 in FIG. 30B.

The recording unit 103 converts into the recording information to be recorded on the recording medium 104, the video signal B and the conversion information from the recording rate converter 201 and records the recording information in the recording medium 104 sequentially. Conversion of the video signal and recording in the recording medium 104 by the recording unit 103 are performed in the same manner as the eighth embodiment of the present invention. Storage of the conversion information is also performed in the same manner as storage of the rate information of the eighth embodiment of the present invention.

During reproduction, the information recorded on the recording medium 104 is reproduced by the reproduction unit 105 and the video signal B is outputted in the reverse operation of recording. At the same time, the conversion information stored at the predetermined location is separated and outputted. At this time, if output from the output terminal 108 is set by the operational information from the operational information input terminal 106 so as to be generated at 24 Hz identical with the imaging rate at the time of recording, the operational controller 107 controls the reproduction unit 105 on the basis of the rate information (m) in the conversion information such that the reproduction unit 105 reproduces information in a (24/60)×(1/m)-fold speed special reproduction mode. The frame rate of the reproduction video signal outputted from the reproduction unit 105 is 60 Hz at all times. In the case of (m=2/5), a wave form conceptual view (FIG. 30D) of the reproduction video signal B is exactly the same as the wave form conceptual view (FIG. 30B) of the video signal B at the time of recording. Meanwhile, the repeat flags fetched simultaneously from the reproduction conversion information are shown in FIG. 30E.

In the reproduction rate converter 202, two frames are selected from five frames in the inputted reproduction video signal B shown in FIG. 30D so as to be outputted. More specifically, in simultaneously inputted repeat flags shown in FIG. 30E, time axis of only an initial frame subsequent to each of points of changes of values of the repeat flags is expanded so as to be converted to the video signal of 24 Hz as shown in FIG. 30F such that the video signal of 24 Hz is outputted to the output terminal 108. In this embodiment, FIGS. 30A and 30F illustrate the video signal of 24P identically.

Figure 31:
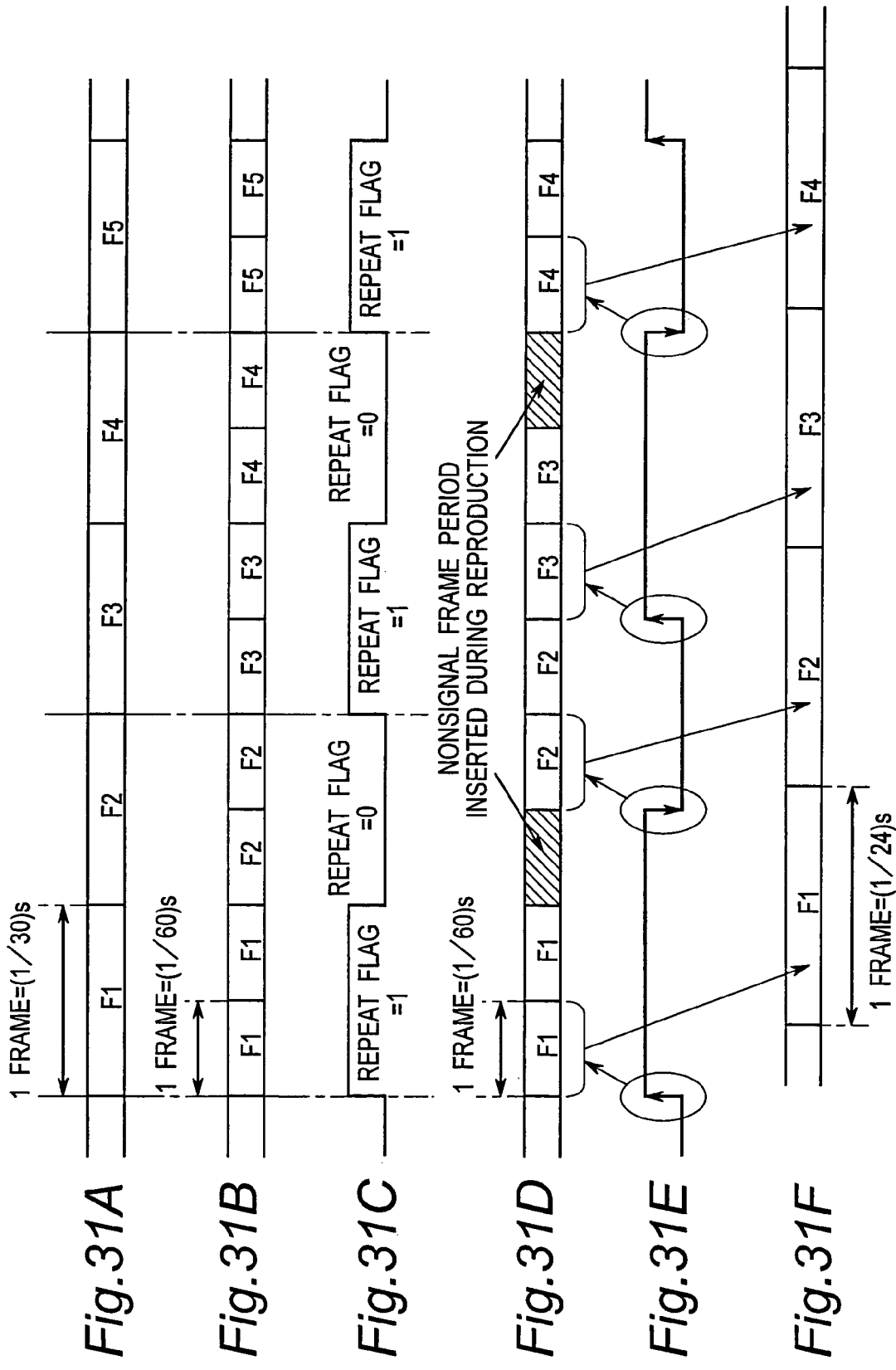
FIGS. 31A-31F are conceptual views of recording video signal wave form, reproduction video signal wave form and conversion information wave form during slow motion shooting of the video signal recording and reproducing apparatus of FIG. 29.

Then, a case of slow motion video production in which a video signal having a frame rate of 30 Hz is recorded and a slow motion video signal having a frame rate of 24 Hz is obtained by performing (4/5)-fold speed slow reproduction is described with reference to FIG. 31. FIG. 31 is a conceptual view of recording video signal wave form, reproduction video signal wave form and conversion information wave form during slow motion shooting of the video signal recording and reproducing apparatus of this embodiment. Initially, the rate information from the rate information input terminal 102 is (m=1/2) and imaging is performed at a frame rate of 30 (=60×1/2) Hz by the m-fold frame rate imaging unit 101 as shown in FIG. 31A. Then, in the recording rate converter 201, each frame of the video signal A inputted to the recording rate converter 201 is repeated two times from (1/m=2) based on the simultaneously inputted rate information (m=1/2) and one frame is outputted at a frame rate of (1/60) sec. in the same manner as the eighth embodiment, so that the converted video signal B having a frame rate of 60 Hz can be obtained as shown in FIG. 31B. Subsequently, in the recording unit 103, the video signal B from the recording rate converter 201 and the conversion information composed of the rate information m and the repeat flags of FIG. 31C in the recording rate converter 201 are converted into the recording information to be recorded on the recording medium 104 in the same manner as the eighth embodiment and then, the recording information is sequentially recorded on the recording medium 104.

During reproduction, the information recorded on the recording medium 104 is reproduced by the reproduction unit 105 and the reproduction video signal B is outputted by the reverse operation of recording. At the same time, the conversion information stored at the predetermined location is also separated and outputted. At this time, if output from the output terminal 108 is set by the operational information from the operational information input terminal 106 so as to be generated at a frame rate of 24 Hz, the rate information in the reproduced conversion information is (m=1/2), so that the operational controller 107 controls the reproduction unit 105 such that the reproduction unit 105 initially performs special reproduction of the information at a (4/5)-fold speed from {(2/5)×(1/m)=4/5} for the purpose of outputting the information.

In case the reproduction unit 105 outputs (4/5)-fold speed slow reproduction at a frame rate of 60 Hz, a method may be employed in which after four frames of the video signal have been outputted by outputting one frame at an interval of (1/60) sec., there is no output during a period of one frame by, for example, feeding the magnetic tape intermittently in the reproduction unit 105. Output wave form of the reproduction video signal B obtained by this method is shown in FIG. 31D. Meanwhile, repeat flags fetched from the reproduction conversion information together with the reproduction video signal B are shown in FIG. 31E. In the repeat flags of FIG. 31E inputted simultaneously with the reproduction video signal B of FIG. 31D in the reproduction rate converter 202, if time axis of only an initial frame subsequent to each of points of changes of values of the repeat flags is expanded as shown in FIG. 31F, the video signal having a frame rate of 24 Hz is obtained and outputted to the output terminal 108.

By the above described operation, since the video signal having the frame rate of 30 Hz is outputted through expansion to the frame rate of 24 Hz, the (4/5)-fold speed slow motion video can be obtained.

Meanwhile, in this embodiment, when the slow motion video is obtained a case in which intermittent reproduction is performed in the reproduction unit 105 so as to obtain the signal wave form shown in FIG. 31D has been described as an example. Alternatively, the previous frame may also be outputted at an intermittent interval of (1/60) sec. Furthermore, any method may be employed in which the reproduction video signal B has output timing such that frames of the reproduction video signal B are inputted at a timing required by the reproduction rate converter 202. For example, there is a method in which the necessary information is obtained in a predetermined period by performing nontracking reproduction of the recording medium 104 in the reproduction unit 105.

Figure 32:
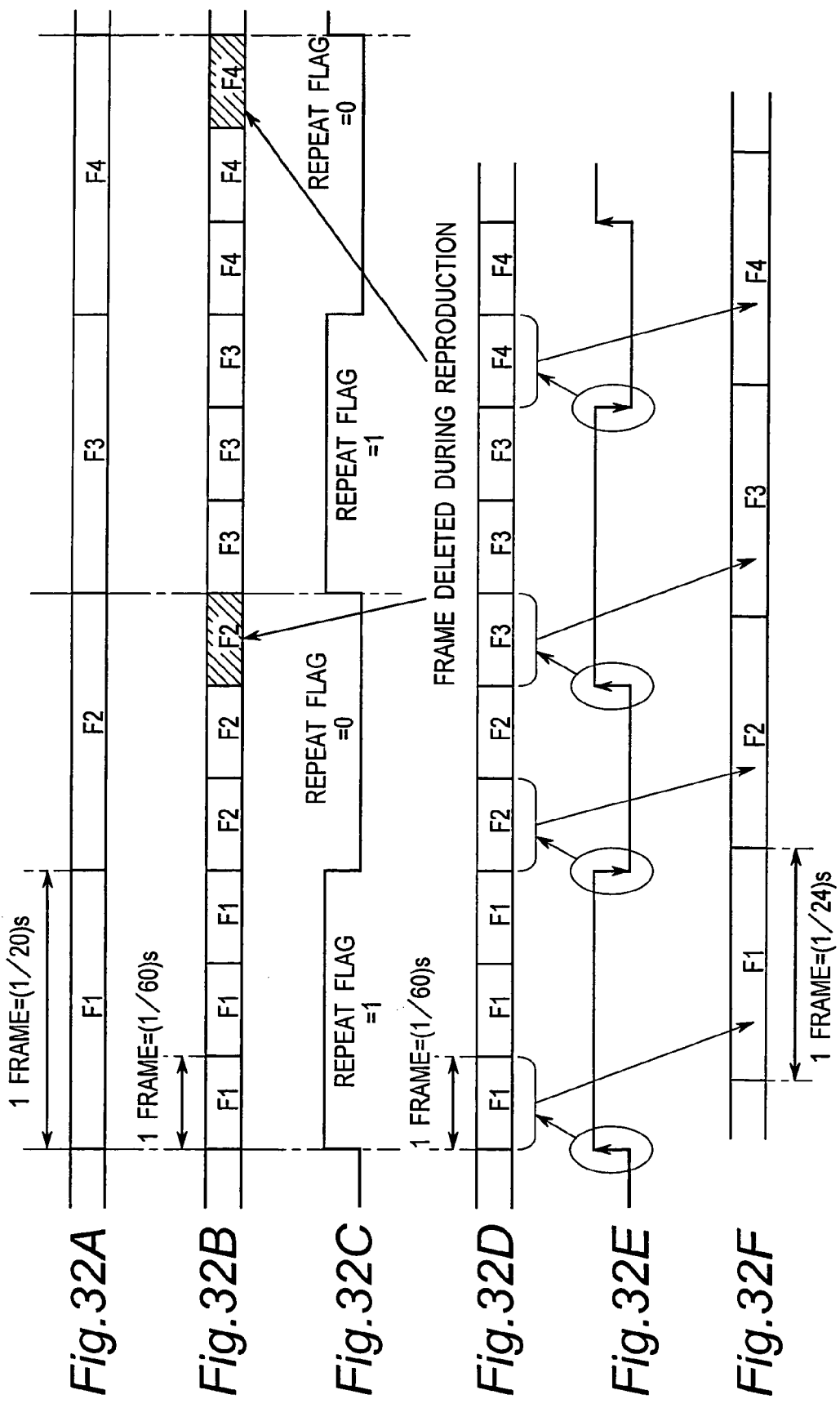
FIGS. 32A-32F are conceptual views of recording video signal wave form, reproduction video signal wave form and conversion information wave form during high-speed motion shooting of the video signal recording and reproducing apparatus of FIG. 29.

Then, a case of high-speed motion video production in which a signal having a frame rate of 20 Hz is recorded and a high-speed motion video signal having a frame rate of 24 Hz is obtained by performing (6/5)-fold high-speed reproduction. FIG. 32 is a conceptual view of recording video signal wave form, reproduction video signal wave form and conversion information wave form during high-speed motion shooting of the video signal recording and reproducing apparatus of this embodiment. Initially, the rate information from the rate information input terminal 102 is (m=1/3) and imaging is performed at a frame rate of 20 (=60×1/3) Hz by the m-fold frame rate imaging unit 101 as shown in FIG. 32A. Then, in the recording rate converter 201, each frame of the video signal A inputted to the recording rate converter 201 is repeated three times from (1/m=3) based on the simultaneously inputted rate information (m=1/3) and one frame is outputted at a frame rate of (1/60) sec., so that the video signal B having a frame rate of 60 Hz can be obtained as shown in FIG. 32B. FIG. 32C shows wave form of repeat flags acting as conversion flags indicative of positions of changes of contents of the video signal B of FIG. 32B between neighboring ones of the video frames outputted continuously in the video signal B. Subsequently, in the recording unit 103, the video signal B from the recording rate converter 201 and the conversion information composed of the rate information m and the repeat flags of FIG. 32C in the recording rate converter 201 are converted into the recording information to be recorded on the recording medium 104 and then, the recording information is sequentially recorded on the recording medium 104.

During reproduction, the information recorded on the recording medium 104 is reproduced by the reproduction unit 105 and the reproduction video signal B is outputted by the reverse operation of recording. At the same time, the conversion information stored at the predetermined location is also separated and outputted. At this time, if output from the output terminal 108 is set by the operational information from the operational information input terminal 106 so as to be generated at a frame rate of 24 Hz, the rate information in the reproduced conversion information is (m=1/3), so that the operational controller 107 controls the reproduction unit 105 such that the reproduction unit 105 initially performs special reproduction of the information at a (6/5)-fold speed from {(2/5)×(1/m)=6/5} for the purpose of outputting the information.

In case the reproduction unit 105 outputs (6/5)-fold speed special reproduction at a frame rate of 60 Hz, a method may be employed in which after five frames of the video signal have been outputted by outputting one frame at an interval of (1/60) sec., one frame is discarded and then, the next frame is outputted immediately by, for example, repeating high-speed feed and intermittent feed of the magnetic tape in the reproduction unit 105. Output wave form of the reproduction video signal B obtained by this method is shown in FIG. 32D. Meanwhile, repeat flags fetched from the reproduction conversion information together with the reproduction video signal B are shown in FIG. 32E. In the repeat flags of FIG. 32E inputted simultaneously with the reproduction video signal B of FIG. 32D in the reproduction converter 202, if time axis of only an initial frame subsequent to each of points of changes of values of the repeat flags is expanded as shown in FIG. 32F, the video signal having a frame rate of 24 Hz is obtained and outputted to the output terminal 108.

By the above described method, since the video signal having the frame rate of 20 Hz is outputted through reduction to the frame rate of 24 Hz, the (6/5)-fold high-speed motion video can be obtained.

Meanwhile, in this embodiment, when the high-speed motion video is obtained, a case in which reproduction is performed by rapid feed of the tape in the reproduction unit 105 so as to obtain the signal wave form shown in FIG. 32D has been described as an example. Alternatively, any method may be employed in which the reproduction video signal B has output timing such that frames of the reproduction video signal B are inputted at a timing required by the reproduction rate converter 202. For example, there is a method in which the necessary information is obtained in a predetermined period by performing nontracking reproduction of the recording medium 104 in the reproduction unit 105.

As described above in this embodiment, since the conversion information composed of the repeat flags acting as the conversion flags and the rate information for setting the frame rate of the imaging unit is recorded together with the video signal and the reproduction video signal and the reproduction conversion information are obtained at the time of reproduction, reproduction speed of the reproduction unit 105 and rate conversion ratio of the reproduction rate converter 202 can be automatically set by the reproduction conversion information, so that fine manual setting of the reproduction unit 105 and the reproduction rate converter 202 is not required to be performed and thus, the video signal converted to the desired speed can be obtained.

Meanwhile, since the frame rate of the m-fold frame rate imaging unit 101 can be set to an arbitrary value at the time of recording and is outputted through its automatic conversion to the predetermined reproduction speed at the time of reproduction, a usable speed range from slow motion to high-speed motion is wide and is obtained simply.

Meanwhile, in this embodiment, the cases in which the video of the standard frame rate, the (4/5)-fold speed slow motion video and the (6/5)-fold high speed motion video are obtained have been described. However, other speeds can also be obtained easily in the similar procedure without the need for fine manual setting.

Meanwhile, the rate information is m itself indicative of the ratio of the imaging frame rate to the frame rate at the time of recording and reproduction but may also indicate the imaging frame rate itself without indicating a frequency relation relative to the frame rate at the time of recording and reproduction.

Any code which reveals points of changes of contents of the video signal between the frames may be employed as the repeat flags of the conversion information.

The repeat flags are used as one of the conversion information. However, even an effective flag indicative of a position of only one effective frame in the repeatedly arranged frames of the same video signal contents brings about similar effects.

Meanwhile, the conversion information is stored at the same location as the eighth embodiment as described above but may be stored at any location from which the conversion information can be fetched simultaneously with the video signal at the time of reproduction.

Meanwhile, in this embodiment, reproduction is outputted only at 24 Hz as described above. However, for example, the 24P video signal can be easily outputted as the signal format of 60 Hz shown in FIG. 30B.

Furthermore, in this embodiment, the recording unit 103 records the video signal having the signal format of the frame rate of 60 Hz at the standard speed as described above but the frame rate may assume other values.

Tenth Embodiment

Figure 33:
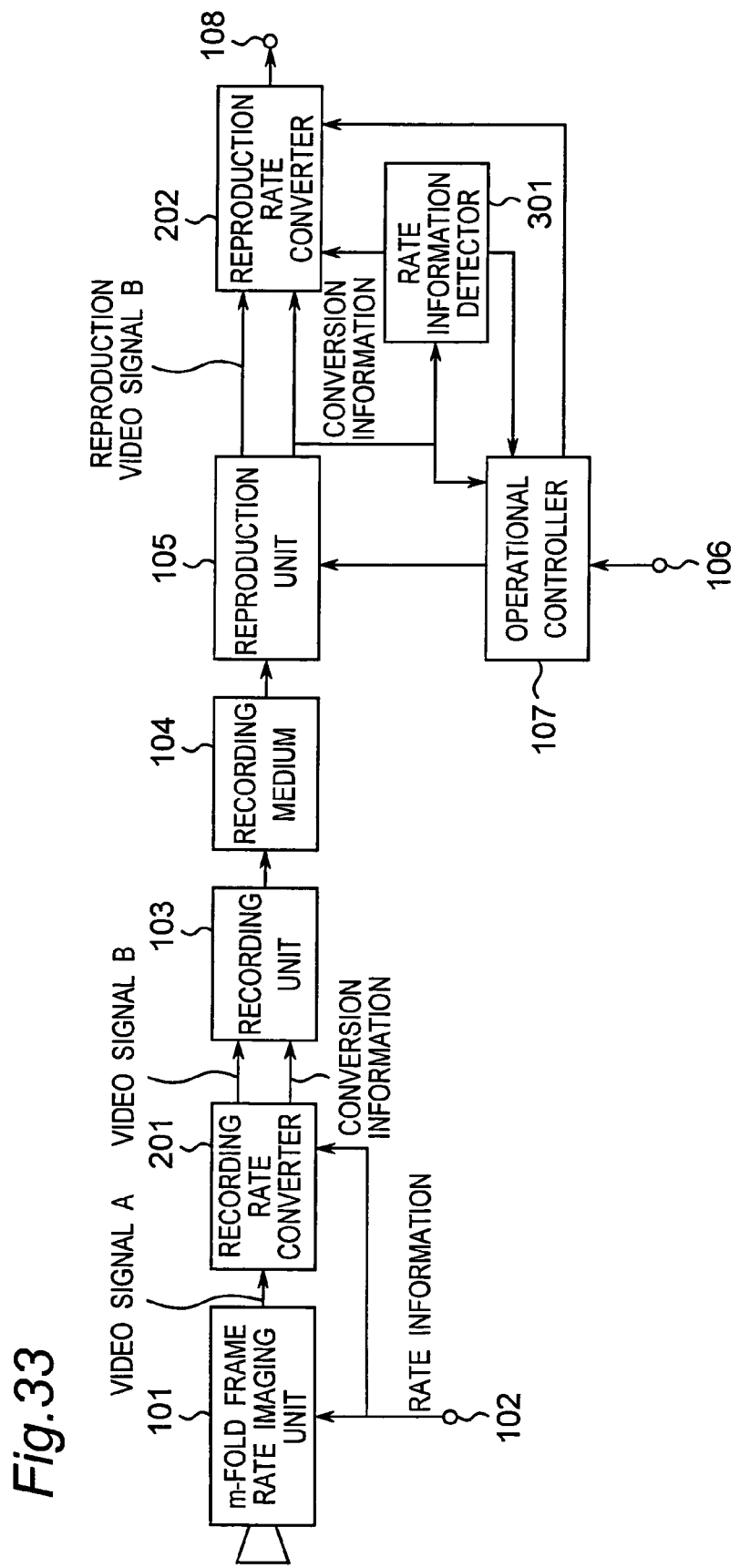
FIG. 33 is a block diagram of a video signal recording and reproducing apparatus of a video signal producing system according to a tenth embodiment of the present invention.

FIG. 33 is a block diagram showing a configuration of a video signal recording and reproducing apparatus of a video signal producing system according to a tenth embodiment of the present invention. In FIG. 33, blocks operating in the same manner as those of the video signal recording and reproducing apparatus of the ninth embodiment are designated by identical numerals and the description is abbreviated.

In FIG. 33, "301" is a rate information detector for detecting, from contents of the repeat flags of the conversion information obtained from the reproduction unit 105, a value of the rate information set at the time of recording.

Hereinafter, operation of the video signal recording and reproducing apparatus of the above described arrangement is described. In this embodiment, the standard frame rate of the recording format is set at 24 Hz. A video signal format is a progressive video signal format in which one frame acts as a unit of recording and display. Moreover, in the recording unit 103, the video signal of the signal format having the frame rate of 60 Hz is recorded at the standard speed. In case the input signal whose frame rate is not 60 Hz is recorded, the frame rate is converted to 60 Hz by the recording rate converter 201 and then, recording is performed. Meanwhile, a VTR in which information is recorded on the magnetic tape by helical scanning of the recording and reproducing head is supposed to form a recording and reproducing portion.

In this embodiment, recording operation is performed in the same manner as the ninth embodiment but the conversion information outputted from the recording rate converter 201 simultaneously with the video signal B contains only the repeat flags acting as the conversion flags indicative of positions of changes of contents of the video signal B between neighboring ones of the video frames outputted continuously in the video signal B.

At the reproduction side, the recording information is reproduced from the recording medium 104 by the reproduction unit 105 by initially setting the recording and reproducing head and feed rate of the magnetic tape to the standard speed (60 Hz, 1-fold speed reproduction), so that the reproduction video signal B and the conversion information are obtained. In this embodiment, the conversion information contains only the repeat flags and the repeat flags are inputted to the rate information detector 301.

From the contents of inputted repeat flags, the rate information detector 301 detects the value of the rate information set at the time of recording. Supposing that "$\alpha$" denotes the number of frames of the reproduction video signal B of a 60 Hz period present during one period in which repetitions of change of the inputted repeat flags with time make one round and "$\beta$" denotes a total of the number of changes of states (1, 0, 1, 0, - - - ) of the repeat flags in the one period of the repeat flags, the rate information m at the time of recording can be calculated in advance from a relation of ($m=\beta/\alpha$).

For example, in case the repeat flags are as shown in FIG. 30C in the reproduction video signal B outputted at 60 Hz, $\alpha$ is 5 from the five frames F1, F1, F1, F2 and F2, while β is 2 because the repeat flags are 1 and 0 when the frames are F1 and F2, respectively, so that it can be detected from (m=2/5) that imaging has been performed by the m-fold frame rate imaging unit 101 at a frame rate of 24 Hz. Meanwhile, in case the repeat flags are as shown in FIG. 31C, α is 4 and β is 2 and thus, the relation of (m=1/2) enables detection that imaging has been performed by the m-fold frame rate imaging unit 101 at a frame rate of 30 Hz from (60×1/2). Furthermore, in case the repeat flags are as shown in FIG. 32C, α is 6 and β is 2, so that the relation of (m=1/3) enables detection that imaging has been performed by the m-fold frame rate imaging unit 101 at a frame rate of 20 Hz from (60×1/3).

Figure 34A:
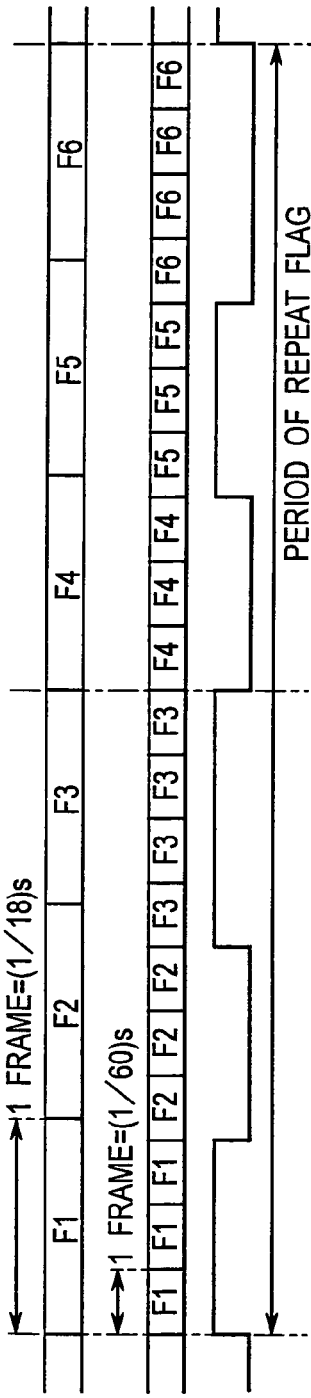
FIGS. 34A, 34B, and 34C are conceptual views of recording video signal wave form, reproduction video signal wave form and conversion information wave form of the video signal recording and reproducing apparatus of FIG. 33.
Figure 34B:
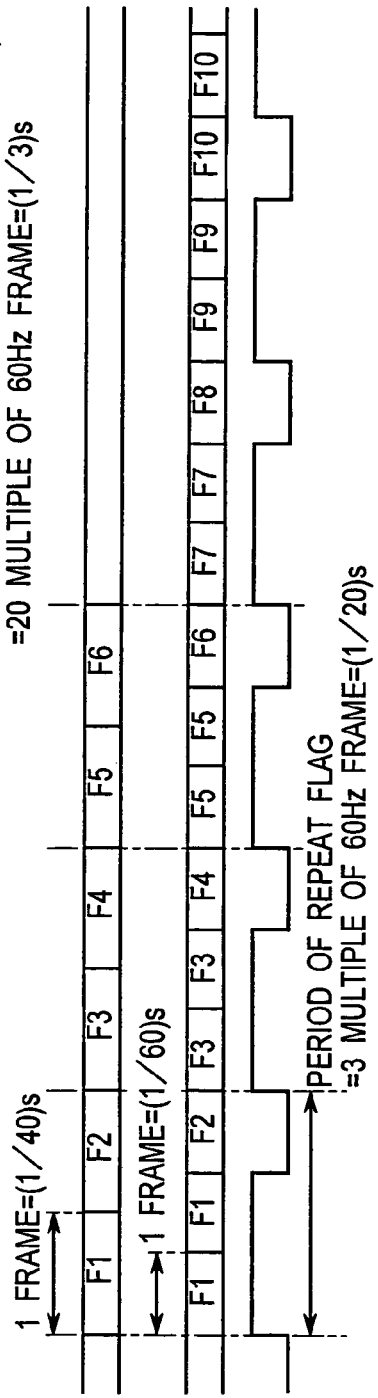
Figure 34C:
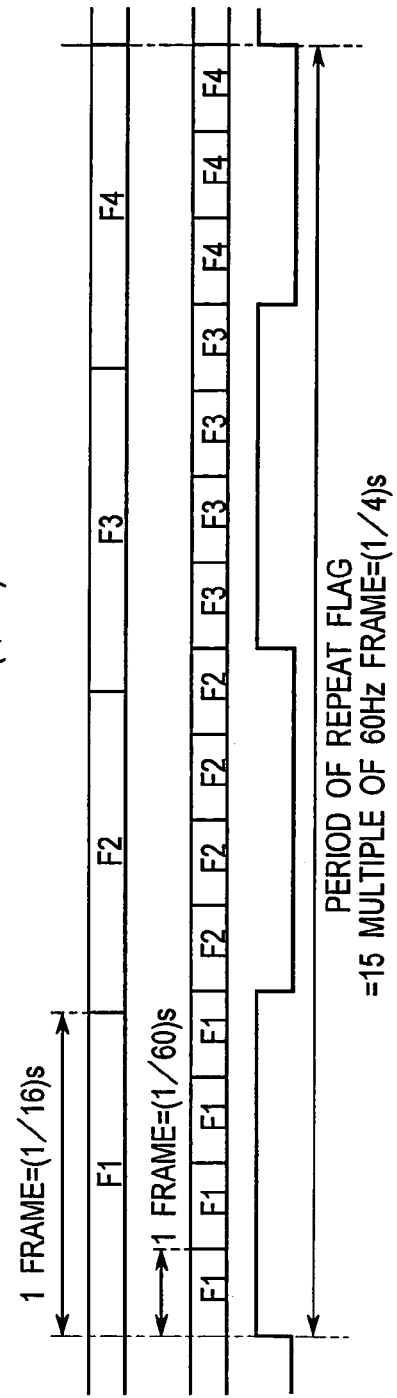
Figure 35:
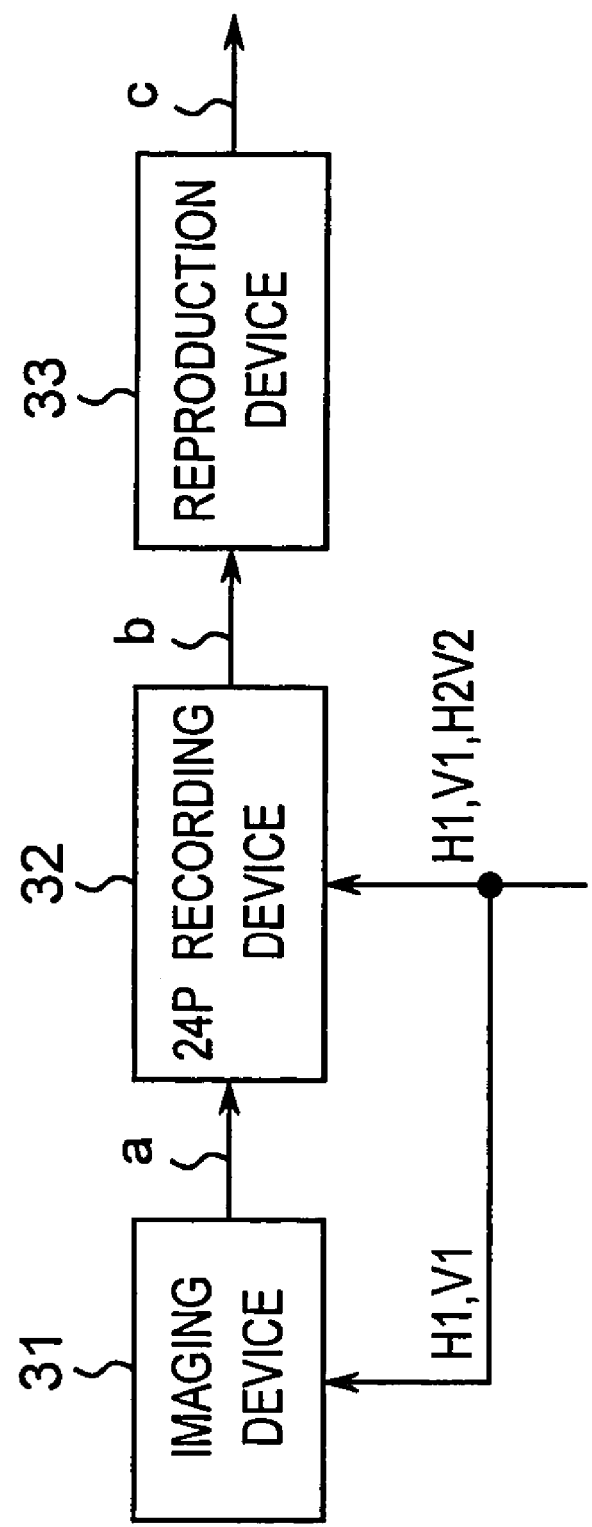
FIG. 35 is a block diagram showing a configuration of a prior art video signal producing system.
Figure 36:
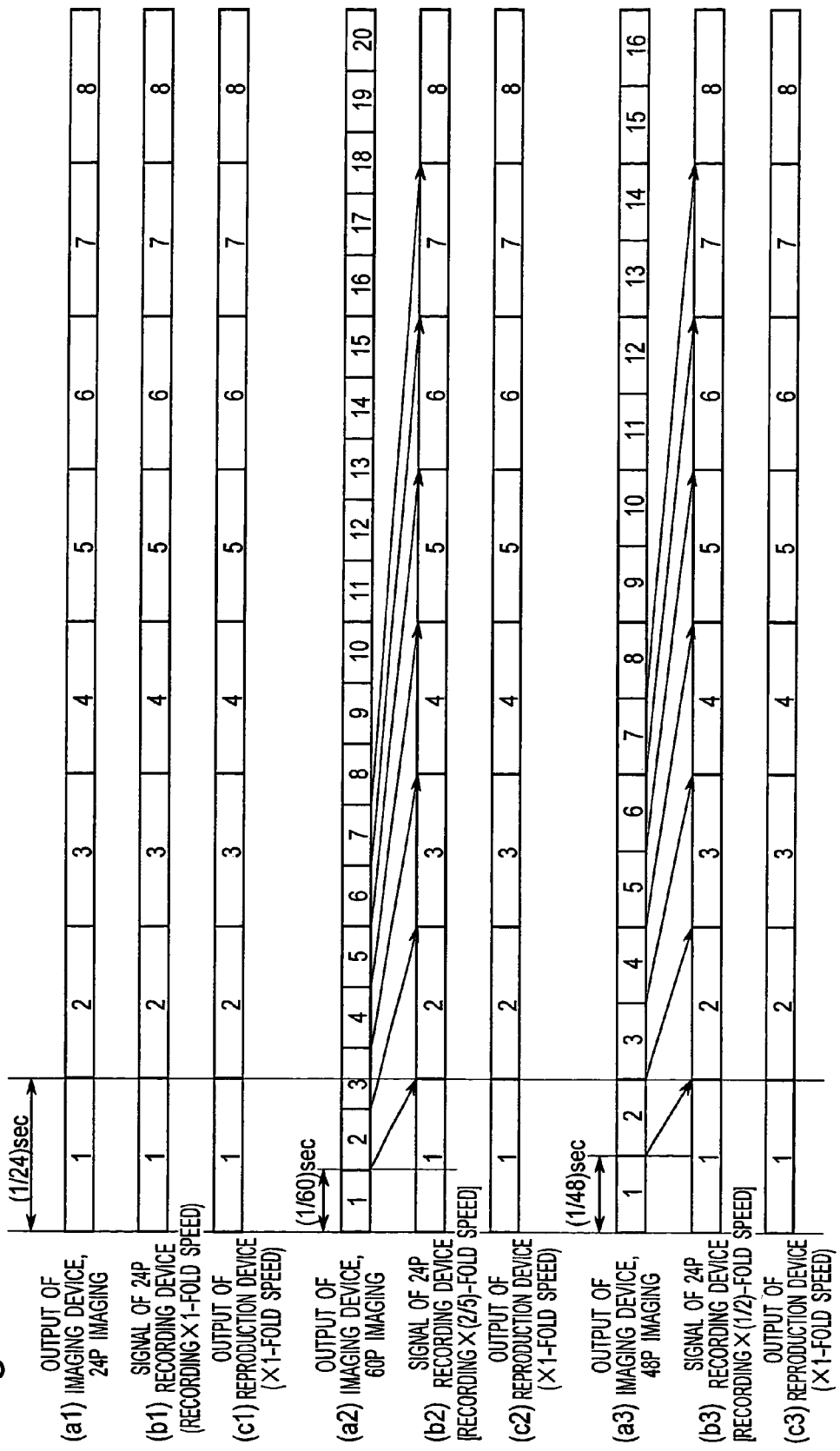
FIG. 36 is a signal wave-form diagram of portions of the prior art video signal producing system of FIG. 35.
Figure 37:
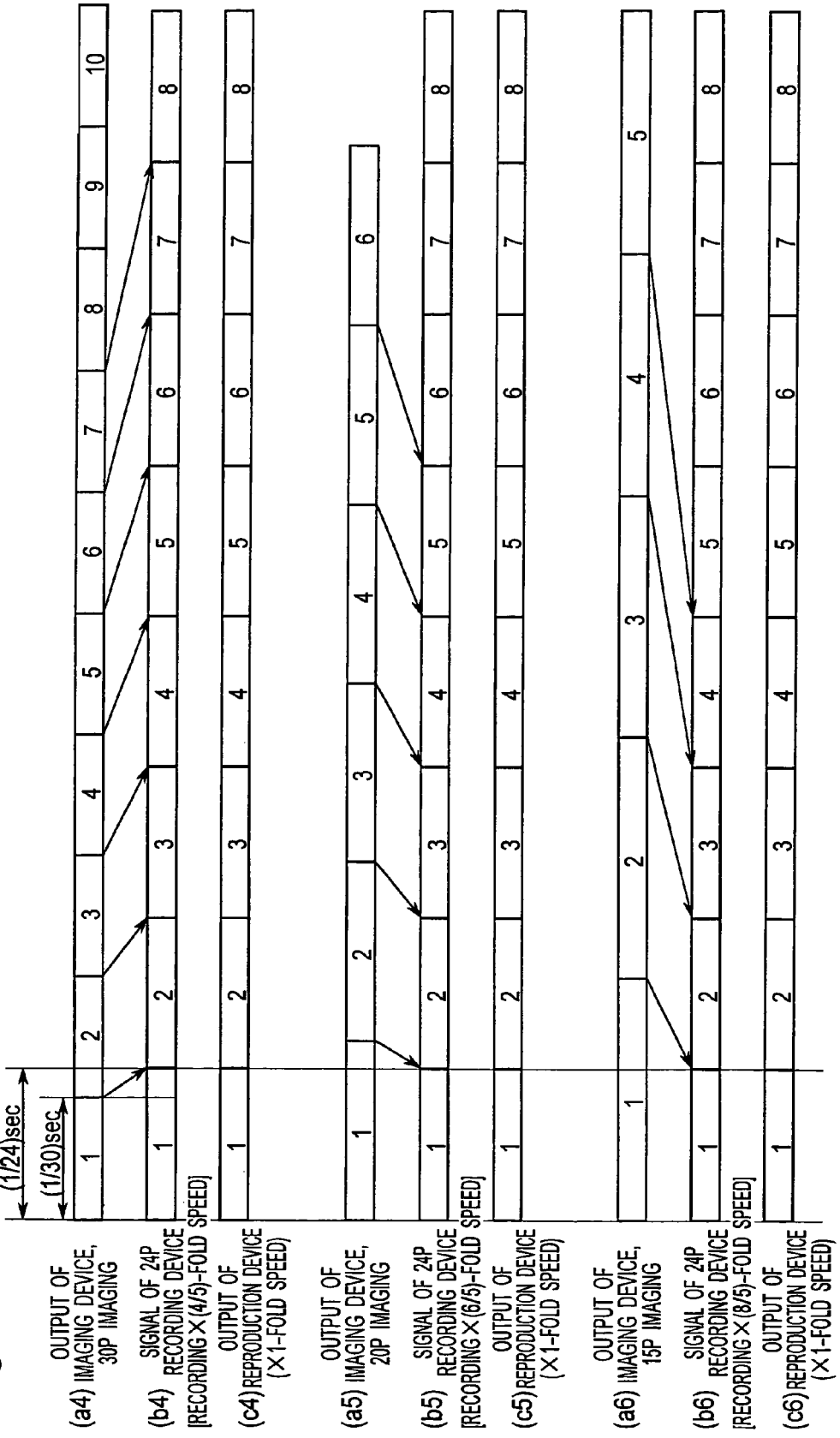
FIG. 37 is a signal wave-form diagram of portions of the prior art video signal producing system of FIG. 35.
Figure 38:
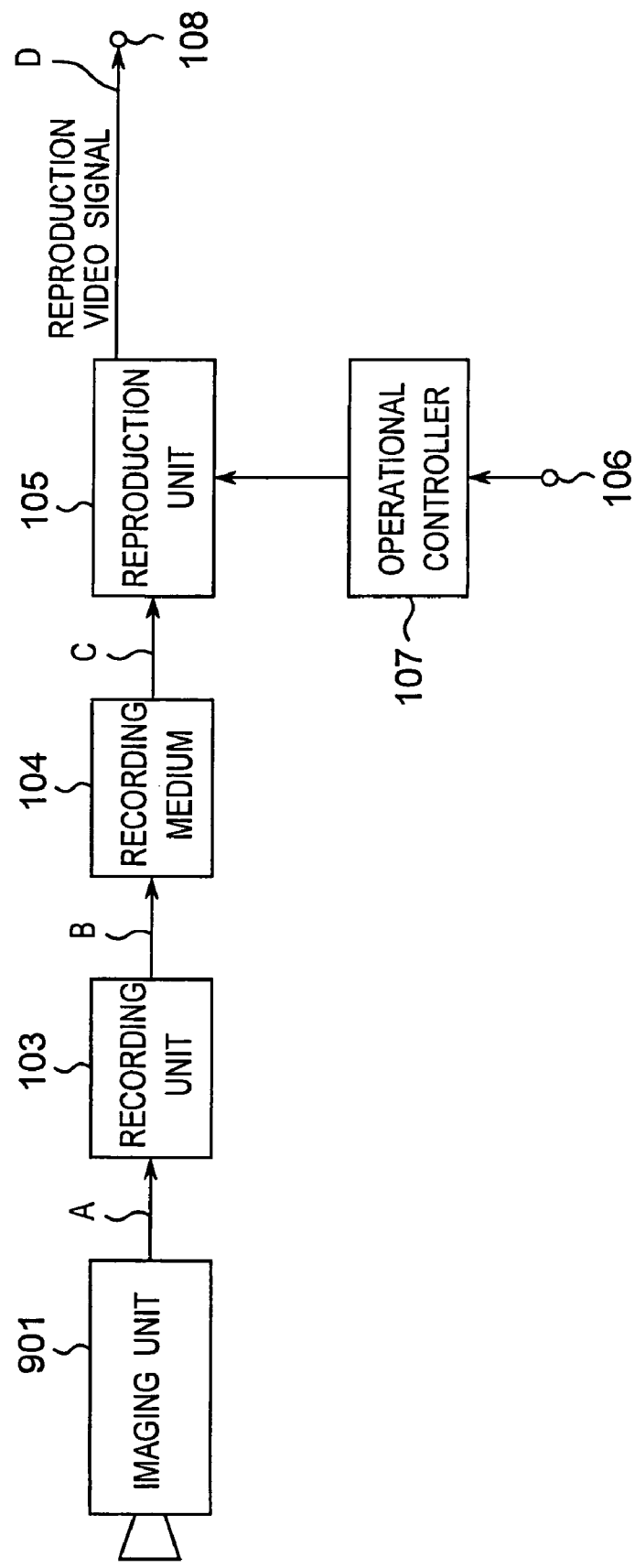
FIG. 38 is a block diagram of a video signal recording and reproducing apparatus of a conventional video signal producing system.

The same applies to other frame rates. FIG. 34 is a conceptual view of recording video signal wave form, reproduction video signal wave form and conversion information wave form of the video signal recording and reproducing apparatus of this embodiment. For example, in case the reproduction video signal B and the repeat flags have such a relation as shown in FIG. 34A, α is 20 and β is 6, so that the relation of (m=3/10) enables detection that imaging has been performed at a frame rate of 18 Hz from (60×3/10). Meanwhile, in case the reproduction video signal B and the repeat flags have such a relation as shown in FIG. 34B, α is 3 and β is 2, so that the relation of (m=2/3) enables detection that imaging has been performed at a frame rate of 40 Hz from (60×2/3). Furthermore, in case the reproduction video signal B and the repeat flags have such a relation as shown in FIG. 34C, α is 15 and β is 4, so that the relation of (m=4/15) enables detection that imaging has been performed at a frame rate of 16 Hz from (60×4/15).

The rate information detected by the rate information detector 301 and the repeat flags of the conversion information are inputted to the operational controller 107 and the reproduction rate converter 202. At this time, if the frame rate is so set as to be outputted from the output terminal 108 at 24 Hz by the operational information from the operational information input terminal 106, control of the subsequent reproduction unit 105 and reproduction rate converter 202 is performed in the same procedure as the ninth embodiment and thus, a slow motion video or a high-speed motion video can be obtained at a reproduction frame rate of 24 Hz.

As described above in this embodiment, since the repeat flags acting as the conversion flags are recorded as the conversion information together with the video signal and the reproduction video signal and the reproduction conversion information are obtained at the time of reproduction such that the rate information is detected from the reproduction conversion information by the rate information detector 301, reproduction speed at the reproduction unit 105 and rate conversion ratio at the reproduction rate converter 202 can be set automatically, so that fine manual setting of the reproduction unit 105 and the reproduction rate converter 202 are not required to be performed and thus, the video signal converted to the desired speed can be obtained.

Meanwhile, since the frame rate of the m-fold frame rate imaging unit 101 can be set at an arbitrary value at the time of recording and is automatically converted to the predetermined reproduction speed at the time of reproduction so as to be outputted, a usable speed range from slow motion to high-speed motion is wide and is obtained simply.

Furthermore, as compared with the ninth embodiment, since the rate information is not required to be recorded as the conversion information at the time of recording, the recording information on the recording medium 104 can be reduced.

Meanwhile, in this embodiment, speeds of slow motion and high-speed motion, which are not referred to in the ninth embodiment, also can be obtained easily in the similar procedure without the need for fine manual setting.

The conversion information can be stored at a location similar to that of the eighth embodiment and may be stored at any location from which the conversion information can be fetched simultaneously with the video signal at the time of reproduction.

Any code which reveals points of changes of contents of the video signal between the frames may be employed as the repeat flags of the conversion information.

The repeat flags are used as the conversion information. However, even an effective flag indicative of a position of only one effective frame in the repeatedly arranged frames of the same video signal contents brings about similar effects.

Meanwhile, in this embodiment, reproduction is outputted from the output terminal 108 only at 24 Hz as described above. However, for example, the 24P video signal can be easily outputted as the signal format of 60 Hz shown in FIG. 30B.

Furthermore, in this embodiment, the recording unit 103 records the video signal having the signal format of the frame rate of 60 Hz at the standard speed as described above but the frame rate may assume other values.

In the eighth, ninth and tenth embodiments, it is supposed that the magnetic tape acts as the recording medium 104 and the VTR in which the recording and reproducing head is mounted on the rotary cylinder such that information is recorded on the magnetic tape by helical scanning of the recording and reproducing head acts as the recording unit 103 and the reproduction unit 105. However, the recording unit 103 and the reproduction unit 105 may be formed by any apparatus enabling adjustment of timing of recording and reproduction from outside, for example, a nonlinear device in which the recording medium and the recording and reproducing head are constituted by a hard disc or a disc apparatus constituted by an optical disc.

As described above in the video signal producing system of the present invention, since the signals of the various frame rates obtained by the imaging device can be converted to the signal of the predetermined frame rate, recording can be performed by the recording device at the predetermined frame rate of, for example, 60P at all times, so that the imaging device and the recording device of the video signal producing system can be arranged without increase of circuit scale and electric power in a VTR built-in imaging device in which the imaging device and the recording device are provided integrally, for example, a camera recorder. Meanwhile, if the reproduction device is also combined with the imaging device and the recording device, the video signal of 24P can be easily reproduced through selection of the signals and conversion of the reproduction speed at the predetermined ratio.

Meanwhile, in addition to the above described effects in the video signal producing system of the present invention, even if the conversion ratio of the various frame rates of the video signal is complicated, namely, the conversion ratio does not assume an inverse number of an integer, for example, in conversions from 48P to 60P and 24P to 60P, conversion to the signal having the predetermined frame rate of, for example, 60P can be performed at all times and recording can be performed at the frame rate by the recording device, so that fine setting such as slow motion and rapid feed can be performed.

Meanwhile, in the video signal producing system of the present invention, in case the frame rate after conversion at the frame rate converting portion is 60 frames and the substantial number of the frames at the reproduction device is 24 frames, i.e., 24P, the 2-3 pull-down type output can be obtained by the reproduction device at all times, so that such an effect is gained that each 24P video signal from slow motion to rapid feed can be handled as a signal format of 60P.

Meanwhile, in the video signal producing system of the present invention, since the P imaging signal having the various frame rates is outputted at the frame rate of 60P, the output signal of the frame rate converting portion can be set at a delay time of one frame of 60P at all times and timing of write and read of the frame memory, etc. are not required to be adjusted for a plurality of the frame rates by setting the frame rate of the output signal of the imaging portion and the frame rate of the frame rate converting portion to 60P identically, such an effect is achieved that circuit operation in the frame rate converting portion can be stabilized.

Meanwhile, in the video signal producing system of the present invention, since the flag signal for changing over the frames can be produced by the simple configuration and can be recorded in the recording device together with the imaging signal, information such as the synchronous signals of the imaging portion and the recording device is not required to be supplied to the reproduction device. In addition, such effects are obtained that a switch for changing over operation in response to the frame rate of the imaging portion, etc. are not required to be provided in the reproduction device and video signals can be reproduced automatically even if frame rate of the imaging portion changes variously.

Meanwhile, in the video signal producing system of the present invention, since an interface for the flag signal necessary in addition to the signal and a delay circuit for imparting a predetermined delay time in a processing time of the imaging signal up to its recording in the recording device are not required to be provided, the above effects can be gained by a simple circuit configuration.

Furthermore, in the video signal producing system of the present invention, since a conventional VTR having a fixed frame rate, etc. can be employed in a portion of the recording device and the reproduction device, the system can be manufactured at low cost.

On the other hand, in the video signal recording and reproducing apparatus of the present invention, since the video signals of the various frame rates obtained by the imaging device are recorded and reproduced in combination with the conversion information and the reproduction conversion information is utilized at the time of reproduction, the reproduction video signal can be automatically set at the predetermined reproduction frame rate easily.

Meanwhile, in the video signal recording and reproducing apparatus of the present invention, such a marked effect is achieved that the reproduction frame rate can be set more arbitrarily than the conventional VTR in which the reproduction frame rate is restricted to a special reproduction speed control range settable by a jog dial and preset special reproduction speeds.

Furthermore, in the video signal recording and reproducing apparatus of the present invention, since the conversion information may be stored in the already provided sub-code area or the like so as to be recorded and reproduced in the case of DV, the present invention can be carried out easily.

The invention claimed is:

1. A video signal producing system, comprising:
    an imager including an imaging portion capable of imaging progressive imaging signals at various frame rates and outputting a progressive imaging signal having a frame rate "F0" which is any one selected from the various frame rates by a frame rate information, a frame rate information input portion for inputting the frame rate information indicative of the frame rate "F0" and a frame rate converter for converting the progressive imaging signal having the frame rate "F0", into a video signal having a first fixed predetermined frame rate "F1" equal to a maximum value of the various frame rates;
    a recorder for recording, at the first fixed predetermined frame rate "F1", the video signal converted by the frame rate converter; and
    a reproducer for reproducing the video signal recorded by the recorder so as to output the video signal at a second predetermined frame rate "F2" which is one of the various frame rates, excepting the maximum value and a minimum value of the various frame rates;
    wherein the imager outputs, in addition to the converted video signal, the frame rate information;
    wherein the recorder records the converted video signal and the frame rate information outputted by the imager;
    wherein the reproducer reproduces the frame rate information recorded by the recorder; and
    wherein by using the frame rate "F0" indicated by the reproduced frame rate information, the video signal recorded by the recorder is selectively reproduced at a ratio of (F0/F1) at such a speed that the reproduced video signal has the second predetermined frame rate "F2" in order to obtain a (F2/F0)-fold slow motion video when F2 is less than F0, and a (F2/F0)-fold high speed motion video when F2 is more than F0.

2. The video signal producing system as claimed in claim 1, wherein the frame rate converter includes a frame rate conversion ratio calculator for calculating a ratio of each of the various frame rates to the predetermined frame rate;
    wherein "n" and "m" are integers having a relation of (n<m) and the ratio is (n/m);
    wherein when n is 1, the signal having each of the various frame rates is duplicated (m−1) times at the signal group to the subsequent frame of the subsequent frame signal group; and
    wherein the recorder records the output signal of the imager, the flag signal and rate information indicative of the frame rates obtained prior to conversion of the frame rate converter.

3. The video signal producing system as claimed in claim 1, wherein the reproduction device includes a selector circuit for selecting one of input signals of one or a plurality of identical frames so as to change a reproduction speed of the selected signal such that a substantial number of frames of the selected signal assume the predetermined value.

4. The video signal producing system as claimed in claim 1, wherein when the predetermined frame rate is 60 frames and the substantial number of the frames in the output of the reproduction device is 24 progressive frames, so-called 2-3 pull-down output in which in a set of signals of two different frames in the 60 frames, the signal of an initial one of the two different frames is repeated two times and the signal of the subsequent one of the two different frames is repeated three times or the signal of the initial one of the two different frames is repeated three times and the signal of the subsequent one of the two different frames is repeated two times is employed for duplication or deletion of the frames so as to change the reproduction speed.

5. The video signal producing system as claimed in claim 1, wherein the reproduction device changes the reproduction speed such that the substantial number of the frames in the output of the reproduction device is 48 progressive frames.

6. The video signal producing system as claimed in claim 1, wherein the imaging device includes a solid imaging element for controlling an accumulation time so as to obtain the progressive imaging signals having the various frame rates;

wherein the imaging device includes a drive pulse generation control circuit for controlling a drive pulse for driving the solid imaging element and outputs, as the drive pulse, to the solid imaging element a read pulse at a rate of the accumulation time leading to a desired frame rate and horizontal and vertical transfer pulses at such a rate that an output signal of the solid imaging element has the predetermined frame rate.

7. The video signal producing system as claimed in claim 1, wherein the frame rate converting portion duplicates a plurality of frame signal groups each having an identical frame and the imaging device includes a flag signal generating portion for generating a flag signal indicative of a point of change from one frame of one frame signal group to the subsequent frame of the subsequent frame signal group;

wherein the recording device records the output signal of the imaging device and the flag signal and the reproduction device changes the reproduction speed on the basis of the flag signal such that the substantial number of the frames assume the predetermined value.

8. The video signal producing system as claimed in claim 1, the frame rate converting portion duplicates a plurality of frame signal groups each having an identical frame;

wherein the imaging device includes a flag signal generating portion for generating a flag signal indicative of a point of change from one frame of one frame signal group to the subsequent frame of the subsequent frame signal group and a flag signal converting and adding circuit for converting and adding the flag signal to a signal duration other than an effective time of the imaging signal outputted from the frame rate converting portion;

wherein the recording device records the output signal of the imaging device and the flag signal and the reproduction device changes the reproduction speed on the basis of the flag signal such that the substantial number of the frames assume the predetermined value.

9. The video signal producing system as claimed in claim 7, wherein the reproduction device includes a fixed rate reproduction portion for reproducing the output signal of the imaging device and the flag signal at a frame rate identical with that of recording of the output signal of the imaging device and the flag signal by the recording device and an imaging signal storage portion for storing, on the basis of the flag signal outputted from the fixed rate reproduction portion, the imaging signal having the substantial number of the frames prior to conversion of the frame rate converting portion such that the imaging signal is outputted from the imaging signal storage portion at the predetermined frame rate.

10. The video signal producing system as claimed in claim 1, wherein the frame rate converting portion duplicates a plurality of frame signal groups each having an identical frame and the imaging device includes a flag signal generating portion for generating a flag signal indicative of a point of change from one frame of one frame signal group to the subsequent frame of the subsequent frame signal group;

wherein the recording device records the output signal of the imaging device, the flag signal and rate information indicative of the frame rates obtained prior to conversion of the frame rate converting portion.

11. A video signal recording apparatus of a video signal producing system, comprising:

a frame rate converter that converts a frame rate "F0" of a video signal A to a fixed standard frame rate "F1" of a recording format, with the frame rate "F0" being any one selected from various frame rates and the fixed standard frame rate "F1" being equal to a maximum value of the various frame rates; and a recorder that records, at the fixed standard frame rate "F1" and in the recording format, both the video signal converted by the frame rate converter and conversion information indicative of the frame rate "F0".

12. The video signal recording apparatus as claimed in claim 11, wherein the conversion information is composed of either only a conversion flag capable of specifying points of changes of contents of a video signal B between frames or positions of effective frames of the video signal B or the conversion flag and rate information capable of specifying the frame rate of the video signal A.

13. A video signal reproducing apparatus of a video signal producing system, wherein a video signal A has a frame rate "F0" which is any one selected from various frame rates and a video signal B is obtained by converting the frame rate "F0" of the video signal A to a fixed standard frame rate "F1" of a recording format, with the fixed standard frame rate "F1" being equal to a maximum value of the various frame rates;

wherein from a recording medium on which the video signal B and conversion information on conversion of the frame rate "F0" are recorded, the video signal B and the conversion information are reproduced and the video signal B is converted to a video signal signal C having a frame rate "F2" which is one of the various frame rates, excepting the maximum value and a minimum value of the various frame rates such that the video signal C is reproduced and outputted; and wherein by using the frame rate "F0" indicated by the reproduced conversion information, the video signal B is selectively reproduced at a ratio of (F0/F1) at such a speed that the video signal C has the frame rate "F2" in order to obtain a (F2/F0)-fold slow motion video when F2 is less than F0, and a (F2/F0)-fold high speed motion video when F2 is more than F0.

14. The video signal reproduction apparatus as claimed in claim 13, wherein the conversion information is composed of either only a conversion flag capable of specifying points of changes of contents of the video signal B between frames or positions of effective frames of the video signal B or the conversions flag and rate information capable of specifying the frame rate of the video signal A.

* * * * *